US008291461B2

(12) United States Patent
Thomas et al.

(10) Patent No.: US 8,291,461 B2
(45) Date of Patent: Oct. 16, 2012

(54) SYSTEMS AND METHODS FOR MANAGING THE DISTRIBUTION OF ON-DEMAND MEDIA

(75) Inventors: William L. Thomas, Bixby, OK (US); Michael D. Ellis, Boulder, CO (US); David M. Berezowski, Tulsa, OK (US); Kevin B. Easterbrook, Centennial, CO (US); Joseph P. Baumgartner, Tulsa, OK (US); W. Benjamin Herrington, Tulsa, OK (US)

(73) Assignee: United Video Properties, Inc., Tulsa, OK (US)

( * ) Notice: Subject to any disclaimer, the term of this patent is extended or adjusted under 35 U.S.C. 154(b) by 0 days.

(21) Appl. No.: 12/637,922

(22) Filed: Dec. 15, 2009

(65) Prior Publication Data

US 2010/0186025 A1    Jul. 22, 2010

Related U.S. Application Data

(63) Continuation of application No. 09/973,976, filed on Oct. 9, 2001, now abandoned.

(60) Provisional application No. 60/270,351, filed on Feb. 21, 2001, provisional application No. 60/252,171, filed on Nov. 20, 2000, provisional application No. 60/239,522, filed on Oct. 11, 2000.

(51) Int. Cl.
*H04N 7/173* (2011.01)
(52) U.S. Cl. ............... 725/95; 725/87; 725/96; 725/105
(58) Field of Classification Search .................... 725/87, 725/95, 96, 105
See application file for complete search history.

(56) References Cited

U.S. PATENT DOCUMENTS

| 3,594,778 | A | 7/1971 | Herald et al. |
| 4,338,644 | A | 7/1982 | Staar |
| 4,339,798 | A | 7/1982 | Hedges et al. |
| 4,355,415 | A | 10/1982 | George et al. |
| 4,422,105 | A | 12/1983 | Rodesch et al. |
| 4,425,579 | A | 1/1984 | Merrell |
| 4,429,385 | A | 1/1984 | Cichelli et al. |

(Continued)

FOREIGN PATENT DOCUMENTS

DE    2918846    11/1980

(Continued)

OTHER PUBLICATIONS

"Start Here," Sony, TiVo and DIRECTV (undated).

(Continued)

*Primary Examiner* — Pankaj Kumar
*Assistant Examiner* — Sahar Baig
(74) *Attorney, Agent, or Firm* — Ropes & Gray LLP

(57) ABSTRACT

Systems and methods for managing the distribution of on-demand media in an interactive television application are provided. An interactive television application may receive a request for on-demand media from a user. The interactive television application may provide an option to the user for the transmission of the on-demand media. Such options may include, for example, an option to request a reduced-bandwidth version of the on-demand media, an option to schedule a future time for presentation of the on-demand media, an option to download the on-demand media to a recording device, and an option to check the availability of the on-demand media. A reduced price for transmission of the on-demand media may be provided to the user.

75 Claims, 36 Drawing Sheets

U.S. PATENT DOCUMENTS

| | | | |
|---|---|---|---|
| 4,488,179 A | 12/1984 | Krüger et al. |
| 4,495,654 A | 1/1985 | Deiss |
| 4,496,171 A | 1/1985 | Cherry |
| 4,573,072 A | 2/1986 | Freeman |
| 4,602,279 A | 7/1986 | Freeman |
| 4,620,229 A | 10/1986 | Amano et al. |
| 4,641,205 A | 2/1987 | Beyers, Jr. |
| 4,691,351 A | 9/1987 | Hayashi et al. |
| 4,694,490 A | 9/1987 | Harvey et al. |
| 4,701,794 A | 10/1987 | Froling et al. |
| 4,704,725 A | 11/1987 | Harvey et al. |
| 4,706,121 A | 11/1987 | Young |
| 4,718,107 A | 1/1988 | Hayes |
| 4,739,406 A | 4/1988 | Morton et al. |
| 4,745,549 A | 5/1988 | Hashimoto |
| 4,751,578 A | 6/1988 | Reiter et al. |
| 4,787,063 A | 11/1988 | Muguet |
| 4,789,962 A | 12/1988 | Berry et al. |
| 4,807,052 A | 2/1989 | Amano |
| 4,812,940 A | 3/1989 | Takenaga |
| 4,847,696 A | 7/1989 | Matsumoto et al. |
| 4,847,698 A | 7/1989 | Freeman |
| 4,847,700 A | 7/1989 | Freeman |
| 4,855,833 A | 8/1989 | Kageyama et al. |
| 4,857,999 A | 8/1989 | Welsh |
| 4,873,584 A | 10/1989 | Hashimoto |
| 4,879,611 A | 11/1989 | Fukiu et al. |
| 4,885,775 A | 12/1989 | Lucas |
| 4,894,789 A | 1/1990 | Yee |
| 4,908,707 A | 3/1990 | Kinghorn |
| 4,908,713 A | 3/1990 | Levine |
| 4,930,158 A | 5/1990 | Vogel |
| 4,945,563 A | 7/1990 | Horton et al. |
| 4,959,720 A | 9/1990 | Duffield et al. |
| 4,963,994 A | 10/1990 | Levine |
| 4,965,825 A | 10/1990 | Harvey et al. |
| 4,977,455 A | 12/1990 | Young |
| 4,989,104 A | 1/1991 | Schulein et al. |
| 5,027,400 A | 6/1991 | Baji et al. |
| 5,038,211 A | 8/1991 | Hallenbeck |
| 5,047,867 A | 9/1991 | Strubbe et al. |
| 5,068,733 A | 11/1991 | Bennett |
| 5,109,279 A | 4/1992 | Ando |
| 5,109,414 A | 4/1992 | Harvey et al. |
| 5,134,719 A | 7/1992 | Mankovitz |
| 5,151,789 A | 9/1992 | Young |
| 5,155,591 A | 10/1992 | Wachob |
| 5,172,111 A | 12/1992 | Olivo |
| 5,172,413 A | 12/1992 | Bradley et al. |
| 5,187,589 A | 2/1993 | Kono et al. |
| 5,195,134 A | 3/1993 | Inoue |
| 5,200,822 A | 4/1993 | Bronfin et al. |
| 5,210,611 A | 5/1993 | Yee et al. |
| 5,223,924 A | 6/1993 | Strubbe |
| 5,231,493 A | 7/1993 | Apitz |
| RE34,340 E | 8/1993 | Freeman |
| 5,233,654 A | 8/1993 | Harvey et al. |
| 5,241,428 A | 8/1993 | Goldwasser et al. |
| 5,249,043 A | 9/1993 | Grandmougin |
| 5,253,066 A | 10/1993 | Vogel |
| 5,285,284 A | 2/1994 | Takashima et al. |
| 5,293,357 A | 3/1994 | Hallenbeck |
| 5,296,931 A | 3/1994 | Na |
| 5,299,006 A | 3/1994 | Kim |
| 5,323,234 A | 6/1994 | Kawasaki |
| 5,335,277 A | 8/1994 | Harvey et al. |
| 5,339,434 A | 8/1994 | Rusis |
| 5,341,350 A | 8/1994 | Frank et al. |
| 5,353,121 A | 10/1994 | Young et al. |
| 5,357,276 A | 10/1994 | Banker et al. |
| 5,371,551 A | 12/1994 | Logan et al. |
| 5,404,567 A | 4/1995 | DePietro et al. |
| 5,410,344 A | 4/1995 | Graves et al. |
| 5,412,720 A | 5/1995 | Hoarty |
| 5,416,508 A | 5/1995 | Sakuma et al. |
| 5,426,699 A | 6/1995 | Wunderlich et al. |
| 5,442,389 A | 8/1995 | Blahut et al. |
| 5,459,522 A | 10/1995 | Pint |
| 5,461,415 A | 10/1995 | Wolf et al. |
| 5,465,385 A | 11/1995 | Ohga et al. |
| 5,479,266 A | 12/1995 | Young et al. |
| 5,479,268 A | 12/1995 | Young et al. |
| 5,483,278 A | 1/1996 | Strubbe et al. |
| 5,485,197 A | 1/1996 | Hoarty |
| 5,485,219 A | 1/1996 | Woo |
| 5,502,504 A | 3/1996 | Marshall et al. |
| 5,508,815 A | 4/1996 | Levine |
| 5,517,257 A | 5/1996 | Dunn et al. |
| 5,523,794 A | 6/1996 | Mankovitz et al. |
| 5,523,796 A | 6/1996 | Marshall et al. |
| 5,524,195 A | 6/1996 | Clanton, III et al. |
| 5,524,271 A | 6/1996 | Hollmann et al. |
| 5,528,304 A | 6/1996 | Cherrick et al. |
| 5,532,754 A | 7/1996 | Young et al. |
| 5,534,911 A | 7/1996 | Levitan |
| 5,537,141 A | 7/1996 | Harper et al. |
| 5,539,449 A | 7/1996 | Blahut et al. |
| 5,539,822 A | 7/1996 | Lett |
| 5,539,880 A | 7/1996 | Lakhani |
| 5,541,638 A | 7/1996 | Story |
| 5,541,738 A | 7/1996 | Mankovitz |
| 5,548,338 A | 8/1996 | Ellis et al. |
| 5,550,576 A | 8/1996 | Klosterman |
| 5,550,825 A | 8/1996 | McMullan, Jr. et al. |
| 5,557,338 A | 9/1996 | Maze et al. |
| 5,559,548 A | 9/1996 | Davis et al. |
| 5,559,549 A | 9/1996 | Hendricks et al. |
| 5,568,272 A | 10/1996 | Levine |
| 5,574,778 A | 11/1996 | Ely et al. |
| 5,576,755 A | 11/1996 | Davis et al. |
| 5,583,560 A | 12/1996 | Florin et al. |
| 5,583,561 A | 12/1996 | Baker et al. |
| 5,583,563 A | 12/1996 | Wanderscheid et al. |
| 5,583,653 A | 12/1996 | Timmermans |
| 5,585,838 A | 12/1996 | Lawler et al. |
| 5,585,858 A | 12/1996 | Harper et al. |
| 5,589,892 A | 12/1996 | Knee et al. |
| 5,592,551 A | 1/1997 | Lett et al. |
| 5,594,509 A | 1/1997 | Florin et al. |
| 5,594,779 A | 1/1997 | Goodman |
| 5,596,361 A | 1/1997 | Martinez |
| 5,600,364 A | 2/1997 | Hendricks et al. |
| 5,602,582 A | 2/1997 | Wanderscheid et al. |
| 5,606,642 A | 2/1997 | Stautner et al. |
| 5,616,876 A | 4/1997 | Cluts |
| 5,619,247 A | 4/1997 | Russo |
| 5,619,249 A | 4/1997 | Billock et al. |
| 5,619,274 A | 4/1997 | Roop et al. |
| 5,623,613 A | 4/1997 | Rowe et al. |
| 5,625,678 A | 4/1997 | Blomfield-Brown |
| 5,629,733 A | 5/1997 | Youman et al. |
| 5,629,867 A | 5/1997 | Goldman |
| 5,630,119 A | 5/1997 | Aristides et al. |
| 5,631,995 A | 5/1997 | Weissensteiner et al. |
| 5,632,007 A | 5/1997 | Freeman |
| 5,635,978 A | 6/1997 | Alten |
| 5,635,987 A | 6/1997 | Park et al. |
| 5,648,824 A | 7/1997 | Dunn et al. |
| 5,652,613 A | 7/1997 | Lazarus et al. |
| 5,654,748 A | 8/1997 | Matthews, III |
| 5,654,886 A | 8/1997 | Zereski, Jr. et al. |
| 5,657,072 A | 8/1997 | Aristides et al. |
| 5,657,414 A | 8/1997 | Lett et al. |
| 5,659,367 A | 8/1997 | Yuen |
| 5,666,645 A | 9/1997 | Thomas et al. |
| 5,666,646 A | 9/1997 | McCollum |
| 5,675,743 A | 10/1997 | Mavity |
| 5,684,525 A | 11/1997 | Klosterman |
| 5,694,163 A | 12/1997 | Harrison |
| 5,694,381 A | 12/1997 | Sako |
| 5,696,765 A | 12/1997 | Safadi |
| 5,699,107 A | 12/1997 | Lawler et al. |
| 5,708,961 A | 1/1998 | Hylton et al. |
| 5,710,601 A | 1/1998 | Marshall et al. |
| 5,717,452 A | 2/1998 | Janin et al. |
| 5,721,829 A | 2/1998 | Dunn et al. |
| 5,724,091 A | 3/1998 | Freeman et al. |

| | | | | | |
|---|---|---|---|---|---|
| 5,727,060 A | 3/1998 | Young | 5,915,094 A | 6/1999 | Kouloheris et al. |
| 5,732,216 A | 3/1998 | Logan et al. | 5,916,303 A | 6/1999 | Scott |
| 5,734,119 A | 3/1998 | France et al. | 5,917,538 A | 6/1999 | Asamizuya |
| 5,734,719 A | 3/1998 | Tsevdos et al. | 5,917,835 A | 6/1999 | Barrett et al. |
| 5,742,443 A | 4/1998 | Tsao et al. | 5,920,702 A | 7/1999 | Bleidt et al. |
| 5,745,710 A | 4/1998 | Clanton, III et al. | 5,920,800 A | 7/1999 | Schäfer |
| 5,751,282 A | 5/1998 | Girard et al. | 5,922,045 A | 7/1999 | Hanson |
| 5,752,159 A | 5/1998 | Faust et al. | 5,922,048 A | 7/1999 | Emura |
| 5,752,160 A | 5/1998 | Dunn | 5,923,361 A | 7/1999 | Sutton, Jr. |
| 5,754,771 A | 5/1998 | Epperson et al. | 5,926,204 A | 7/1999 | Mayer |
| 5,758,257 A | 5/1998 | Herz et al. | 5,926,205 A | 7/1999 | Krause et al. |
| 5,758,258 A | 5/1998 | Shoff et al. | 5,926,624 A | 7/1999 | Katz et al. |
| 5,758,259 A | 5/1998 | Lawler | 5,928,327 A | 7/1999 | Wang et al. |
| 5,760,821 A | 6/1998 | Ellis et al. | 5,929,850 A | 7/1999 | Broadwin et al. |
| 5,768,528 A | 6/1998 | Stumm | 5,930,473 A | 7/1999 | Teng et al. |
| 5,771,435 A | 6/1998 | Brown | 5,930,493 A | 7/1999 | Ottesen et al. |
| 5,774,170 A | 6/1998 | Hite et al. | 5,931,901 A | 8/1999 | Wolfe et al. |
| 5,778,182 A | 7/1998 | Cathey et al. | 5,933,603 A | 8/1999 | Vahalia et al. |
| 5,778,187 A | 7/1998 | Monteiro et al. | 5,933,835 A | 8/1999 | Adams et al. |
| 5,781,226 A | 7/1998 | Sheehan | 5,935,206 A | 8/1999 | Dixon et al. |
| 5,781,227 A | 7/1998 | Goode et al. | 5,936,569 A | 8/1999 | Ståhle et al. |
| 5,790,198 A | 8/1998 | Roop et al. | 5,940,071 A | 8/1999 | Treffers et al. |
| 5,790,202 A | 8/1998 | Kummer et al. | 5,940,073 A | 8/1999 | Klosterman et al. |
| 5,790,423 A | 8/1998 | Lau et al. | 5,940,572 A | 8/1999 | Balaban et al. |
| 5,793,412 A | 8/1998 | Asamizuya | 5,943,046 A | 8/1999 | Cave et al. |
| 5,793,971 A | 8/1998 | Fujita et al. | 5,943,047 A | 8/1999 | Suzuki |
| 5,794,217 A | 8/1998 | Allen | 5,945,987 A | 8/1999 | Dunn |
| 5,796,952 A | 8/1998 | Davis et al. | 5,947,746 A | 9/1999 | Tsai |
| 5,801,787 A | 9/1998 | Schein et al. | 5,949,411 A | 9/1999 | Doerr et al. |
| 5,802,284 A | 9/1998 | Karlton et al. | 5,949,954 A | 9/1999 | Young et al. |
| 5,805,154 A | 9/1998 | Brown | 5,956,482 A | 9/1999 | Agraharam et al. |
| 5,805,763 A | 9/1998 | Lawler et al. | 5,959,592 A | 9/1999 | Petruzzelli |
| 5,805,804 A | 9/1998 | Laursen et al. | 5,959,659 A | 9/1999 | Dokic |
| 5,805,806 A | 9/1998 | McArthur | 5,963,202 A | 10/1999 | Polish |
| 5,808,608 A | 9/1998 | Young et al. | 5,963,264 A | 10/1999 | Jackson |
| 5,808,694 A | 9/1998 | Usui et al. | 5,964,455 A | 10/1999 | Catanzarite et al. |
| 5,809,204 A | 9/1998 | Young et al. | 5,969,714 A | 10/1999 | Butcher |
| 5,809,246 A | 9/1998 | Goldman | 5,969,748 A | 10/1999 | Casement et al. |
| 5,812,123 A | 9/1998 | Rowe et al. | 5,973,680 A | 10/1999 | Ueda |
| 5,812,205 A | 9/1998 | Milnes et al. | 5,973,722 A | 10/1999 | Wakai et al. |
| 5,812,937 A | 9/1998 | Takahisa et al. | 5,974,217 A | 10/1999 | Haraguchi |
| 5,815,146 A | 9/1998 | Youden et al. | 5,974,222 A | 10/1999 | Yuen et al. |
| 5,818,438 A | 10/1998 | Howe et al. | 5,977,963 A | 11/1999 | Gaughan et al. |
| 5,819,019 A | 10/1998 | Nelson | 5,977,964 A | 11/1999 | Williams et al. |
| 5,819,156 A | 10/1998 | Belmont | 5,978,567 A | 11/1999 | Rebane et al. |
| 5,819,160 A | 10/1998 | Foladare et al. | 5,978,843 A | 11/1999 | Wu et al. |
| 5,822,530 A * | 10/1998 | Brown ............ 725/96 | 5,986,650 A | 11/1999 | Ellis et al. |
| 5,828,945 A | 10/1998 | Klosterman | 5,987,213 A | 11/1999 | Mankovitz et al. |
| RE35,954 E | 11/1998 | Levine | 5,990,881 A | 11/1999 | Inoue et al. |
| 5,838,314 A | 11/1998 | Neel et al. | 5,995,155 A | 11/1999 | Schindler et al. |
| 5,841,979 A | 11/1998 | Schulhof et al. | 5,999,970 A | 12/1999 | Krisbergh et al. |
| 5,844,620 A | 12/1998 | Coleman et al. | 6,002,394 A | 12/1999 | Schein et al. |
| 5,850,218 A | 12/1998 | LaJoie et al. | 6,002,720 A | 12/1999 | Yurt et al. |
| 5,859,641 A * | 1/1999 | Cave ............ 715/835 | 6,005,564 A | 12/1999 | Ahmad et al. |
| 5,861,906 A | 1/1999 | Dunn et al. | 6,005,600 A | 12/1999 | Hill |
| 5,867,483 A | 2/1999 | Ennis et al. | 6,009,465 A | 12/1999 | Decker et al. |
| 5,880,768 A | 3/1999 | Lemmons et al. | 6,012,089 A | 1/2000 | Hasegawa |
| 5,881,245 A | 3/1999 | Thompson | 6,012,091 A | 1/2000 | Boyce |
| 5,884,028 A | 3/1999 | Kindell et al. | 6,014,184 A | 1/2000 | Knee et al. |
| 5,886,707 A | 3/1999 | Berg | 6,014,381 A | 1/2000 | Troxel et al. |
| 5,886,732 A | 3/1999 | Humpleman | 6,014,693 A | 1/2000 | Ito et al. |
| 5,887,243 A | 3/1999 | Harvey et al. | 6,014,694 A | 1/2000 | Aharoni et al. |
| 5,892,915 A | 4/1999 | Duso et al. | 6,014,706 A | 1/2000 | Cannon et al. |
| 5,894,589 A | 4/1999 | Reber et al. | 6,018,359 A | 1/2000 | Kermode et al. |
| 5,896,414 A | 4/1999 | Meyer et al. | 6,018,765 A | 1/2000 | Durana et al. |
| 5,898,441 A | 4/1999 | Flurry | 6,020,912 A | 2/2000 | De Lang |
| 5,898,456 A | 4/1999 | Wahl | 6,022,223 A | 2/2000 | Taniguchi et al. |
| 5,899,582 A | 5/1999 | DuLac | 6,023,725 A | 2/2000 | Ozawa et al. |
| 5,900,904 A | 5/1999 | Okada et al. | 6,025,868 A | 2/2000 | Russo |
| 5,903,234 A | 5/1999 | Kimura | 6,028,600 A | 2/2000 | Rosin et al. |
| 5,903,263 A | 5/1999 | Emura | 6,029,064 A | 2/2000 | Farris et al. |
| 5,903,264 A | 5/1999 | Moeller et al. | 6,038,367 A | 3/2000 | Abecassis |
| 5,905,522 A | 5/1999 | Lawler | 6,038,591 A | 3/2000 | Wolfe et al. |
| 5,905,847 A | 5/1999 | Kobayashi et al. | 6,052,145 A | 4/2000 | Macrae et al. |
| 5,909,638 A | 6/1999 | Allen | 6,057,890 A | 5/2000 | Virden et al. |
| 5,911,046 A | 6/1999 | Amano | 6,058,242 A | 5/2000 | Kim |
| 5,913,039 A | 6/1999 | Nakamura et al. | 6,081,291 A | 6/2000 | Ludwig, Jr. |
| 5,914,941 A | 6/1999 | Janky | 6,091,883 A | 7/2000 | Artigalas et al. |
| 5,915,090 A | 6/1999 | Joseph et al. | 6,091,884 A | 7/2000 | Yuen et al. |

| | | | | | | |
|---|---|---|---|---|---|---|
| RE36,801 E | 8/2000 | Logan et al. | | EP | 0 051 228 | 5/1982 |
| 6,133,910 A | 10/2000 | Stinebruner | | EP | 0337336 | 10/1989 |
| 6,141,488 A | 10/2000 | Knudson et al. | | EP | 393955 | 10/1990 |
| 6,154,771 A | 11/2000 | Rangan et al. | | EP | 0424 469 | 5/1991 |
| 6,157,377 A * | 12/2000 | Shah-Nazaroff et al. ..... 715/719 | | EP | 0 444 496 | 9/1991 |
| 6,157,413 A | 12/2000 | Hanafee et al. | | EP | 0 447 968 | 9/1991 |
| 6,160,546 A | 12/2000 | Thompson et al. | | EP | 0 488 379 | 6/1992 |
| 6,163,316 A | 12/2000 | Killian | | EP | 0 535 749 | 4/1993 |
| 6,177,931 B1 | 1/2001 | Alexander et al. | | EP | 0 572 090 | 12/1993 |
| 6,184,876 B1* | 2/2001 | Miller ........................ 715/235 | | EP | 0 624 039 | 11/1994 |
| 6,185,360 B1 | 2/2001 | Inoue et al. | | EP | 0 662 771 | 7/1995 |
| 6,185,736 B1 | 2/2001 | Ueno | | EP | 0 682 452 | 11/1995 |
| 6,208,335 B1 | 3/2001 | Gordon et al. | | EP | 0 711 076 | 5/1996 |
| 6,208,799 B1 | 3/2001 | Marsh et al. | | EP | 0 725 539 | 8/1996 |
| 6,233,389 B1 | 5/2001 | Barton et al. | | EP | 0 758 833 | 2/1997 |
| 6,240,460 B1 | 5/2001 | Mitsutake et al. | | EP | 0 763 938 | 3/1997 |
| 6,275,648 B1 | 8/2001 | Knudson et al. | | EP | 0 424 469 | 5/1997 |
| 6,314,575 B1 | 11/2001 | Billock et al. | | EP | 0 836 320 | 4/1998 |
| 6,323,911 B1 | 11/2001 | Schein | | EP | 0 854 645 | 7/1998 |
| 6,324,338 B1 | 11/2001 | Wood et al. | | EP | 0 874 524 | 10/1998 |
| 6,327,418 B1 | 12/2001 | Barton et al. | | EP | 0 924 927 | 6/1999 |
| 6,348,932 B1 | 2/2002 | Nishikawa | | EP | 0 940 983 | 9/1999 |
| 6,388,714 B1 | 5/2002 | Schein | | EP | 0 944 253 | 9/1999 |
| 6,430,358 B1 | 8/2002 | Yuen et al. | | EP | 0 986 046 | 3/2000 |
| 6,438,596 B1 | 8/2002 | Ueno et al. | | GB | 1 370 535 | 10/1974 |
| 6,442,332 B1 | 8/2002 | Knudson et al. | | GB | 2155713 | 9/1985 |
| 6,473,559 B1 | 10/2002 | Knudson et al. | | GB | 2210526 | 6/1989 |
| 6,490,722 B1 | 12/2002 | Barton et al. | | GB | 2217144 | 10/1989 |
| 6,505,348 B1 | 1/2003 | Knowles et al. | | GB | 2 227 622 | 8/1990 |
| 6,532,263 B2 | 3/2003 | Radha et al. | | GB | 2 229 595 | 9/1990 |
| 6,553,376 B1 | 4/2003 | Lewis et al. | | GB | 2 256 115 | 11/1992 |
| 6,564,005 B1 | 5/2003 | Berstis | | GB | 2 346 251 | 8/2000 |
| 6,611,958 B1 | 8/2003 | Shintani et al. | | JP | 60-061935 | 9/1985 |
| 6,681,396 B1 | 1/2004 | Bates et al. | | JP | 61-109379 | 5/1986 |
| 6,744,967 B2 | 6/2004 | Kaminski et al. | | JP | 61-227486 | 10/1986 |
| 6,757,907 B1* | 6/2004 | Schumacher et al. .......... 725/87 | | JP | 62-008389 | 1/1987 |
| 6,760,538 B1 | 7/2004 | Bumgardner et al. | | JP | 62-49528 | 3/1987 |
| 6,771,885 B1 | 8/2004 | Agnihotri et al. | | JP | 62-60384 | 3/1987 |
| 6,771,886 B1 | 8/2004 | Mendelsohn | | JP | 62-066493 | 3/1987 |
| 6,857,132 B1 | 2/2005 | Rakib et al. | | JP | 62-125077 | 6/1987 |
| 7,086,077 B2 | 8/2006 | Giammaressi | | JP | 62-198768 | 9/1987 |
| 7,088,910 B2 | 8/2006 | Potrebic et al. | | JP | 63-54884 | 3/1988 |
| 7,096,486 B1 | 8/2006 | Ukai et al. | | JP | 63-141467 | 6/1988 |
| 7,124,431 B2 | 10/2006 | Hanai et al. | | JP | 63-247812 | 10/1988 |
| 7,151,886 B2 | 12/2006 | Young et al. | | JP | 63-276069 | 11/1988 |
| 7,185,355 B1 | 2/2007 | Ellis et al. | | JP | 63-299582 | 12/1988 |
| 7,242,988 B1 | 7/2007 | Hoffberg et al. | | JP | 1-078328 | 3/1989 |
| 7,293,276 B2 | 11/2007 | Phillips et al. | | JP | 1-142918 | 6/1989 |
| 7,519,268 B2 | 4/2009 | Juen et al. | | JP | 1-150928 | 6/1989 |
| 7,600,246 B2 | 10/2009 | Taylor et al. | | JP | 1-209399 | 8/1989 |
| 2001/0037508 A1 | 11/2001 | Hindus et al. | | JP | 1-212986 | 8/1989 |
| 2002/0057893 A1 | 5/2002 | Wood et al. | | JP | 1-307944 | 12/1989 |
| 2002/0059599 A1 | 5/2002 | Schein et al. | | JP | 2-838892 | 12/1989 |
| 2002/0081096 A1 | 6/2002 | Watanabe et al. | | JP | 2-113318 | 4/1990 |
| 2002/0144279 A1 | 10/2002 | Zhou | | JP | 2-189753 | 7/1990 |
| 2002/0174430 A1 | 11/2002 | Ellis et al. | | JP | 60-61935 | 3/1994 |
| 2002/0174433 A1 | 11/2002 | Baumgartner et al. | | JP | 8-130517 | 5/1996 |
| 2002/0191954 A1 | 12/2002 | Beach et al. | | JP | 10-247344 | 9/1998 |
| 2003/0009766 A1 | 1/2003 | Marolda | | JP | 10-257400 | 9/1998 |
| 2003/0149988 A1 | 8/2003 | Ellis et al. | | JP | 2000-13708 | 1/2000 |
| 2003/0206719 A1 | 11/2003 | Bumgardner et al. | | JP | 2000-138886 | 5/2000 |
| 2004/0013409 A1 | 1/2004 | Beach et al. | | JP | 2000-224533 | 8/2000 |
| 2004/0103434 A1 | 5/2004 | Ellis et al. | | JP | 2000-235546 | 8/2000 |
| 2004/0181814 A1 | 9/2004 | Ellis et al. | | JP | 2000-306314 | 11/2000 |
| 2005/0044577 A1 | 2/2005 | Jerding et al. | | JP | 2001-88372 | 4/2001 |
| 2005/0071882 A1* | 3/2005 | Rodriguez et al. .............. 725/95 | | JP | 2001-165669 | 6/2001 |
| 2005/0097619 A1* | 5/2005 | Haddad ........................ 725/115 | | JP | 2001-167522 | 6/2001 |
| 2005/0198677 A1 | 9/2005 | Lewis | | JP | 2001-257950 | 9/2001 |
| 2005/0204388 A1 | 9/2005 | Knudson et al. | | TW | 247388 | 10/1994 |
| 2005/0240968 A1 | 10/2005 | Knudson et al. | | WO | WO 87/00884 | 2/1987 |
| 2005/0273819 A1 | 12/2005 | Knudson et al. | | WO | WO 88/04507 | 6/1988 |
| 2006/0140584 A1 | 6/2006 | Ellis et al. | | WO | WO 89/03085 | 4/1989 |
| | | | | WO | WO 89/12370 | 12/1989 |
| | FOREIGN PATENT DOCUMENTS | | | WO | WO 90/00847 | 1/1990 |
| DE | 3337204 | 4/1985 | | WO | WO 91/00670 | 1/1991 |
| DE | 3527939 | 2/1987 | | WO | WO 91/07050 | 5/1991 |
| DE | 3623924 | 2/1988 | | WO | WO 92/04801 | 3/1992 |
| DE | 3921847 | 1/1991 | | WO | WO 92/22983 | 12/1992 |
| DE | 4240187 | 6/1994 | | WO | WO 93/08542 | 4/1993 |

| | | |
|---|---|---|
| WO | WO 93/22877 | 11/1993 |
| WO | WO 93/23957 | 11/1993 |
| WO | WO 95/01058 | 1/1995 |
| WO | WO 95/15658 | 6/1995 |
| WO | WO 95/31069 | 11/1995 |
| WO | WO 95/32583 | 11/1995 |
| WO | WO 95/32584 | 11/1995 |
| WO | WO 95/32585 | 11/1995 |
| WO | WO 95/32587 | 11/1995 |
| WO | WO 96/09721 | 3/1996 |
| WO | WO 96/17467 | 6/1996 |
| WO | WO 96/25821 | 8/1996 |
| WO | WO 96/26605 | 8/1996 |
| WO | WO 96/33572 | 10/1996 |
| WO | WO 96/34467 | 10/1996 |
| WO | WO 96/36172 | 11/1996 |
| WO | WO 96/37075 | 11/1996 |
| WO | WO 96/41472 | 12/1996 |
| WO | WO 96/41478 | 12/1996 |
| WO | WO 97/13368 | 4/1997 |
| WO | WO 97/21291 | 6/1997 |
| WO | WO 97/32434 | 9/1997 |
| WO | WO 97/34413 | 9/1997 |
| WO | WO 97/34414 | 9/1997 |
| WO | WO 97/37500 | 10/1997 |
| WO | WO 97/42763 | 11/1997 |
| WO | WO 97/46016 | 12/1997 |
| WO | WO 97/46943 | 12/1997 |
| WO | WO 97/47124 | 12/1997 |
| WO | WO 97/48228 | 12/1997 |
| WO | WO 97/48230 | 12/1997 |
| WO | WO 97/49237 | 12/1997 |
| WO | WO 98/01995 | 1/1998 |
| WO | WO 98/06219 | 2/1998 |
| WO | WO 98/07277 | 2/1998 |
| WO | WO 98/10589 | 3/1998 |
| WO | WO 98/12872 | 3/1998 |
| WO | WO 98/17033 | 4/1998 |
| WO | WO 98/17064 | 4/1998 |
| WO | WO 98/18260 | 4/1998 |
| WO | WO 98/19459 | 5/1998 |
| WO | WO 98/26528 | 6/1998 |
| WO | WO 98/26584 | 6/1998 |
| WO | WO 98/26596 | 6/1998 |
| WO | WO 98/31115 | 7/1998 |
| WO | WO 98/31116 | 7/1998 |
| WO | WO 98/34405 | 8/1998 |
| WO | WO 98/38831 | 9/1998 |
| WO | WO 98/47279 | 10/1998 |
| WO | WO 98/48566 | 10/1998 |
| WO | WO 99/03267 | 1/1999 |
| WO | WO 99/04561 | 1/1999 |
| WO | WO 99/11060 | 3/1999 |
| WO | WO 99/12320 | 3/1999 |
| WO | WO 99/27681 | 6/1999 |
| WO | WO 99/28897 | 6/1999 |
| WO | WO 99/39466 | 8/1999 |
| WO | WO 99/45700 | 9/1999 |
| WO | WO 99/52279 | 10/1999 |
| WO | WO 99/56473 | 11/1999 |
| WO | WO 99/60790 | 11/1999 |
| WO | WO 99/65244 | 12/1999 |
| WO | WO 99/66725 | 12/1999 |
| WO | WO 00/04706 | 1/2000 |
| WO | WO 00/05885 | 2/2000 |
| WO | WO 00/07368 | 2/2000 |
| WO | WO 00/08850 | 2/2000 |
| WO | WO 00/08851 | 2/2000 |
| WO | WO 00/08852 | 2/2000 |
| WO | WO 00/11869 | 3/2000 |
| WO | WO 00/16548 | 3/2000 |
| WO | WO 00/28739 | 5/2000 |
| WO | WO 00/33560 | 6/2000 |
| WO | WO 00/58833 | 10/2000 |
| WO | WO 00/58967 | 10/2000 |
| WO | WO 00/59214 | 10/2000 |
| WO | WO 00/59223 | 10/2000 |
| WO | WO 00/62298 | 10/2000 |
| WO | WO 00/62299 | 10/2000 |
| WO | WO 00/62533 | 10/2000 |
| WO | WO 00/67475 | 11/2000 |
| WO | WO 01/01677 | 1/2001 |
| WO | WO 01/01689 | 1/2001 |
| WO | WO 01/22729 | 3/2001 |
| WO | WO 01/35662 | 5/2001 |
| WO | WO 01/46843 | 6/2001 |
| WO | WO 01/47238 | 6/2001 |
| WO | WO 01/47249 | 6/2001 |
| WO | WO 01/47257 | 6/2001 |
| WO | WO 01/47273 | 6/2001 |
| WO | WO 01/47279 | 6/2001 |
| WO | WO 01/50743 | 7/2001 |
| WO | WO 01/76239 | 10/2001 |
| WO | WO 01/76248 | 10/2001 |
| WO | WO 02/078317 | 10/2002 |

OTHER PUBLICATIONS

"DIRECTV Receiver with TiVo Viewer's Guide" (1999, 2000).
"DIRECTV Receiver with TiVo Installation Guide," Philips (2000).
"PTV Recorder Setup Guide," Philips (2000).
"DishPro Satellite System—User's Guide," Dish Network (undated).
DIRECTV Receiver with TiVo Digital Satellite Receiver Recorder SAT-T60—Installation Guide Corporation (2000).
"DIRECTV Digital Satellite Receiver—Operating Instructions," Sony Electronics Inc. (2001).
"Fall 2001 TiVo Service Update with Dual Tuner!," TiVo Inc. (2001).
"RCA Satellite Receiver User's Guide," Thomson multimedia Inc. (2001).
"DIRECTV Receiver—Owner's Manual," DIRECTV, Inc. (2002).
"Advanced Analog Systems—Addressable Terminals," General Instrument Corp. of Horsham, Pennsylvania, (http//www.gi.com/BUSAREA/ANALOG/TERMINAL/WATCH/watch.html), printed from the internet on Mar. 4, 1999.
User's Guide RCA Color TV with TV Plus + Guide, 1997.
James, A., "Oracle-Broadcasting the Written Word," Wireless World, Jul. 1973.
Edwardson et al., "CEEFAX: A Proposed New Broadcasting Service," SMPTE Journal, Jan. 1974, vol. 83, pp. 14-19.
Edmonson et al., "NBC Switching Central," SMPTE Journal, Oct. 1976, vol. 85, No. 10, pp. 795-805.
Roizen, Joseph, "Teletext in USA," Jul. 1981, pp. 602-610.
Hoffman et al., "Videotext Programmiert Videorecorder," Sep. 1982, 9 pages.
Printed materials on "Time's Teletext Service," 1982-1983, pp. V79175, V79142, V79143, V79148, and V79151.
Symposium Record Broadcast Sessions, 14th International TV Symposium, Montreux, Switzerland, Jun. 6-12, 1985, 9 pages.
Von Gerhard Eitz and Karl-Ulrich Oberlies, "Videotext Programmiert Videoheimgerate (VPV)," Sep. 1986, pp. 223-229; translation of abstract included.
Kruger, H. Eckart, "Digital Video Identification System VIS," German, 9 pages, 1982.
Ziesel et al.; "An Interactive Menu-Driven Remote Control Unite for TV-Receivers and VC-Recorders," IEEE Transactions on Consumer Electronics, Aug. 1988, vol. 34, No. 3, pp. 814-818.
Philips Consumer Electronics, Users Manual, Matchline 28DC2070, 33DC2080; obtained Mar. 31, 2009.
Page 12 of Philips TV 21SL5756/00B User Manual; obtained Mar. 31, 2009.
TV Guide, San Francisco Metropolitan Schedule, Feb. 6, 1989.
Systems as described in DIP II Advertisement "Program Listings Never Looked So Good", English Translation of A. Bismuth, vol. 54, No. 3, pp. 46-50, Feb. 8, 2005.
System as described in Cable Data Advertisement "There's more to one-way addressability than meets the eye"; vol. 7, No. 30, Apr. 15, 1982.
CableData brochure, "A New Approach to Addressability" (undated).
"Addressable Converters: A New Development at CableData," Via Cable, vol. 1, No. 12 (Dec. 1981).
Hofmann, et al., "Videotext Programmiert Videorecorder," Rundfunktechnische Mitteilungen, Nov.-Dec. 1982, pp. 254-257 (translation abstract attached).

Sorce, J. et al., "Designing a Broadband Residential Entertainment Service: A Case Study," 13th International Symposium Human Factors in Telecommunications, Torino, Italy, Sep. 10-14, 1990 pp. 141-148.

BrugLiera, V. "Digital On-Screen Display—A New Technology for the Consumer Interface," Symposium Record Cable Sessions, 18th International Television Symposium and Technical Exhibition, Montreux, Switzerland Jun. 10-15, 1993, pp. 571-586 (Jun. 11, 1993).

Miller, M. D. "A Scenario for the Deployment of Interactive Multimedia Cable Television Systems in the United States in the 1990's," Proceedings of the IEEE, vol. 82, No. 4, pp. 585-589 (Apr. 1994).

Chang, Y., et al., "An Open-Systems Approach to Video on Demand," IEEE Communications Magazine, vol. 32, No. 5 pp. 68-80 (May 1994).

"Electronic Programme Guide (EPG); Protocol for a TV Guide using electronic data transmission" by European Telecommunication Standards Institute, May 1997, Valbonne, France, publication No. ETS 300 707.

Article: "Windows 98 Feature Combines TV, Terminal and the Internet", New York Times, Aug. 18, 1998.

The New York Times Website Article, "2 Makers Plan Introductions of Digital VCR", by John Markoff, Mar. 29, 1999.

David M. Rudnick, U.S. Appl. No. 09/283,681, filed Apr. 1, 1999, entitled Interactive Television Program Guide System Having Graphic Arrangements of Program Event Regions.

Patent abstract for Japanese patent JP Publication No. 11 032272, Patent Abstracts of Japan, vol. 1999, No. 5, Feb. 2, 1999.

Patent abstract for Japanese patent JP Publication No. 11 205711, Patent Abstracts of Japan, vol. 1999, No. 12, Jul. 30, 1999.

"Digital Video Broadcasting (DVB); DVB specification for data broadcasting", European Telecommunications Standards Institute, Draft EN 301 192 V1.2.1 (Jan. 1999).

\* cited by examiner

SYSTEMS AND METHODS FOR MANAGING THE DISTRIBUTION OF ON-DEMAND MEDIA

This application is a continuation of U.S. application Ser. No. 09/973,976, filed Oct. 9, 2001, which claims the benefit of U.S. provisional patent application Nos. 60/239,522, filed Oct. 11, 2000, 60/252,171, filed Nov. 20, 2000, and 60/270,351, filed Feb. 21, 2001, which are hereby incorporated by reference herein in their entireties.

BACKGROUND OF THE INVENTION

This invention relates to on-demand media in an interactive television application, and more particularly, to systems and methods for managing the distribution of on-demand media in an interactive television application.

On-demand media, such as audio selections, video selections, electronic publications, electronic games, and software applications, are available to a user upon request. On-demand media is often requested for immediate distribution to the user's home equipment. The distribution of the on-demand media occurs at a certain bandwidth associated with the media. However, if the user's request for on-demand media requires more bandwidth than is currently available, the user's request can be rejected.

In view of the foregoing, it would be beneficial to manage the distribution of on-demand media to avoid rejecting a user's request for the media.

SUMMARY OF THE INVENTION

In view of the foregoing, it is an object of the present invention to manage the distribution of on-demand media in an interactive television application.

This and other objects of the invention are accomplished in accordance with the principles of the present invention by providing systems and methods for managing the distribution of on-demand media in an interactive television application. On-demand media may include, for example, audio selections, video selections, electronic publications (e.g., books, magazines, newspapers, or any other suitable electronic publications), electronic games, software applications, or any other suitable on-demand media. Illustrative video-on-demand interface features for use in accordance with some embodiments of the present invention are described, for example, in U.S. provisional patent application Nos. 60/252,171, filed Nov. 20, 2000 and 60/270,351, filed Feb. 21, 2001, which are hereby incorporated by reference herein in their entireties.

In some embodiments, the interactive television application may receive a request for on-demand media from a user. The interactive television application may associate the on-demand media with a suggested bandwidth for transmission of the on-demand media to the user. The interactive television application may determine an available bandwidth, such as the bandwidth that is available for the transmission of the on-demand media to the user. A television distribution facility may make a comparison between the suggested bandwidth and the available bandwidth. Based at least partially on the comparison of the suggested bandwidth and the available bandwidth, the interactive television application may provide an option to the user for the transmission of the on-demand media. In one suitable approach, the interactive television application may provide an option to request a reduced-bandwidth version of the on-demand media to the user. In another suitable approach, the interactive television application may provide an option to schedule a future time for presentation of the on-demand media to the user. In yet another suitable approach, the interactive television application may provide an option to download the on-demand media to a recording device to the user. In a further suitable approach, the interactive television application may provide an option to check the availability of the on-demand media to the user. The user may be offered a reduced price for the on-demand media.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
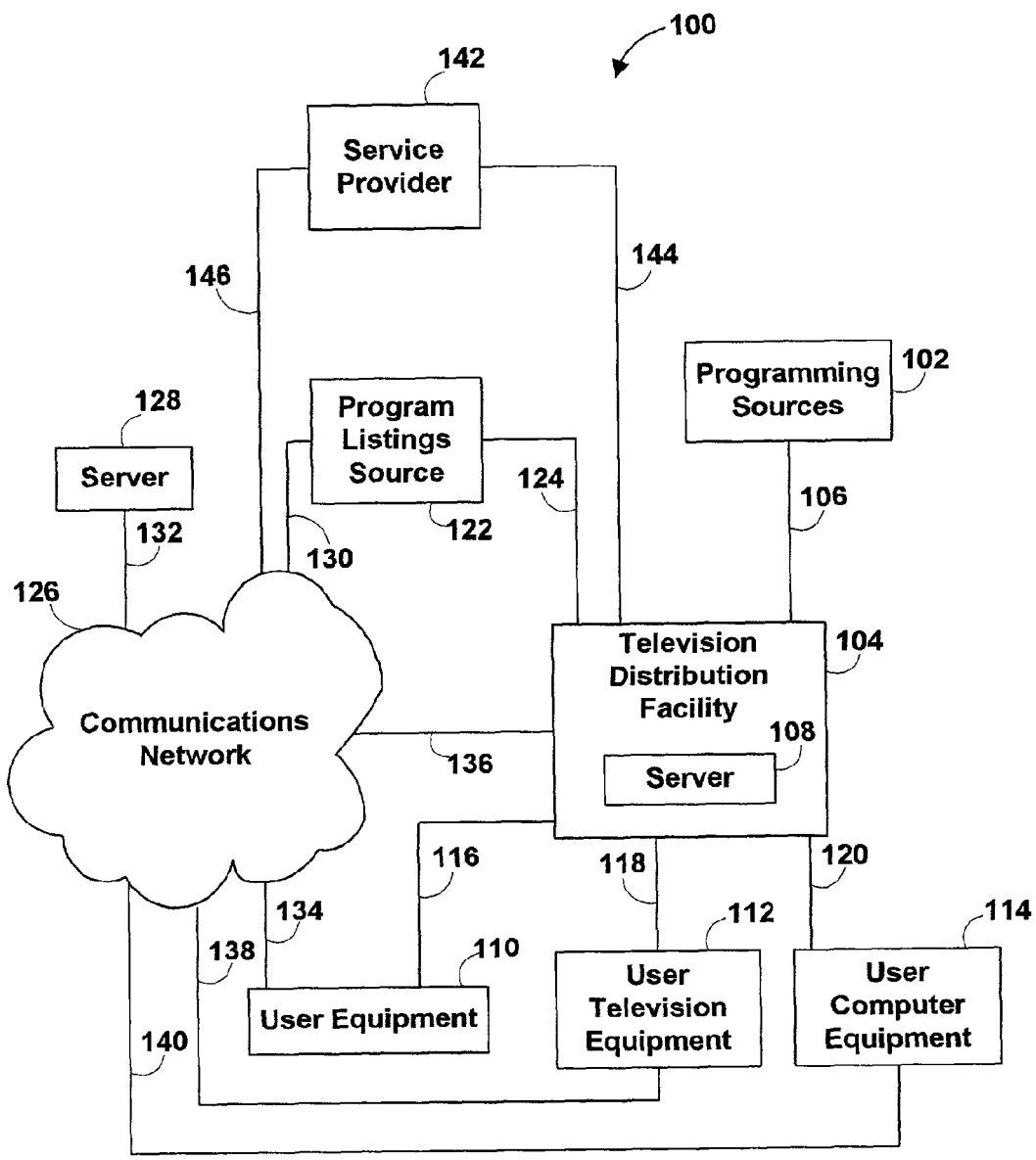
FIG. 1 is a diagram of an illustrative interactive television system in accordance with one embodiment of the present invention.

An illustrative interactive television system 100 in accordance with the present invention is shown in FIG. 1. Television programming and digital music may be provided by programming sources 102 to television distribution facilities such as a television distribution facility 104 using a communications path 106. Programming sources 102 may be any suitable sources of television and music programming, such as television and music production studios. Programming sources 102 may provide programming that is to be broadcast according to a schedule. The schedule may be published in advance.

Video-on-demand programming may be provided using remote servers such as a server 108 or using any other suitable video-on-demand equipment. Servers such as server 108 or other video-on-demand equipment may be located at network nodes associated with television distribution facility 104 or any other suitable location.

Examples of client-server program guides are shown in Ellis et al. U.S. patent application Ser. No. 09/332,244, filed Jun. 11, 1999, which is hereby incorporated by reference herein in its entirety. Remote servers may be used to record programming for selective presentation to users.

Television distribution facility 104 may be a cable system headend, a satellite television distribution facility, a television broadcast facility, or any other suitable facility for distributing video-on-demand content, television, and music programming to users. There are typically numerous television distribution facilities 104 in system 100, but only one is shown in FIG. 1 to avoid over complicating the drawing.

Communications path 106 may be a satellite path, a fiber-optic path, a cable path, any other suitable wired or wireless communications path, or a combination of such paths.

Television distribution facility 104 may be connected to various user equipment 110. Such user equipment 110 may be, for example, located in the homes of users. The user equipment, such as user equipment 110, user television equipment 112, and user computer equipment 114, may receive television and music programming, video-on-demand programs, and other information from television distribution facility 104 over communications paths such as communications paths 116, 118, and 120, respectively. User equipment 110, user television equipment 112, and user computer equipment 114 may also transmit signals to television distribution facility 104 over communications paths 116, 118, and 120, respectively. Communications paths 116, 118, and 120 may be cables or other wired connections, free-space connections (e.g., for broadcast or other wireless signals), satellite links, any other suitable communications path, or a combination of such paths.

A program listings source 122 may be used to provide a user with television program listings information such as scheduled broadcast times, titles, channels, ratings information (e.g., parental ratings and critics' ratings), detailed title descriptions, genre or category information (e.g., sports, news, movies, or any other suitable genre or category information), information on actors and actresses, running times, available video-on-demand programming, or any other suitable program listings information.

Program listings source 122 may provide program listings information to television distribution facility 104 over a communications path 124 for distribution to the associated user equipment over communications paths 116, 118, and 120. Communications path 124 may be any suitable communications path such as a satellite communications path or other wireless path, a fiber-optic path or other wired communications path, any other suitable path, or a combination of such paths.

User equipment devices such as user television equipment 112 and user computer equipment 114 may use the program listings information to display program listings and information for the user for television programming, video-on-demand programming, audio-on-demand programming, personal video recorder (PVR) programming, or any other suitable programming. An interactive television program guide application or other suitable application may be used to display such information on a display.

An on-line program guide may be provided by a server connected to a communications network 126 such as a server 128. Server 128 may receive program listings information from program listings source 122 via a communications path 130, communications network 126, and a communications path 132. Communications paths 130 and 132 may be satellite paths, fiber-optic paths, wired paths, any other suitable paths, or a combination of such paths. Communications network 126 may be any suitable communications network, such as the Internet, the public switched telephone network, a packet-based network, or any other suitable network.

User equipment 110 may access the on-line program guide via a communications path 134, which may be any suitable communications path such as a wired path, cable path, fiber-optic path, satellite path, a combination of such paths, or any other suitable path. User equipment 110 may also access the on-line program guide via communications path 116, television distribution facility 104, and a communications path 136. For example, a cable modem or the like may be used by user equipment 110 to communicate with television distribution facility 104. Television distribution facility 104 may communicate with communications network 126 over communications path 136. Communications path 136 may be a wired path, cable path, fiber-optic path, satellite path, any other suitable path, or a combination of such paths.

User equipment such as user television equipment 112 and user computer equipment 114 may access the on-line program guide using similar arrangements. User television equipment 112 may access the on-line program guide using a communications path 138. In another suitable approach, user television equipment 112 may access the on-line program guide using communications path 118, television distribution facility 104, and communications path 136. User computer equipment 114 may access the on-line program guide using a communications path 140. In another suitable approach, user computer equipment 114 may access the on-line program guide using communications path 120, television distribution facility 104, and communications path 136. Communications paths 138 and 140 may be any suitable paths, such as wired paths, wireless paths, cable paths, fiber-optic paths, satellite paths, any other suitable paths, or a combination of such paths.

Interactive television applications other than program guide applications may use service providers such as a service provider 142. For example, a home shopping service may be supported by a service provider such as service provider 142 that has sales representatives, order fulfillment facilities, account maintenance facilities, and other equipment for supporting interactive home shopping features. A home shopping application that is implemented using user equipment (e.g., user equipment 110, user television equipment 112, and user computer equipment 114) may be used to access service provider 142 to provide these features to the user. The user equipment may access service provider 142 via television distribution facility 104 and a communications path 144. In another suitable approach, the user equipment may access service provider 142 via communications network 126 and a communications path 146. Communications paths such as communications paths 144 and 146 may be any suitable paths, such as wired paths, cable paths, fiber-optic paths, satellite paths, any other suitable paths, or a combination of such paths.

Another example of an interactive television application is a home banking application. A home banking service may be supported using personnel at facilities such as service provider 142. An interactive home banking application that is implemented using user equipment (e.g., user equipment 110, user television equipment 112, and user computer equipment 114) may access the home banking service via television distribution facility 104 and communications path 144. In another suitable approach, the user equipment may access the home banking service via communications network 126 and communications path 146.

Applications such as an interactive television program guide application, a home shopping application, a home banking application, and other applications (e.g., applications related to e-mail, chat, or any other communications functions) may be provided as separate applications that are accessed through a navigation shell application (i.e., a menu application with menu options corresponding to the applications). The features of such applications may be combined. For example, video-on-demand, home shopping, and communications functions may be incorporated into the program guide or other application.

Moreover, home banking, home shopping, video-on-demand, communications, and navigation are only a few illustrative examples of the types of interactive television application features that may be supported by interactive television system 100. Other suitable services that may be supported include news services, Internet services, interactive wagering services (e.g., for wagering on horse races and the like), or any other suitable service.

These applications or features may be implemented locally on user equipment 110, user television equipment 112, or user computer equipment 114. The applications or features may also be implemented using a client-server architecture in which user equipment 110, user television equipment 112, or user computer equipment 114 serves as a client processor, and a server, such as server 108 at television distribution facility 104 or at any other suitable location, acts as a server processor. Other distributed architectures may be used.

Figure 2:
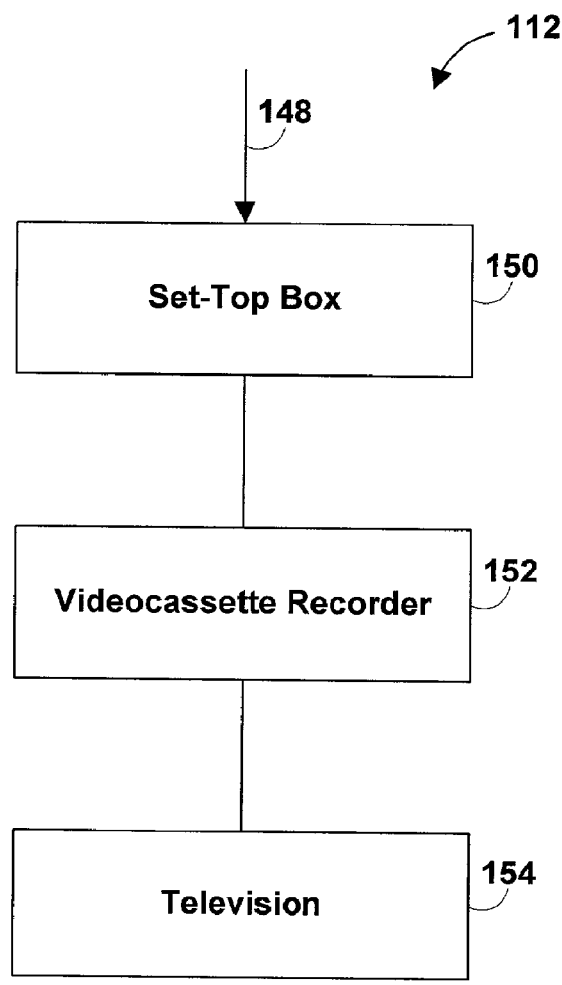
FIG. 2 is a diagram of illustrative user television equipment in accordance with one embodiment of the present invention.

FIG. 2 shows illustrative user television equipment 112 that is based on a set-top box arrangement. An input/output 148 may be connected to communications paths such as communications paths 118 and 138 of FIG. 1. Television programming, video-on-demand programming, audio-on-demand programming, and other information or programming may be received using input/output 148. Commands, requests, and other information from the user may also be transmitted over input/output 148.

A set-top box 150 may be any suitable analog or digital set-top box. Set-top box 150 may contain an analog tuner for tuning to a desired analog television channel. Set-top box 150 may contain digital decoding circuitry for receiving digital television, video-on-demand programming, and music channels. In one suitable approach, both analog and digital channels may be handled together. Video-on-demand programming may be provided using a digital television channel or any other suitable communications path.

Set-top box 150 may contain a processor, for example, a microcontroller or microprocessor, that is used to execute software applications. Set-top box 150 may contain memory such as random-access memory (RAM) for use when executing applications. Nonvolatile memory may be used, for example, to launch a boot-up routine or for other instructions. Hard disk storage may be used to back up data and to otherwise support larger databases than may be supported using RAM approaches.

Set-top box 150 may have infrared (IR) or other communications circuitry for communicating with a remote control. Set-top box 150 may have dedicated buttons and a front-panel display. The front-panel display may, for example, be used to display the current channel to which the set-top box is tuned.

Set-top box 150 may have communications circuitry such as a cable modem, an integrated services digital network (ISDN) modem, a digital subscriber line (DSL) modem, a telephone modem, or any other suitable communications circuitry for communication with other equipment. Such communication may involve the Internet or any other suitable communications networks or paths.

A videocassette recorder 152 or other suitable recording device may be connected to set-top box 150. This may allow videos from set-top box 150 to be recorded. For example, if set-top box 150 is tuned to a given television or video-on-demand channel, the video signal for that channel may be passed to videocassette recorder 152 for recording on a videocassette. In one suitable approach, videocassette recorder functions such as start, stop, record, or any other suitable function may be controlled by set-top box 150. For example, set-top box 150 may control videocassette recorder 152 using IR commands directed toward the remote control inputs of the videocassette recorder.

The output of videocassette recorder 152 may be provided to a television 154 for display to the user. If videocassette recorder 152 is not being used, the video signals from set-top box 150 may be provided directly to television 154. Any suitable monitor may be used to display the video.

Figure 3:
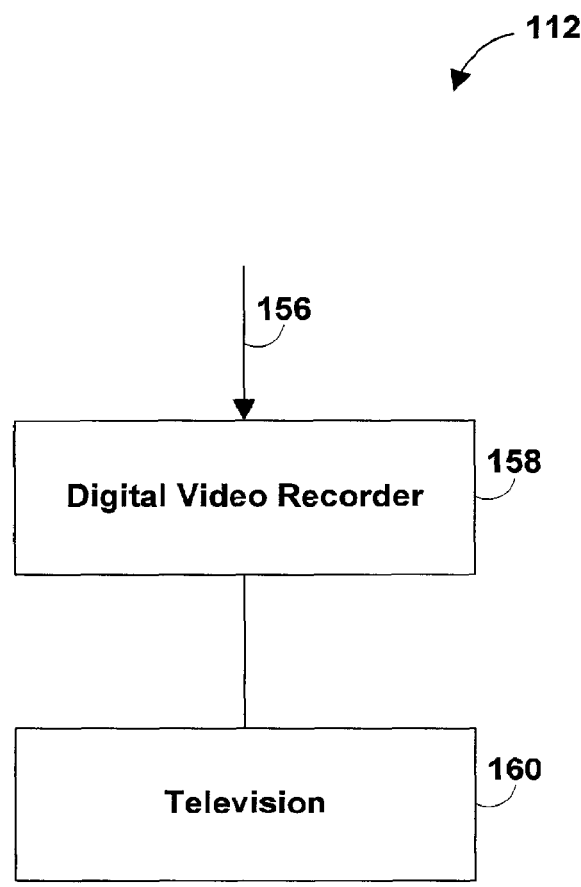
FIG. 3 is a diagram of additional illustrative user television equipment in accordance with one embodiment of the present invention.

FIG. 3 shows another illustrative arrangement for user television equipment 112. An input/output 156 may be connected to communications paths such as communications paths 118 and 138. Television programming, video-on-demand programming, audio-on-demand programming, and other information or programming may be received using input/output 156. Commands, requests, and other information from the user may be transmitted over input/output 156.

In the example of FIG. 3, user television equipment 112 includes a digital video recorder 158 (e.g., a personal video recorder (PVR)) and a television 160. Digital video recorder 158 may be similar to a standard set-top box, except that a hard disk or other suitable storage medium may be used for video storage in lieu of videocassettes. The hard disk may be internal to digital video recorder 158.

Digital video recorder 158 may contain circuitry for handling both analog and digital channels. For example, digital video recorder 158 may contain an analog tuner for tuning to a desired analog television channel. Digital video recorder 158 may contain circuitry for digitizing analog programming prior to storage of the programming and for decoding digitized programming upon playback of the programming. In another example, digital video recorder 158 may contain digital decoding circuitry for receiving digital television, video-on-demand programming, and music channels. Digital video recorder 158 may contain a processor, for example, a microcontroller or microprocessor, that is used to execute software applications. Digital video recorder 158 may contain memory such as RAM for use when executing applications. Nonvolatile memory may be used to store a boot-up routine or other instructions. The hard disk and other storage in digital video recorder 158 may be used to support databases, for example, program guide databases or interactive television application databases.

Digital video recorder 158 may have infrared communications circuitry or other suitable communications circuitry for communicating with a remote control. Digital video recorder 158 may have dedicated buttons and a front-panel display. The front-panel display may, for example, be used to display the current channel to which digital video recorder 158 is tuned.

Digital video recorder 158 may have communications circuitry such as a cable modem, an ISDN modem, a DSL modem, a telephone modem, or any other suitable communications circuitry for communication with other equipment. Such communication may involve the Internet or any other suitable communications networks or paths.

Digital video recorder 158 of FIG. 3 or set-top box 150 of FIG. 2 may be a satellite receiver or any other equipment that has wireless communications circuitry for receiving satellite signals.

Television programming and video-on-demand programs may be recorded on the hard disk of digital video recorder 158. Digital video recorder 158 may record new video while previously recorded video is being played back on a television 160. This may allow a user to press a pause button during normal television viewing. When the pause button is pressed, the current television program is stored on the hard disk of digital video recorder 158. When the user presses a play button, the recorded video may be played back. This arrangement allows the user to seamlessly pause and resume television viewing.

A personal video recorder may be provided using the hardware and software capabilities of digital video recorder 158. In one suitable approach, a personal video recorder may be provided wherein a client-server arrangement between user television equipment 112 and a server such as server 108 of FIG. 1 is used to record programs at the server. Programs recorded at the server may be played back upon a user's request from user television equipment 112. Examples of client-server arrangements in which programs may be recorded at the server by a user are shown in Ellis et al. U.S. patent application Ser. No. 09/332,244, incorporated by reference above. In one suitable approach, digital video recorder 158 or some other video recorder may be in a client-server arrangement or a command-controlled arrangement with user television equipment 112, such as a set-top box at a user's home, to provide a personal video recorder. Information for programs may be recorded with the programs. The recorded information may be the source of program listings information for displaying personal video recorder listings.

Examples of personal video recorders, for example, local or remote recorders, are illustratively described in Hassell et al. U.S. patent application Ser. No. 09/157,256, filed Sep. 17, 1998, and U.S. patent application Ser. No. 09/332,244, mentioned above, both of which are hereby incorporated by reference herein in their entireties.

The set-top box arrangement of FIG. 2 and the digital video recorder set-top box arrangement of FIG. 3 are merely illustrative. Other arrangements may be used. For example, user television equipment may be based on a WEBTV box, a personal computer television (PC/TV), or any other suitable television equipment arrangement. In one suitable approach, the functions of components such as set-top box 150, digital video recorder 158, a WEBTV box, PC/TV, or the like may be integrated into a televison or personal computer or other suitable device.

Figure 4:
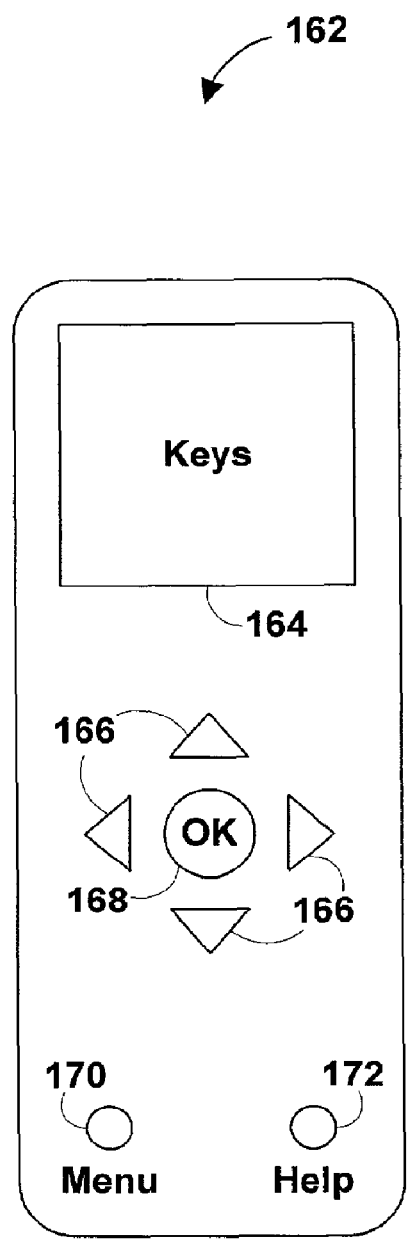
FIG. 4 is a diagram of an illustrative remote control in accordance with one embodiment of the present invention.

FIG. 4 shows an illustrative remote control 162 for operating user television equipment 112 of FIG. 1. Remote control 162 may have keys 164 such as channel up and down keys, a power on/off key, numeric keys, a favorites key (e.g., for setting favorites in a program guide application or other interactive television application), an info key (e.g., for requesting that additional information on a selection be displayed), or any other suitable keys. Arrow keys 166 may be used to position an on-screen cursor or highlight region on options of interest. Highlighted options may be selected using an OK key 168. A menu key 170 may be used to direct an interactive television application (e.g., a program guide application, a navigation shell application, or any other suitable application) to display a menu of available options. For example, a user of user equipment 110 of FIG. 1 (e.g., a user of user television equipment 112, a user of user computer equipment 114, or a user of any other suitable user equipment) may invoke an interactive television program guide menu by pressing menu key 170 or selecting an appropriate on-screen option from a menu or the like. A help key 172 may be used to invoke help functions such as context-sensitive on-screen help or any other suitable help function.

Figure 5:
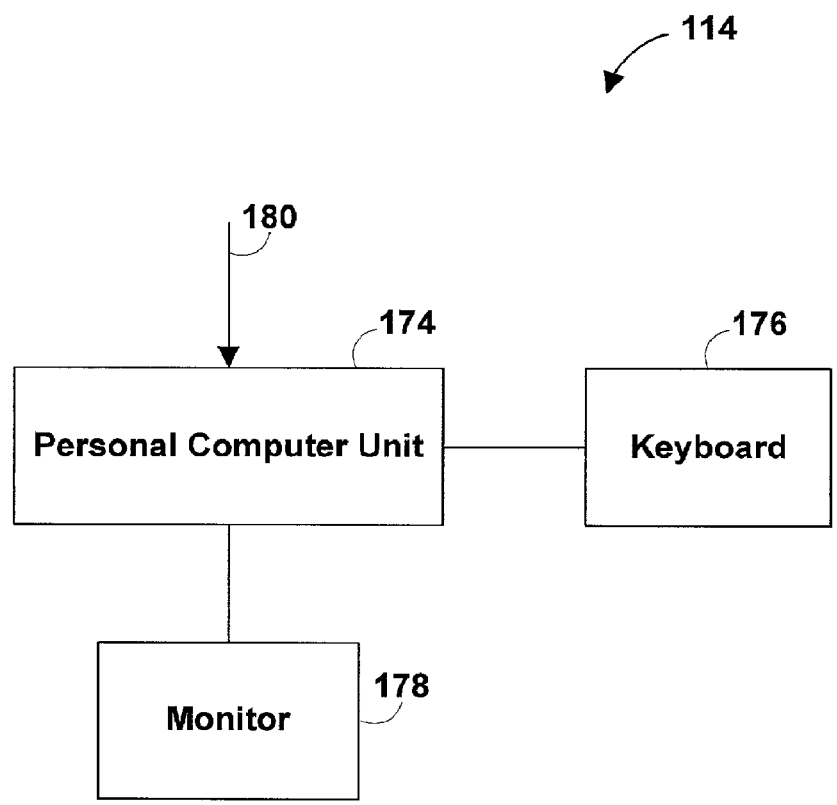
FIG. 5 is a diagram of illustrative user computer equipment in accordance with one embodiment of the present invention.

FIG. 5 shows illustrative user computer equipment 114. In the arrangement of FIG. 5, a personal computer unit 174 may be controlled by the user using a keyboard 176 or any other suitable user input device, such as a trackball, mouse, touch pad, touch screen, or voice recognition system. Television programming, video-on-demand programming, and interactive television application content may be displayed on a monitor 178. Television programming and other information may be received from communications paths 120 and 140 (as shown in FIG. 1) using an input/output 180. The user may also send commands and other information to remote services over input/output line 180.

Personal computer unit 174 may contain a television tuner card for decoding analog and digital television channels. The television tuner card may contain an analog tuner for tuning to a given analog channel and digital decoding circuitry for filtering out a desired digital television channel, video-on-demand channel, or music channel from a packetized digital data stream.

The user computer equipment arrangement of FIG. 5 is merely illustrative. Any suitable user computer equipment arrangement may be used. Moreover, the user television equipment arrangements described above are merely illustrative.

Figure 6:
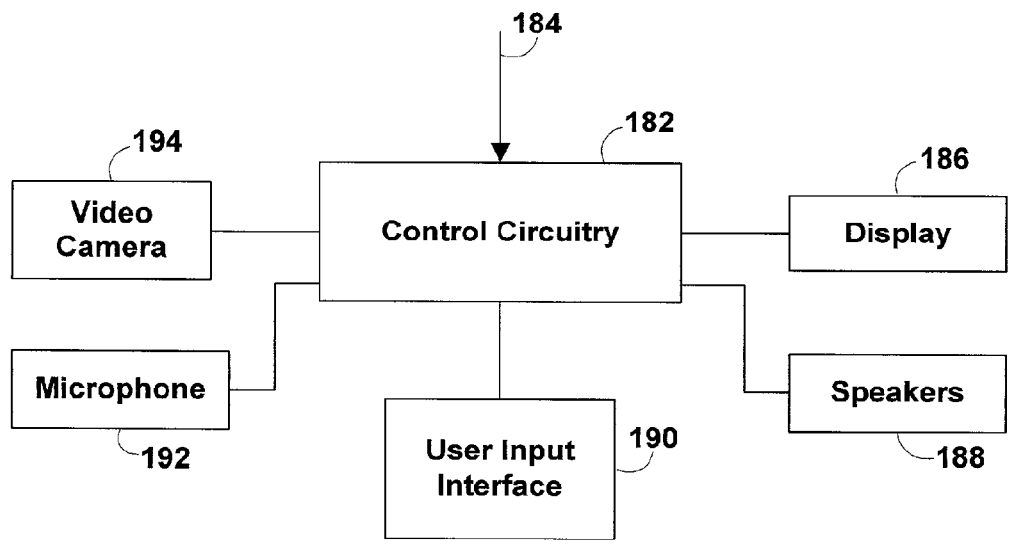
FIG. 6 is a generalized diagram of illustrative user equipment in accordance with one embodiment of the present invention.

FIG. 6 shows a more generalized embodiment of illustrative user equipment. As shown in FIG. 6, control circuitry 182 is connected to an input/output 184. Input/output 184 may be connected to communications paths such as communications paths 116, 118, 120, 134, 138, and 140 of FIG. 1. Television programming, video-on-demand programming, audio-on-demand programming, or any other suitable information or programming may be received via input/output 184 from, for example, programming sources 102 and television distribution facility 104 (as shown in FIG. 1). Program schedule information for an interactive television program guide and information on programs may be received via input/output 184. Input/output 184 may be used to receive information for other interactive television applications. A user may use control circuitry 182 to send commands, requests, and other suitable information using input/output 184.

Control circuitry 182 may be based on any suitable processor such as a microprocessor, microcontroller, or any other suitable processor. Memory or other suitable storage devices may be provided as part of control circuitry 182. Tuning circuitry such as an analog tuner, an MPEG-2 decoder or other digital tuning circuitry, any other suitable tuning circuits, or a combination of such circuits may also be included as part of control circuitry 182. The tuning circuitry may be used to tune the user equipment to a particular channel to receive television programming, video-on-demand programming, or music.

Video-on-demand programming and on-screen options and information may be displayed on a display 186. Display 186 may be a monitor, a television, or any other suitable equipment for displaying visual images. Speakers 188 may be provided as part of a television or may be stand-alone units. Digital music and the audio component of videos displayed on display 186 may be played through speakers 188.

A user may control circuitry 182 using a user input interface 190. User input interface 190 may be any suitable user interface, such as a remote control, mouse, trackball, keypad, keyboard, touch screen, touch pad, any other suitable user input interface, or a combination of such interfaces. A microphone 192 and a video camera 194 may be used to supply audio and video information to control circuitry 182.

Systems and methods for managing the distribution of on-demand media in an interactive television application are provided. On-demand media may include, for example, audio selections, video selections, electronic publications (e.g., books, magazines, newspapers, or any other suitable electronic publications), electronic games, software applications, or any other suitable on-demand media.

In some embodiments, the interactive television application may receive a request for on-demand media from a user. The interactive television application may associate the on-demand media with a suggested bandwidth for transmission of the on-demand media to the user. The interactive television application may determine an available bandwidth, such as the bandwidth that is available for the transmission of the on-demand media to the user. A television distribution facility may make a comparison between the suggested bandwidth and the available bandwidth. Based at least partially on the comparison of the suggested bandwidth and the available bandwidth, the interactive television application may provide an option to the user for the transmission of the on-demand media. In one suitable approach, the interactive television application may provide the user with an option to request a reduced-bandwidth version of the on-demand media. In another suitable approach, the interactive television application may provide the user with an option to schedule a future time for presentation of the on-demand media. In yet another suitable approach, the interactive television application may provide the user with an option to download the on-demand media to a recording device. In a further suitable approach, the interactive television application may provide the user with an option to check the availability of the on-demand media.

Figure 7:
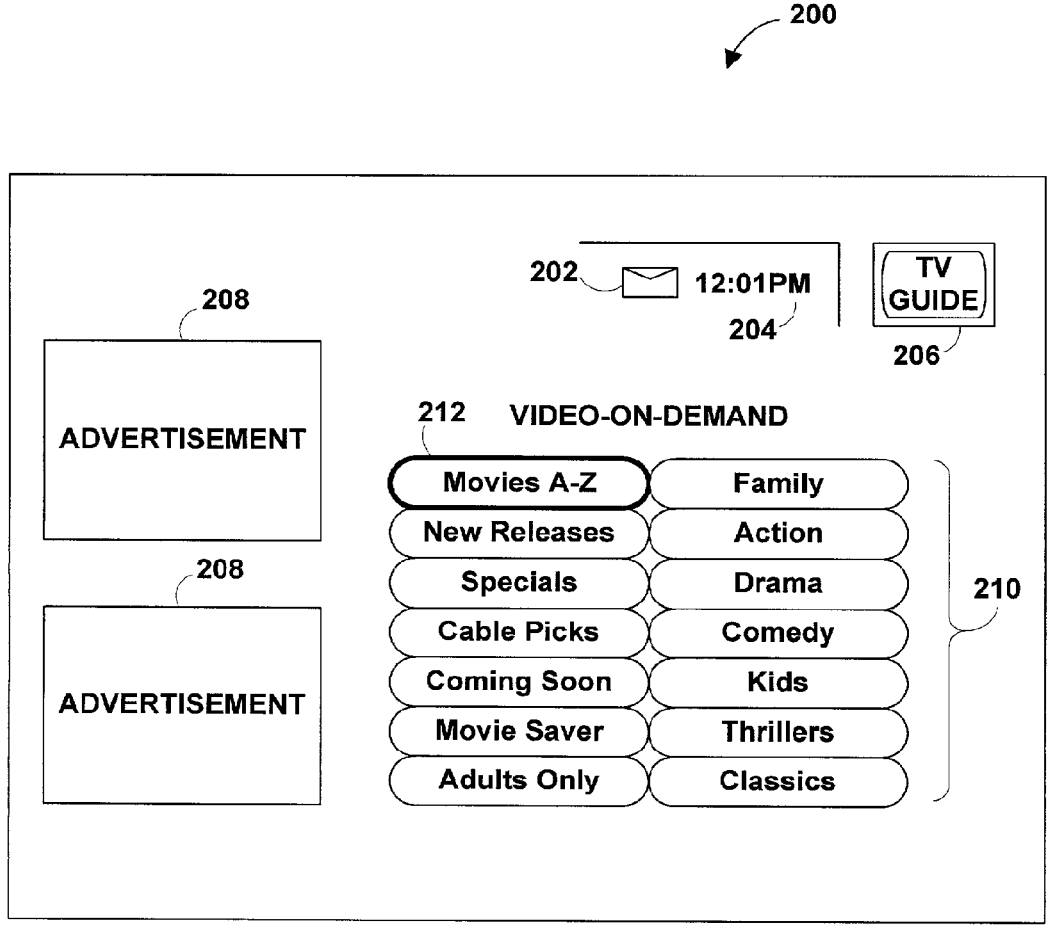
FIG. 7 is an illustrative menu display screen in accordance with one embodiment of the present invention.

FIG. 7 shows an illustrative menu display screen 200 that may be provided by the interactive television application. Display screen 200 may include possible video-on-demand selections. However, the selections included on display screen 200 are merely illustrative. In another suitable approach, display screen 200 may include audio selections, electronic publications, electronic games, software applications, or any other suitable on-demand media. Display screen 200 may include a mail icon 202, a clock 204, a provider logo 206, and one or more interactive advertisements 208. Display screen 200 may include video-on-demand options 210. As shown, an option 212, such as Movies A-Z, may be highlighted. In one suitable approach, a user may highlight option 212 by pressing arrow keys 166 of remote control 162 (as shown in FIG. 4), and may select option 212 by pressing OK key 168 of the remote control. Display screen 200 of FIG. 7 is a merely illustrative arrangement. Any other suitable arrangement may be used.

Figure 8:
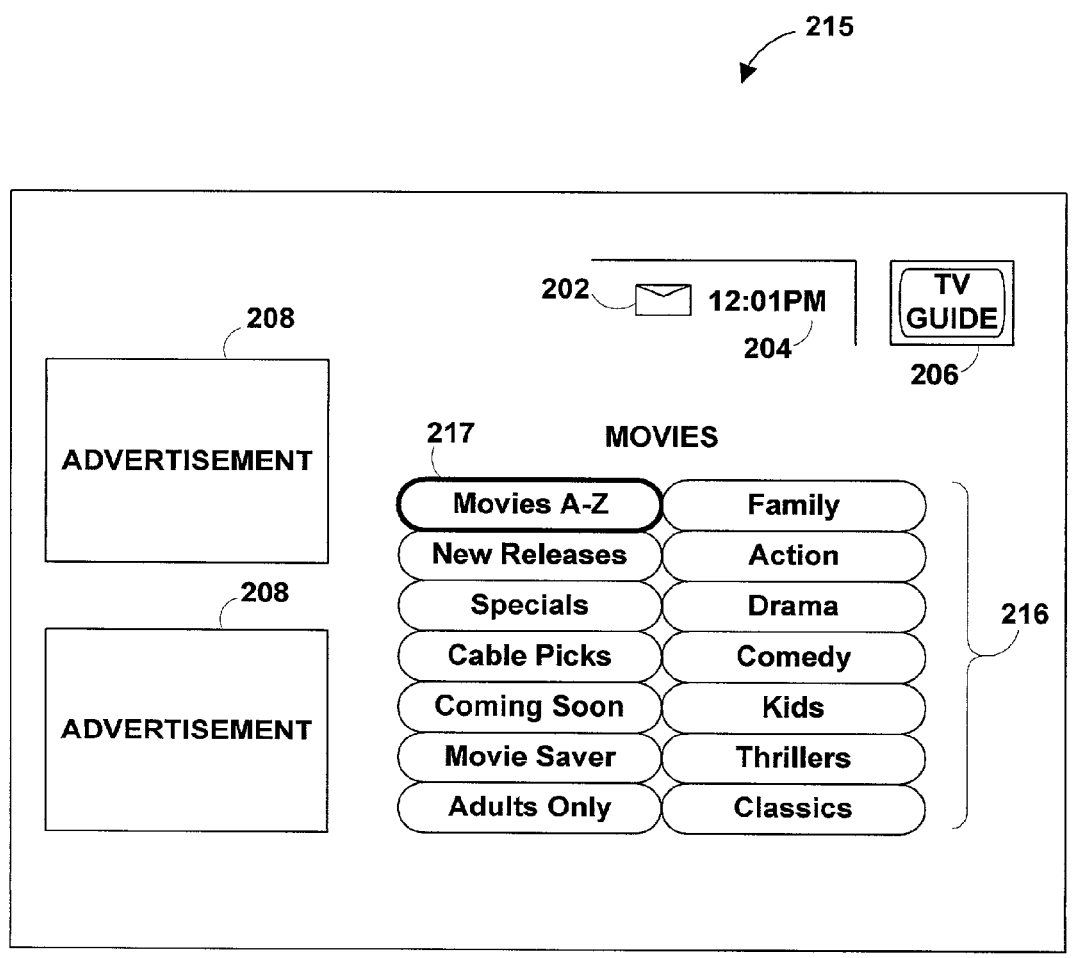
FIG. 8 is another illustrative menu display screen in accordance with one embodiment of the present invention.

FIG. 8 shows an illustrative menu display screen 215 that may be provided by the interactive television application. Display screen 215 is similar to display screen 200 of FIG. 7. However, display screen 215 may include options 216 for television programming and video-on-demand selections. For example, a selection of option 217 (e.g., Movies A-Z) may provide the user with an alphabetized list of video-on-demand movies and movies scheduled for television. Display screen 215 of FIG. 8 is a merely illustrative arrangement. Any other suitable arrangement may be used.

Figure 9:
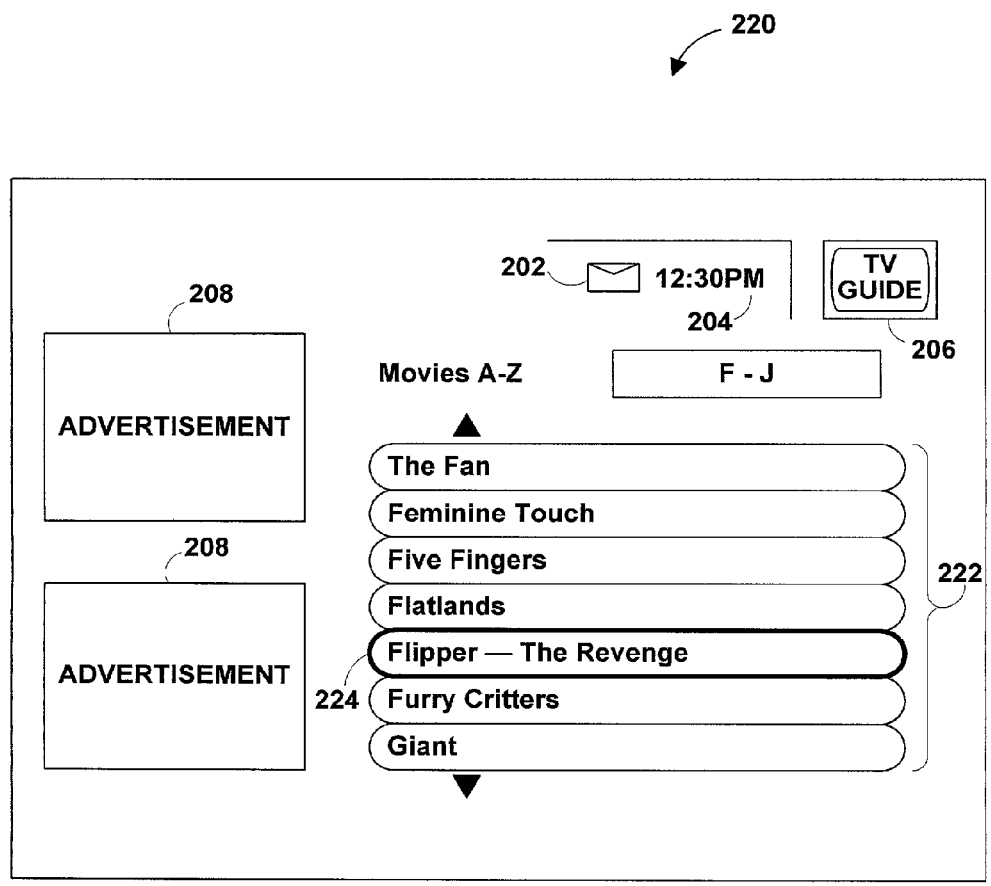
FIG. 9 is an illustrative display screen that shows a portion of a list of alphabetized movies in accordance with one embodiment of the present invention.

FIG. 9 shows an illustrative display screen 220 that may be provided by the interactive television application. Display screen 220 may include a portion of a list 222 of alphabetized video-on-demand movies that may result from the selection of option 212 of FIG. 7. In another suitable approach, list 222 may include both video-on-demand movies and movies for television, and may result from the selection of option 217 of FIG. 8. Display screen 220 may include mail icon 202, clock 204, provider logo 206, and one or more interactive advertisements 208. The user may highlight an option 224, such as Flipper—The Revenge. In one suitable approach, the user may highlight option 224 by pressing arrow keys 166 of remote control 162 (as shown in FIG. 4), and may select option 224 by pressing OK key 168 of the remote control. Display screen 220 of FIG. 9 is a merely illustrative arrangement. Any other suitable arrangement may be used.

Figure 10:
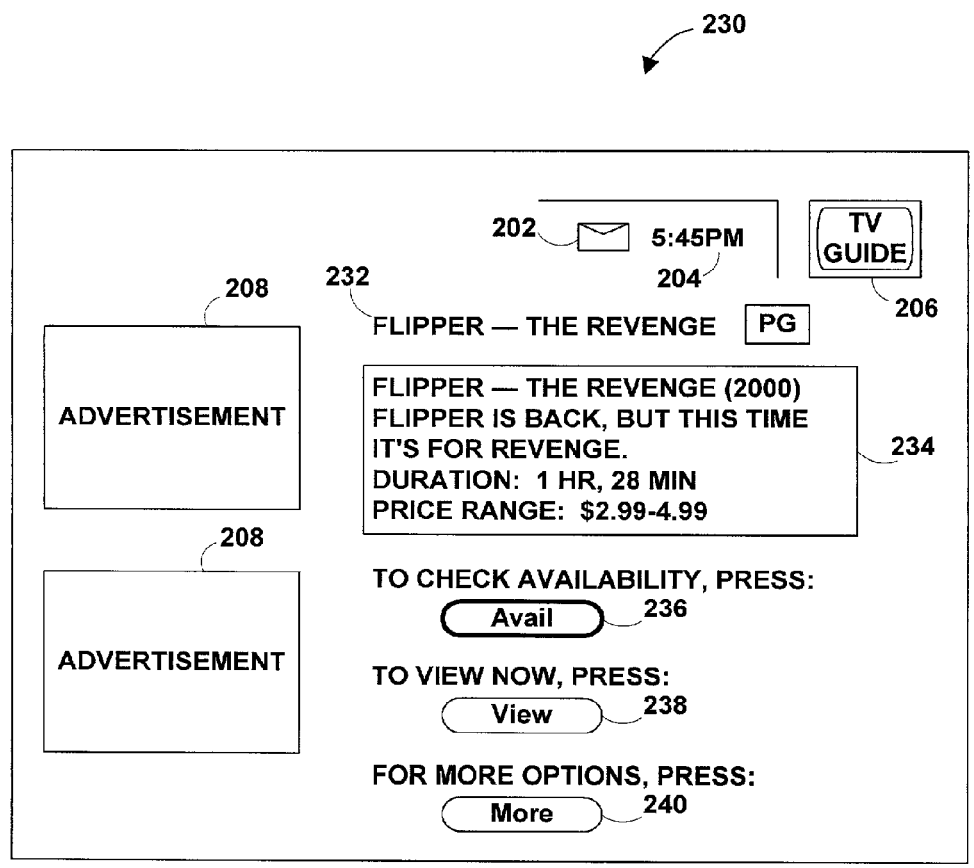
FIG. 10 is an illustrative display screen that may present one or more options related to transmission of a movie in accordance with one embodiment of the present invention.

FIG. 10 shows an illustrative display screen 230 that may be provided by the interactive television application in response to the selection of a movie (e.g., Flipper—The Revenge). Display screen 230 may present one or more options to the user related to the transmission of the movie. Display screen 230 may include mail icon 202, clock 204, provider logo 206, and one or more interactive advertisements 208. Display screen 230 may include a title of the movie selection, such as a title 232, Flipper—The Revenge. Display screen 230 may include a description region 234 that contains information in connection with the movie selection. Description region 234 may include a description of the movie (e.g., "Flipper is back, but this time it's for revenge."), a duration of the movie (e.g., 1 hour, 28 minutes), a price range for the movie (e.g., $2.99-4.99), or any other information related to the movie selection.

As shown, the interactive television application may provide the user with three options related to the transmission of the movie. However, the interactive television application may provide the user with any suitable number of options. The interactive television application may provide a button 236 that allows the user to check the availability of the movie. In one suitable approach, the user may select button 236 to determine a suggested bandwidth (e.g., the bandwidth that is suggested for presentation of the movie in real-time) and an available bandwidth (e.g., the bandwidth that is available for presentation of the movie in real-time).

The interactive television application may provide a button 238 that allows the user to view the movie at the present time and in real-time. In one suitable approach, the user may select button 238 to request the presentation of the movie in real-time.

The interactive television application may provide a button 240 that allows the user to obtain more options in connection with the presentation of the movie. In one suitable approach, the user may select button 240 to obtain options related to the transmission of the movie other than those shown (e.g., view a reduced-bandwidth version of the movie, schedule a future time to view the movie, download the movie to a recording device, or any other suitable option).

As shown, the user may highlight button 236 (e.g., for the option to check availability). In one suitable approach, the user may highlight button 236 by pressing arrow keys 166 of remote control 162 (as shown in FIG. 4), and may select button 236 by pressing OK key 168 of the remote control. Display screen 230 of FIG. 10 is a merely illustrative arrangement. Any other suitable arrangement may be used.

Figure 11:
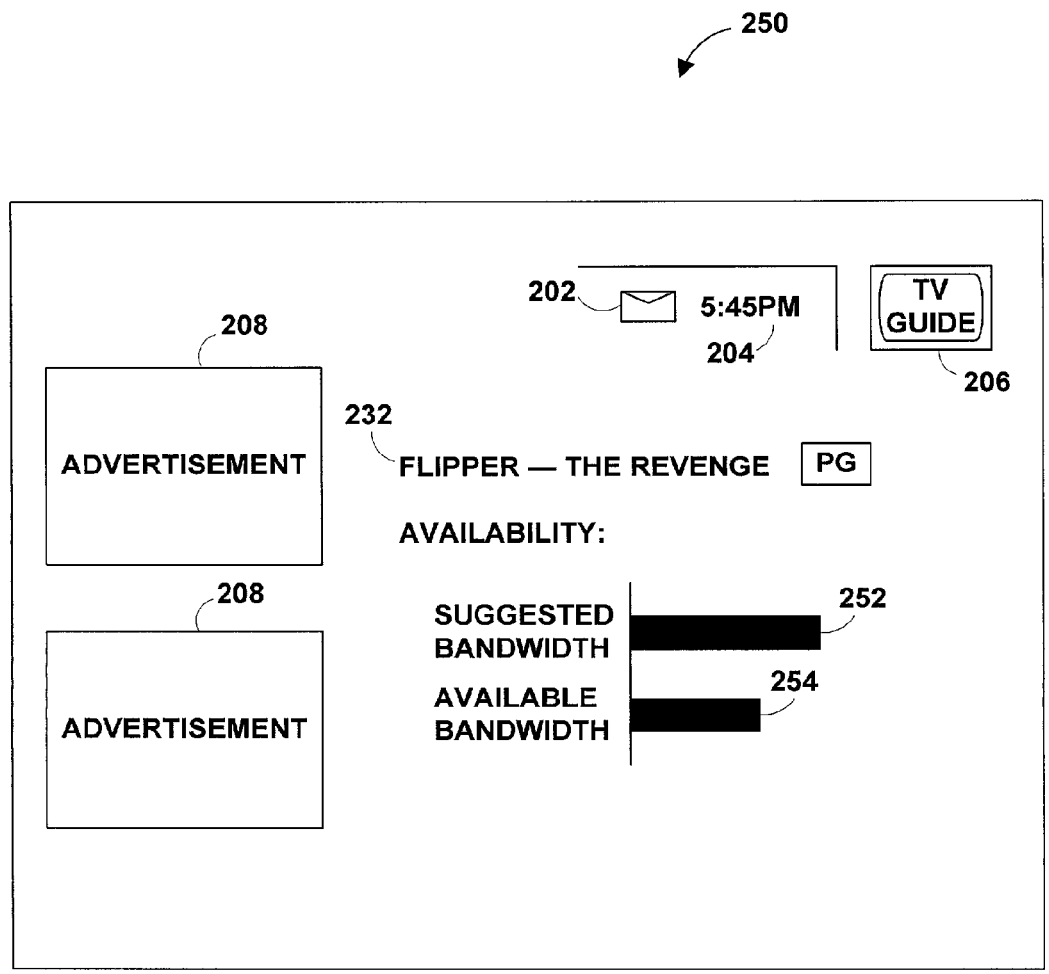
FIG. 11 is an illustrative display screen that may present a graphical availability of the on-demand movie selection in accordance with one embodiment of the present invention.

FIG. 11 shows an illustrative display screen 250 that may be provided by the interactive television application in response to the selection of button 236 of FIG. 10. Display screen 250 may present the user with the availability of the movie (e.g., Flipper—The Revenge). Display screen 250 may include mail icon 202, clock 204, provider logo 206, and one or more interactive advertisements 208. Display screen 250 may include movie title 232, such as Flipper—The Revenge, and any other information related to the movie selection. Display screen 250 may include a graphical representation of one or both of a suggested bandwidth and an available bandwidth. The suggested bandwidth is the bandwidth that is suggested for real-time transmission of a movie (e.g., Flipper—The Revenge). A bar 252 may represent the suggested bandwidth. The available bandwidth may be the bandwidth that is currently available for transmission of a movie, the predicted average bandwidth for the duration of the transmission, the predicted minimum bandwidth for the duration of the transmission (e.g., the "worst-case scenario"), or any other suitable measurement of the available bandwidth for transmission. A bar 254 may represent the available bandwidth. In one suitable approach, one or both of the suggested and available bandwidths may be audibly presented to the user. For example, a speaker such as speaker 188 (as shown in FIG. 6) may provide an audible indication of the suggested and/or available bandwidths.

As shown, bar 252 is longer than bar 254 (i.e., the suggested bandwidth is greater than the available bandwidth). Thus, there is an insufficient amount of available bandwidth for the real-time transmission of the movie to the user at the present time. Display screen 250 of FIG. 11 is a merely illustrative arrangement. Any other suitable arrangement may be used.

Figure 12:
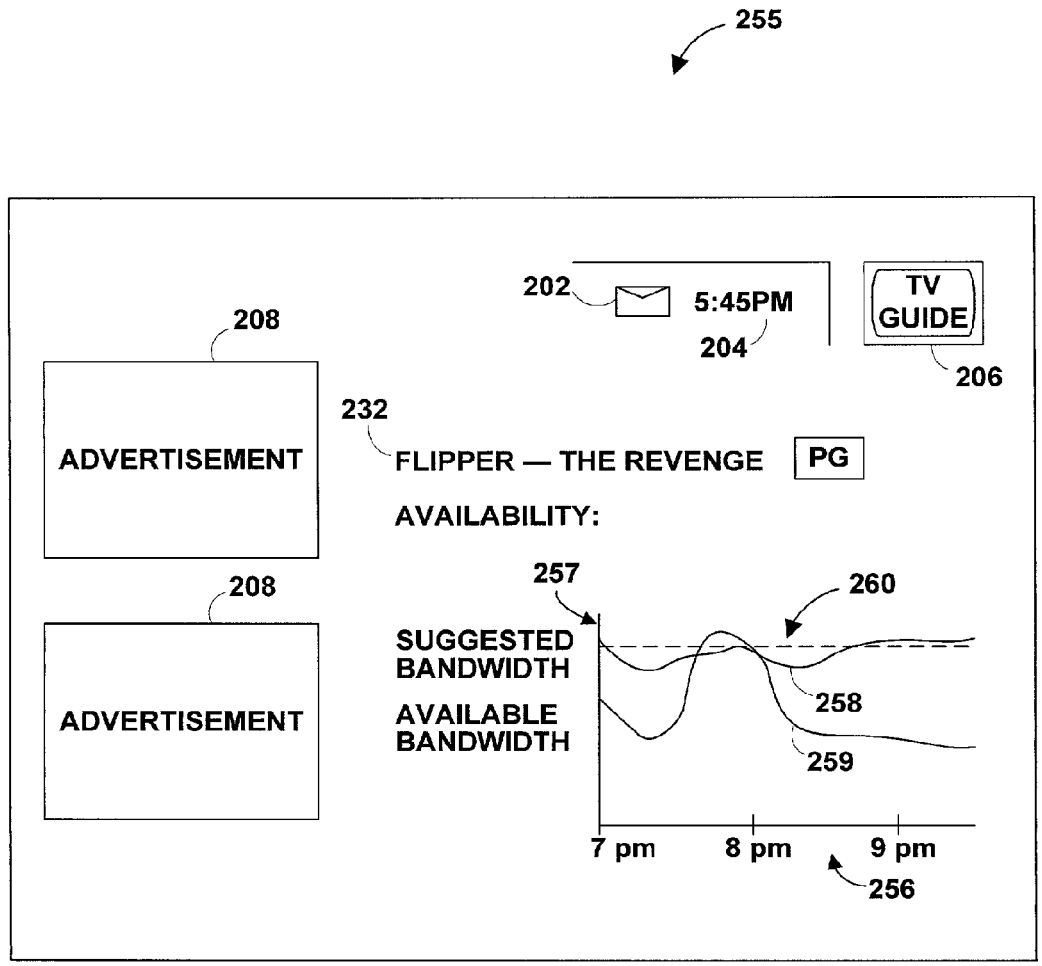
FIG. 12 is another illustrative display screen that may present a graphical availability of the on-demand movie selection in accordance with one embodiment of the present invention.

FIG. 12 shows an illustrative display screen 255 that may be provided in another suitable approach in response to the selection of button 236 of FIG. 10. Display screen 255 is similar to display screen 250 of FIG. 11. However, display screen 255 may include a graphical representation of one or both of a suggested bandwidth and an available bandwidth over time (e.g., over the duration of the movie selection). An axis 256 may represent time and an axis 257 may represent bandwidth. The suggested bandwidth may be presented to the user with a curve 258. The available bandwidth may be presented to the user with a curve 259. As shown, both the suggested bandwidth and the available bandwidth may vary over time. The values that form the suggested bandwidth curve 258 may be averaged into a line 260, which may represent the average suggested bandwidth for the duration of the movie.

As shown in this example, a portion of curve 258 has bandwidth values greater than the corresponding portion of curve 259 (i.e., the suggested bandwidth is greater than the available bandwidth for a duration of time). Thus, there is an insufficient amount of available bandwidth over the duration of the movie selection for the real-time transmission of the movie to the user. Display screen 255 of FIG. 12 is a merely illustrative arrangement. Any other suitable arrangement may be used.

Referring back to FIG. 10, the interactive television application may provide button 238 that allows the user to view the movie at the present time and in real-time. In response to a selection of button 238, the interactive television application may provide the user with a display screen 263 of FIG. 13.

Figure 13:
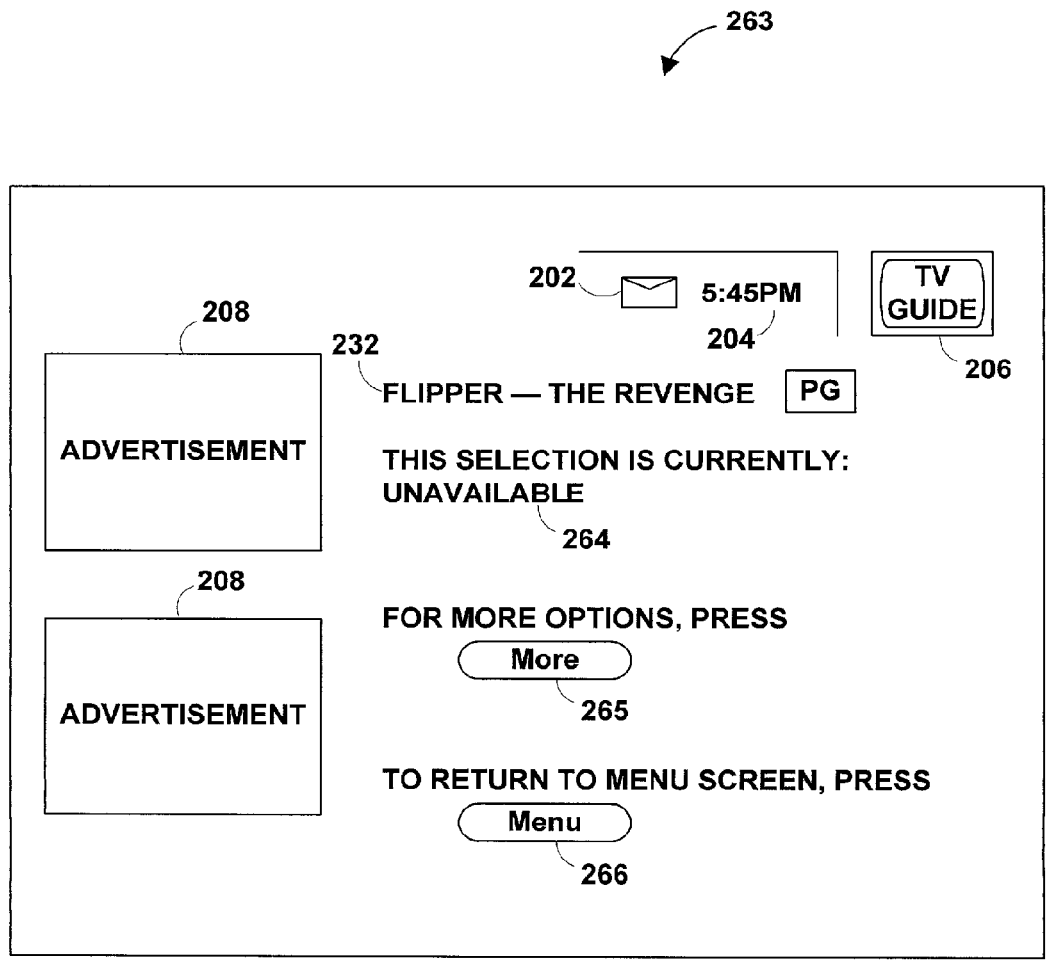
FIG. 13 is an illustrative display screen that may be provided in response to a request to view the movie selection in accordance with one embodiment of the present invention.

FIG. 13 shows illustrative display screen 263 that may be provided by the interactive television application in response to a request to view the movie (e.g., a selection of button 238 of FIG. 10). Display screen 263 may include mail icon 202, clock 204, provider logo 206, and one or more interactive advertisements 208. Display screen 263 may include movie title 232, such as Flipper—The Revenge. Display screen 263 may include a selection status 264 (e.g., unavailable). This status is a verbal representation of the availability of the movie selection. This availability was represented graphically in FIGS. 11 and 12 (e.g., by bars 252 and 254 and by curves 258 and 259, respectively).

The interactive television application may provide a button 265 that allows the user to obtain more options in connection with the presentation of the movie. In one suitable approach, the user may select button 265 to obtain options other than those shown (e.g., view a reduced-bandwidth version of the movie, schedule a future time to view the movie, download the movie to a recording device, or any other suitable option). These options may be the same as those provided by a selection of button 240 of FIG. 10. However, there may be more options provided, fewer options provided, or different options provided than those provided by a selection of button 240 of FIG. 10.

The interactive television application may provide a button 266 that allows the user to return to a menu screen, such as menu display screen 200 of FIG. 7 or menu display screen 215 of FIG. 8. This may allow the user to request another video-on-demand selection. Display screen 263 of FIG. 13 is a merely illustrative arrangement. Any other suitable arrangement may be used.

Referring back to FIG. 10, the interactive television application may provide button 240 that allows the user to obtain more options in connection with the presentation of the movie. In response to a selection of button 240, display screen 270 of FIG. 14 may be provided to the user.

Figure 14:
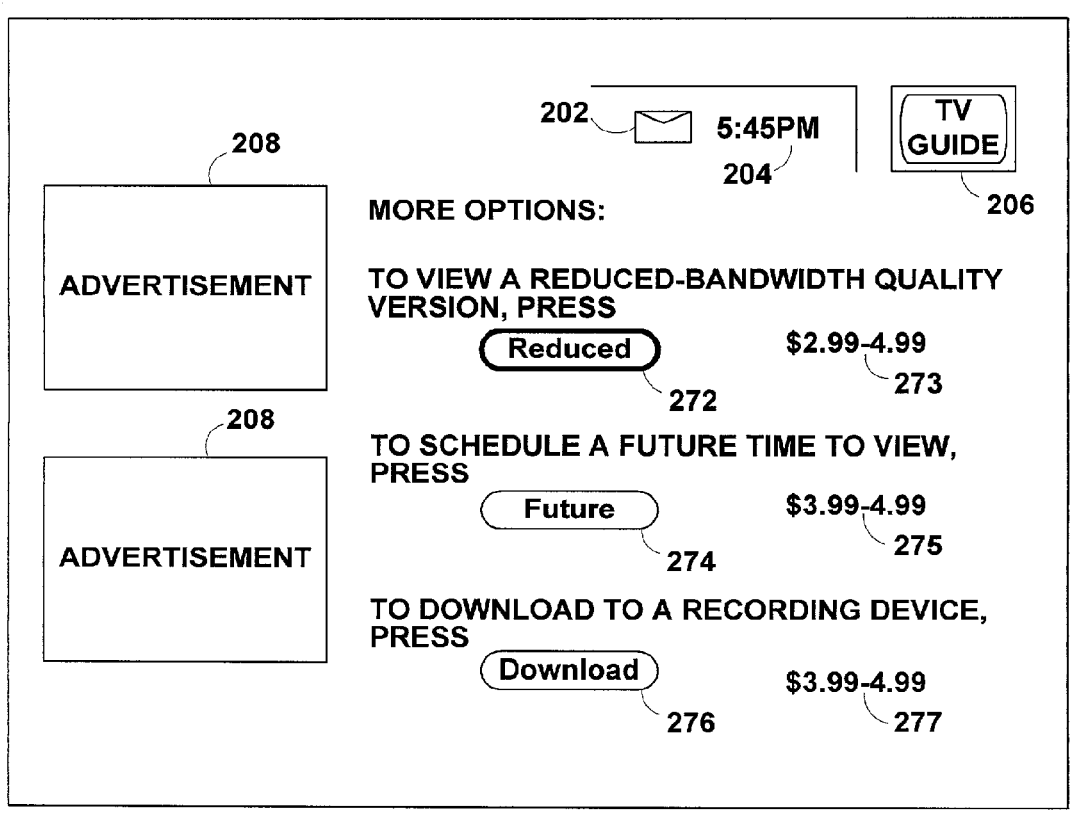
FIG. 14 is an illustrative display screen that may be provided in response to a request to obtain more options in connection with the presentation of the movie in accordance with one embodiment of the present invention.

FIG. 14 shows illustrative display screen 270 that may be provided by the interactive television application in response to a request to obtain more options in connection with the presentation of the movie (e.g., a selection of button 240 of FIG. 10 or a selection of button 265 of FIG. 13). Display screen 270 may include mail icon 202, clock 204, provider logo 206, and one or more interactive advertisements 208.

Display screen 270 may include options in connection with the presentation of the movie. The interactive television application may provide three options (e.g., buttons 272, 274, and 276) in connection with the presentation of the movie. However, the interactive television application may provide any number of options in connection with the presentation of the movie. The interactive television application may provide button 272 that allows the user to view a reduced-bandwidth quality version of the movie. A range of prices 273 in connection with viewing a reduced-bandwidth quality version of the movie may be provided (e.g., $2.99-4.99). The interactive television application may provide button 274 that allows the user to schedule a future time to view the movie. A range of prices 275 in connection with scheduling a future time to view the movie may be provided (e.g., $3.99-4.99). The interactive television application may provide button 276 that allows the user to download the movie to a recording device. A range of prices 277 in connection with downloading the movie to a recording device may be provided (e.g., $3.99-4.99).

Display screen 270 of FIG. 14 is a merely illustrative arrangement. Any other suitable arrangement may be used. For example, in another suitable approach, the user may be provided with an additional option to view a full-bandwidth version of the movie at the present time (not shown).

As shown in FIG. 14, the user may highlight button 272 (e.g., for the option to view a reduced-bandwidth quality version of a movie). In one suitable approach, the user may highlight button 272 by pressing arrow keys 166 of remote control 162 (as shown in FIG. 4), and may select button 272 by pressing OK key 168 of the remote control.

Figure 15:
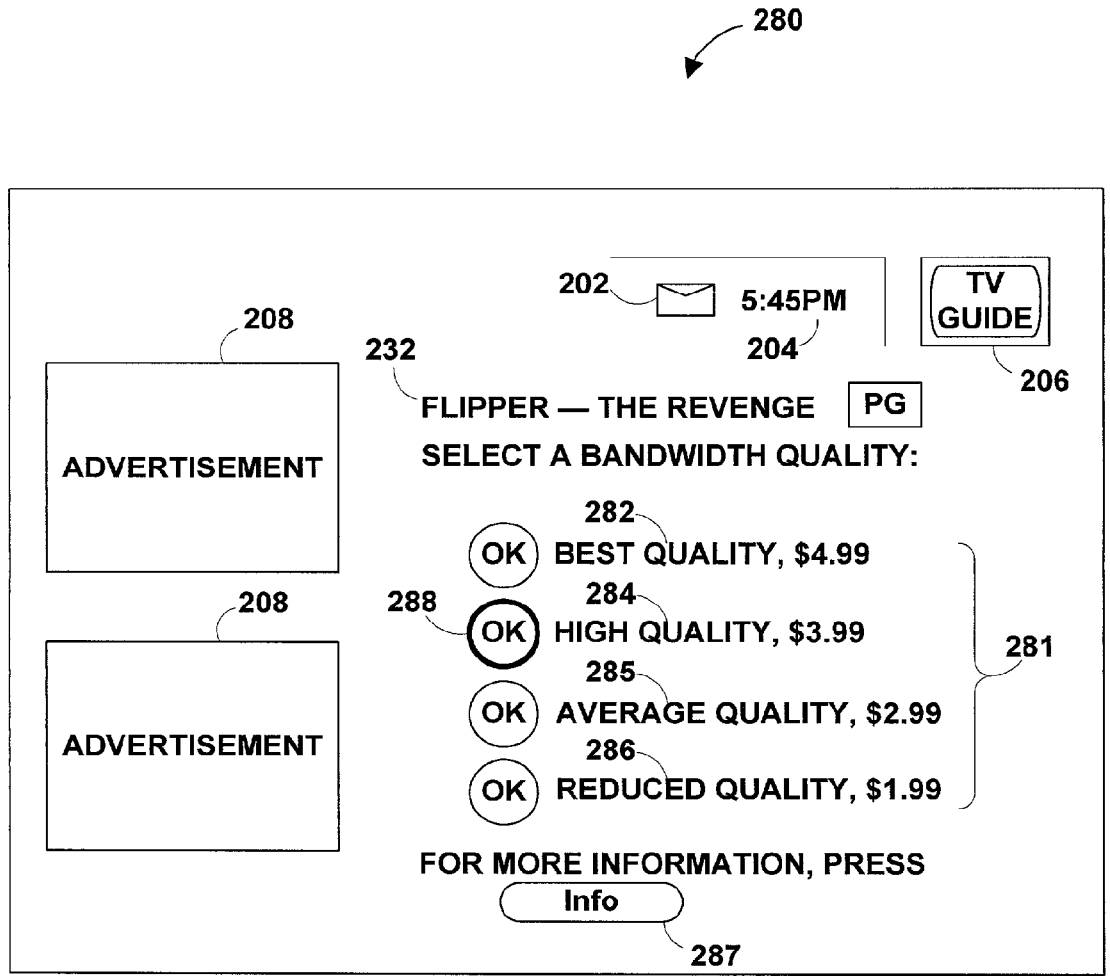
FIG. 15 is an illustrative display screen that may provide the user with the ability to select a bandwidth quality for the movie in accordance with one embodiment of the present invention.

FIG. 15 shows an illustrative display screen 280 that may be provided by the interactive television application in response to the selection of button 272 of FIG. 12. Display screen 280 may provide the user with the ability to select a bandwidth quality for the movie for presentation of a reduced-bandwidth quality version of the movie. The bandwidth quality may also be referred to as bandwidth capacity, or simply as capacity. In some cases, the interactive television application may not provide the user with the ability to select a reduced-bandwidth quality for the presentation of on-demand media. For example, on-demand media such as some software applications and electronic games may only be available for transmission in full bandwidth versions.

Display screen 280 may include mail icon 202, clock 204, provider logo 206, and one or more interactive advertisements 208. Display screen 280 may include movie title 232, such as Flipper—The Revenge. Display screen 280 may include a list 281 of bandwidth qualities. For example, bandwidth qualities of best quality, high quality, average quality, and reduced quality may be provided. The interactive television application may provide the user with only those bandwidth qualities that are currently available. For example, the interactive television application may omit a bandwidth quality from list 281 if there is not enough bandwidth available for transmission of the movie at the bandwidth corresponding to the bandwidth quality.

Each bandwidth quality in list 281 may correspond to a bandwidth reduction value. For example, an option 282 may provide the user with the opportunity to select a best quality transmission of the movie. The best quality transmission may correspond to a bandwidth reduction value of zero, thereby transmitting the movie at its suggested bandwidth. A price may be provided corresponding to the best quality transmission (e.g., $4.99). The price for best quality transmission may be the highest price shown on display screen 280.

In a further example, an option 284 may provide the user with the opportunity to select a high quality transmission of the movie. A bandwidth reduction value such as ¼ may be associated with a high quality transmission. An illustrative example of the use of a bandwidth reduction value is as follows. A movie, such as Flipper—The Revenge, may have a suggested bandwidth of 2 Mbit/s associated with its transmission. A bandwidth reduction value, such as ¼, may result in a reduction of (2 Mbit/s×¼), or 0.5 Mbit/s. Thus, the resulting reduced-bandwidth version of the movie would be transmitted at a bandwidth of 1.5 Mbit/s. A further reduced price (e.g., in comparison with the price for best quality option 282) may be offered to the user, for example, $3.99.

In yet a further example, an option 285 may provide the user with the opportunity to select an average quality transmission of the movie. A bandwidth reduction value such as ⅓ may be associated with an average quality transmission. A further reduced price (e.g., in comparison with the price for high quality option 284) may be offered to the user, for example, $2.99.

In yet another example, an option 286 may provide the user with the opportunity to select a reduced quality transmission of the movie. A bandwidth reduction value such as ½ may be associated with a reduced quality transmission. A further reduced price (e.g., in comparison with the price for average quality option 285) may be offered to the user, for example, $1.99.

Display screen 280 may include an info button 287 that allows the user to obtain more information on bandwidth reduction (e.g., how it works). Display screen 280 of FIG. 15 is a merely illustrative arrangement. Any other suitable arrangement may be used.

As shown in FIG. 15, the user may highlight button 288 (e.g., for the selection of high quality transmission option 284). In one suitable approach, the user may highlight button 288 by pressing arrow keys 166 of remote control 162 (as shown in FIG. 4), and may select button 288 by pressing OK key 168 of the remote control.

In another suitable approach, the user may bypass display screen 280 by selecting a default acceptable bandwidth quality in a set-up screen (not shown). The user may select the lowest bandwidth quality that is acceptable for the transmission of on-demand media. For example, the user may select a default acceptable bandwidth quality of "high quality". Thus, following a selection of button 272 of display screen 270 (as shown in FIG. 14) to view a reduced-bandwidth version of the movie, the user may be automatically provided with a high quality version of the movie.

Figure 16:
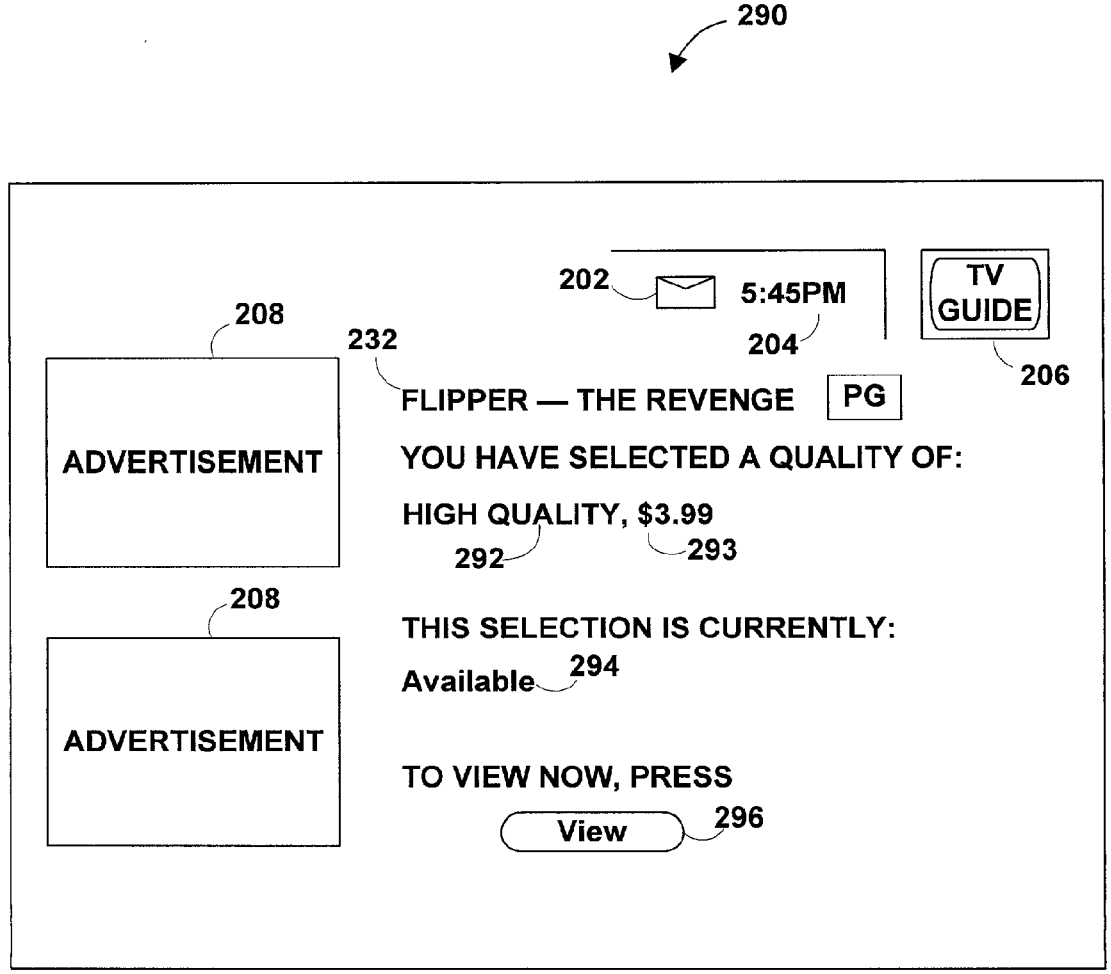
FIG. 16 is an illustrative display screen that may be provided in response to a selection of a bandwidth quality in accordance with one embodiment of the present invention.

FIG. 16 shows an illustrative display screen 290 that may be provided by the interactive television application in response to the selection of button 288 of FIG. 15. Display screen 290 may include mail icon 202, clock 204, provider logo 206, and one or more interactive advertisements 208. Display screen 290 may include movie title 232, such as Flipper—The Revenge. Display screen 290 may include a bandwidth quality status 292 (e.g., high quality) that presents the selected bandwidth quality to the user. Display screen 290 may include a bandwidth quality price 293 (e.g., $3.99) that presents the price of the movie corresponding to the selected bandwidth quality to the user. Display screen 290 may include a selection status 294 (e.g., available) to provide the user with the availability of the reduced-bandwidth version of the movie. For example, the bandwidth quality of high quality may be sufficient for the transmission of the movie to the user (i.e., the reduced bandwidth of the high quality transmission is less than the available bandwidth for transmission). The interactive television application may provide a button 296 that allows the user to view the reduced-bandwidth version of the movie (e.g., Flipper—The Revenge) at the current time and in real-time. Display screen 290 of FIG. 16 is a merely illustrative arrangement. Any other suitable arrangement may be used.

Referring back to FIG. 14, the interactive television application may provide button 274 that allows the user to schedule a future time to view the movie. In response to a selection of button 274, the interactive television application may provide a display screen 300 of FIG. 17 to the user.

Figure 17:
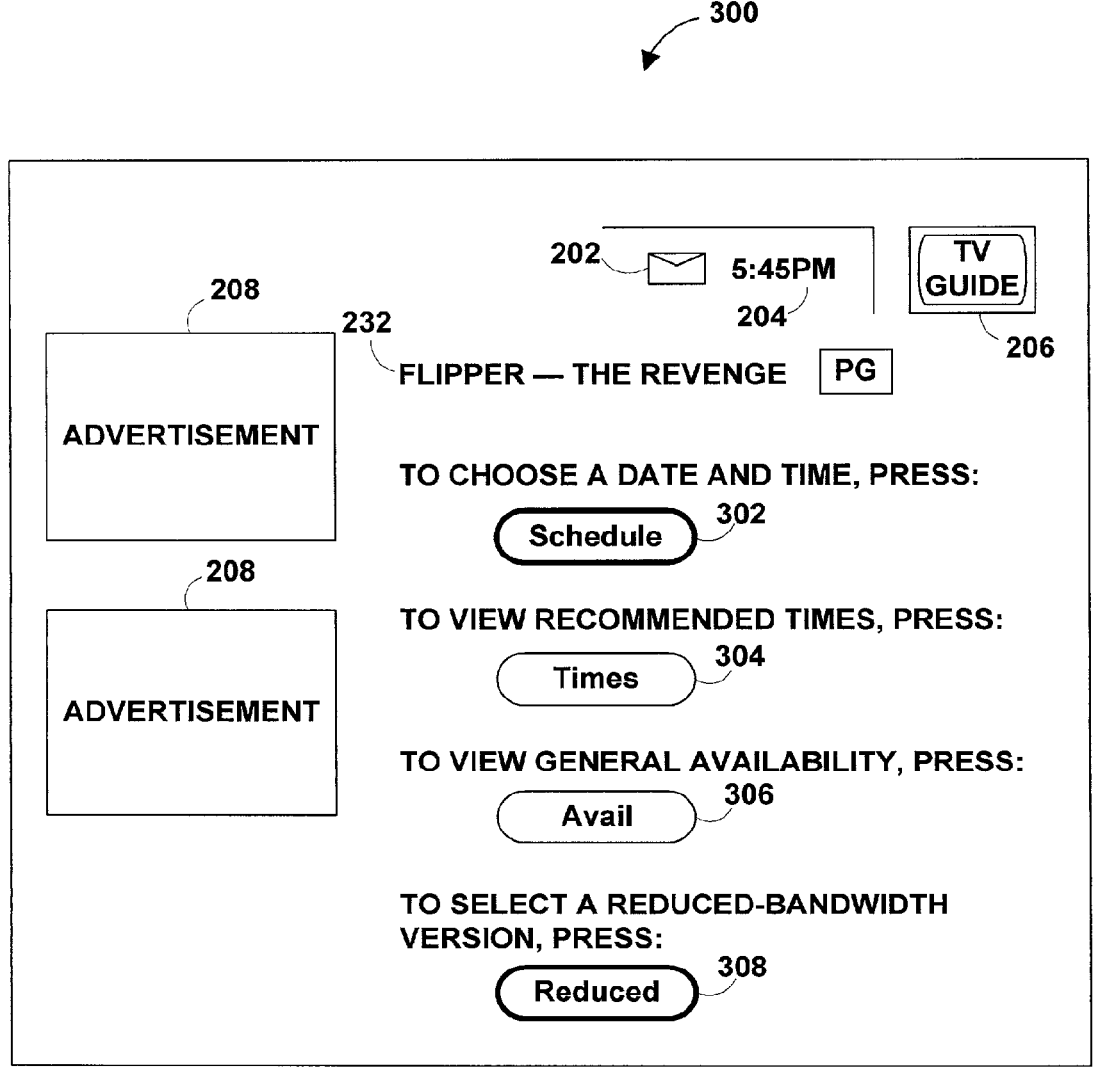
FIG. 17 is an illustrative display screen that may be provided in response to a request to schedule a future time to view the movie in accordance with one embodiment of the present invention.

FIG. 17 shows illustrative display screen 300 that may be provided by the interactive television application in response to a request to schedule a future time to view the movie (e.g., a selection of button 274 of FIG. 14). Display screen 300 may include mail icon 202, clock 204, provider logo 206, and one or more interactive advertisements 208. Display screen 300 may include movie title 232, such as Flipper—The Revenge.

Display screen 300 may include options in connection with scheduling a future time to view the movie. As shown, the interactive television application may provide four options in connection with scheduling a future time to view the movie. In another suitable approach, the interactive television application may provide any number of options in connection with scheduling a future time to view the movie. The interactive television application may provide a button 302 that allows the user to choose a date and time to view the movie. The interactive television application may provide a button 304 that allows the user to view recommended times for viewing the movie. For example, the interactive television application may present the available times for transmission of the movie to the user. The interactive television application may provide a button 306 that allows the user to obtain the general availability for transmission of the movie. For example, the interactive television application may present a graphical representation of the availability of on-demand media on each day of the week to the user. The interactive television application may provide a button 308 that allows the user to select a reduced-bandwidth version of the movie for transmission in the future. For example, the interactive television application may provide various bandwidth qualities to the user for transmission of the movie (e.g., in a screen similar to display screen 280 of FIG. 15). Display screen 300 of FIG. 17 is a merely illustrative arrangement. Any other suitable arrangement may be used.

As shown in FIG. 17, the user may highlight button 302 (e.g., to choose a date and time to view a movie). In one suitable approach, the user may highlight button 302 by pressing arrow keys 166 of remote control 162 (as shown in FIG. 4), and may select button 302 by pressing OK key 168 of the remote control.

Figure 18:
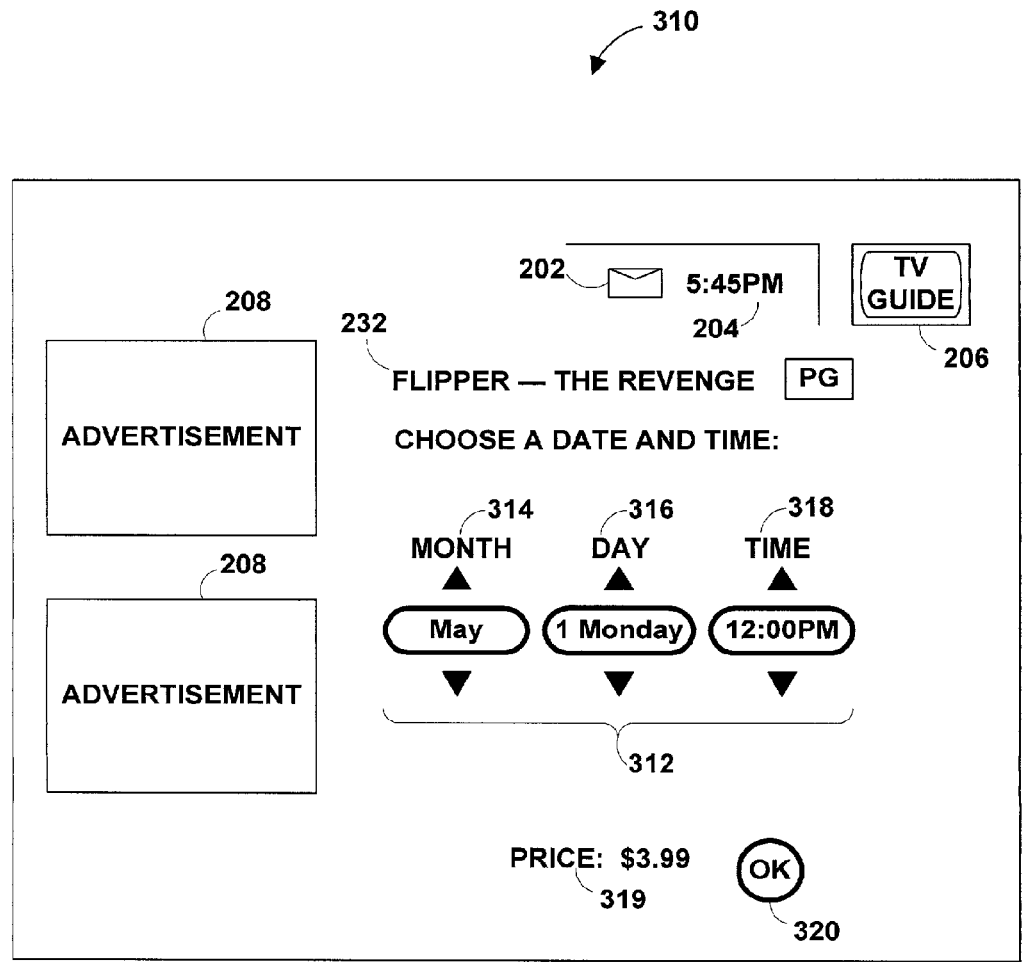
FIG. 18 is an illustrative display screen that may provide the user with the ability to choose a date and time to view the movie in accordance with one embodiment of the present invention.

FIG. 18 shows an illustrative display screen 310 that may be provided by the interactive television application in response to the selection of button 302 of FIG. 17. Display screen 310 may include mail icon 202, clock 204, provider logo 206, and one or more interactive advertisements 208. Display screen 310 may include movie title 232, such as Flipper—The Revenge.

As shown, display screen 310 may provide the user with the ability to choose a date and time to view the movie, such as Flipper—The Revenge. Display screen 310 may include a calendar region 312 that may provide the user with the ability to select a month, day, and time to view the movie. For example, a month may be selected from a list 314, a day may be selected from a list 316, and a time may be selected from a list 318. In one suitable approach, the user may highlight a month, day, and time by pressing up and down arrow keys 166 of remote control 162 (as shown in FIG. 4). The user may press right and left arrow keys 166 to toggle between lists 314, 316, and 318. In another suitable approach, the user may select a month, day, and time by pressing the appropriate numeric keys (e.g., keys 164 of remote control 162). For example, the user may press "1-2" to select the month of December. As shown, the user has selected a date of May 1 and a time of 12:00 PM to view the movie. A price that corresponds to such a selection may be provided in a price region 319. For example, viewing the movie on May 1 at 12:00 PM may cost $3.99. The user may press OK key 168 of the remote control to select OK button 320. Display screen 310 of FIG. 18 is a merely illustrative arrangement. Any other suitable arrangement, such as that shown in the following FIG., may be used.

Figure 19:
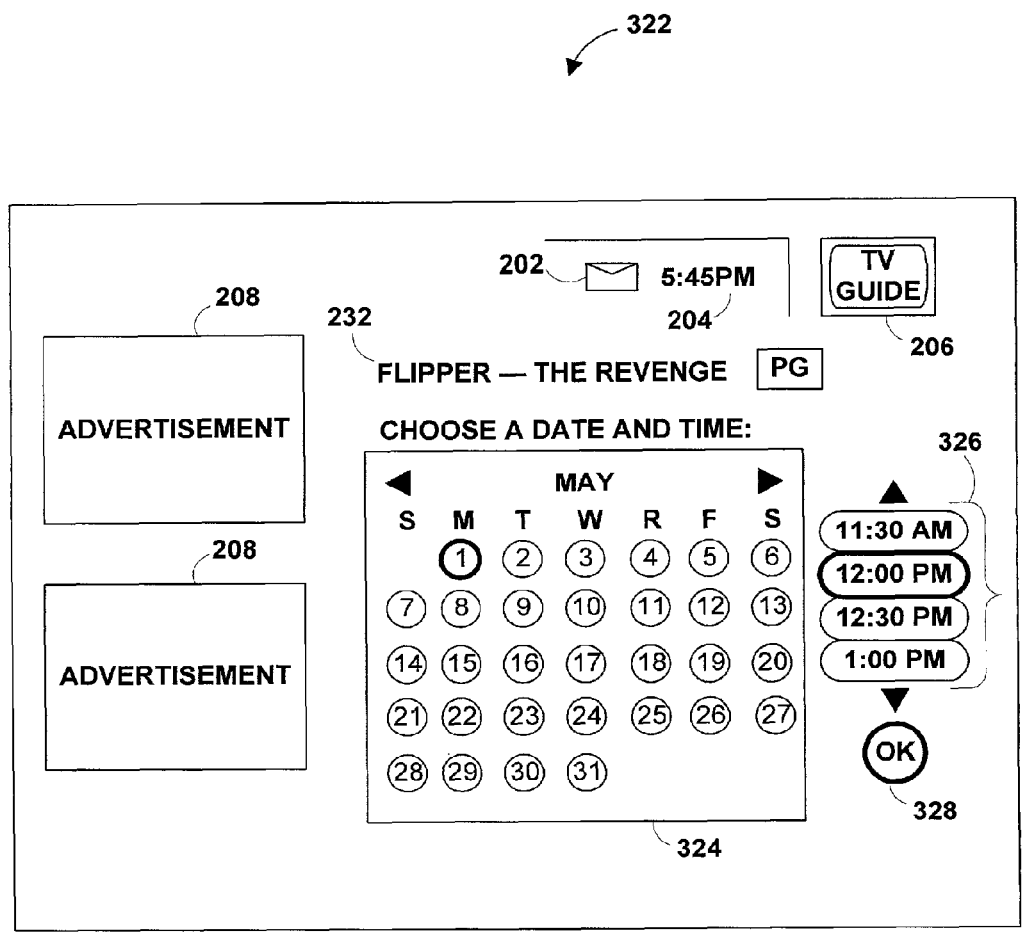
FIG. 19 is another illustrative display screen that may provide the user with the ability to choose a date and time to view the movie in accordance with one embodiment of the present invention.

FIG. 19 shows an illustrative display screen 322 that may be provided by the interactive television application in response to the selection of button 302 of FIG. 17. Display screen 322 is substantially similar to display screen 310 of FIG. 18. However, display screen 322 may include an alternative calendar region for selecting a date and time for the presentation of the movie.

Display screen 322 may include a month region 324 that provides the user with the ability to select a month and a day to view the movie. For example, a specific month (e.g., May) may be selected from month region 324 by, for example, pressing right and left arrow keys 166 of remote control 162 (as shown in FIG. 4). The user may select a day to view the movie by, for example, pressing arrow keys 166 of remote control 162 to move throughout month region 324. In another suitable approach, the user may select a day by pressing the appropriate numeric keys (e.g., keys 164 of remote control 162). For example, the user may press "1" to select the first of the month. As shown, the user has selected a date of Monday, May 1. The user may select a time to view the movie from a time region 326. Month region 324, time region 326, or both may be color-coded to indicate a price. The user may press OK key 168 of the remote control to select OK button 328.

Figure 20:
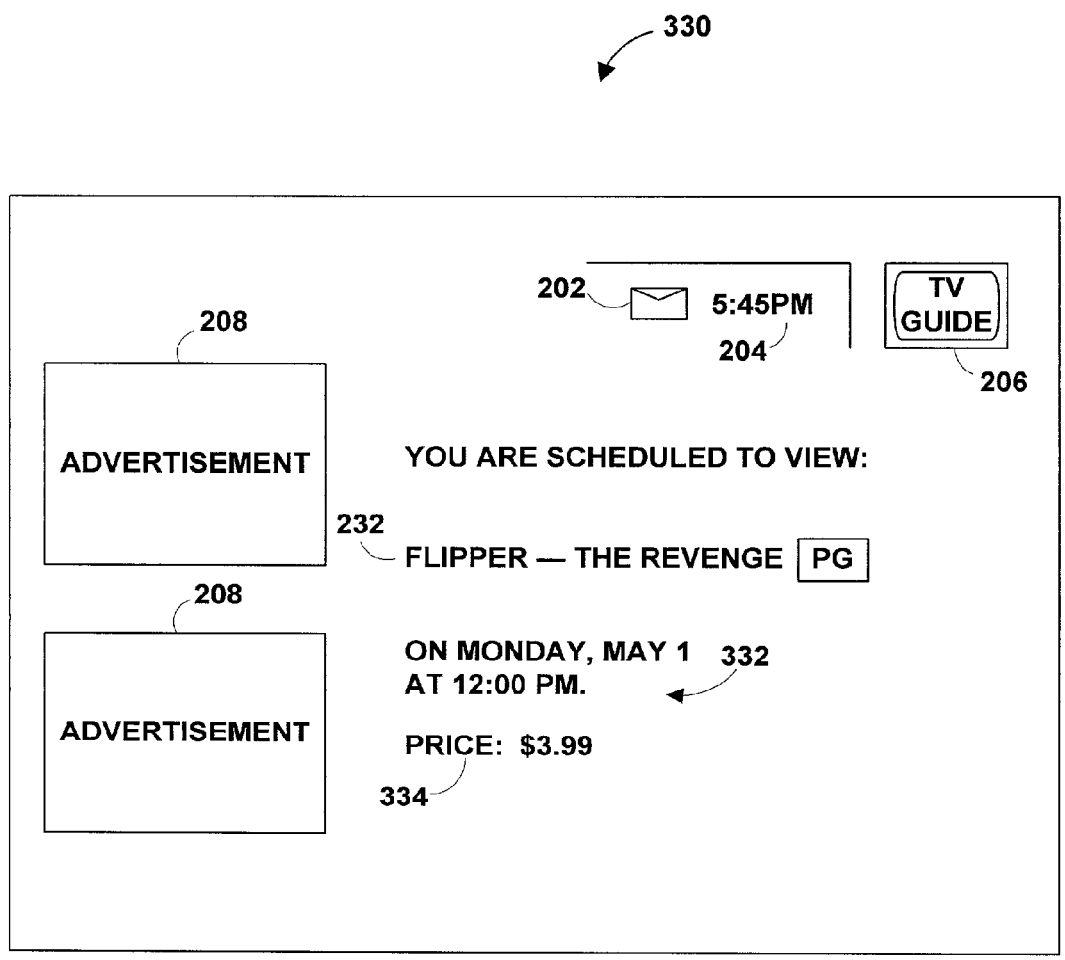
FIG. 20 is an illustrative display screen that may be provided in response to a selection of a date and time to view the movie in accordance with one embodiment of the present invention.

FIG. 20 shows an illustrative display screen 330 that may be provided by the interactive television application in response to the selection of OK button 320 of FIG. 18 or OK button 328 of FIG. 19. Display screen 330 may include mail icon 202, clock 204, provider logo 206, and one or more interactive advertisements 208. Display screen 330 may include movie title 232, such as Flipper—The Revenge. Display screen 330 may include a schedule status 332 that shows the user the date and time selected in display screen 310 (e.g., in calendar region 312) to view the movie. Display screen 330 may include a price region 334 that provides the user with the price to view the movie at the selected time (e.g., $3.99).

The interactive television application may automatically set a reminder to notify the user of the presentation of the movie. For example, as shown in display screen 330, the user has selected May 1 at 12:00 PM to view the movie selection. A reminder may be provided to the user at some time prior to 12:00 PM on May 1 (not shown). The reminder may include information such as the name of the movie. The reminder may provide the user with the ability to watch the movie at the present time, to decline to watch the movie at the present time, to request a refund for the scheduled movie presentation, to reschedule the presentation of the movie, or any other suitable option in connection with the presentation of the movie. If the user does not respond to the reminder, the interactive television application may cancel the presentation of the movie. The interactive television application may or may not charge the user for the cancellation.

In another suitable approach, the date and time that the user selected in FIG. 18 or FIG. 19 may be unavailable for the presentation of the movie (e.g., the suggested bandwidth of the movie is greater than the available bandwidth for transmission at that date and time). In such an event, display screen 330 of FIG. 20 may provide the user with the ability to choose a different date and time in the future to view the movie (not shown). This may be similar to the calendar regions shown on display screen 310 of FIG. 18 or display screen 322 of FIG. 19. In another suitable approach, display screen 330 may provide the user with the ability to select a reduced-bandwidth version of the movie (not shown). Display screen 330 of FIG. 20 is a merely illustrative arrangement. Any other suitable arrangement may be used.

Referring back to FIG. 17, the interactive television application may provide button 304 that allows the user to view recommended times to view the movie in the future. In response to a selection of button 304, the interactive television application may provide the user with a display screen 340 of FIG. 21.

Figure 21:
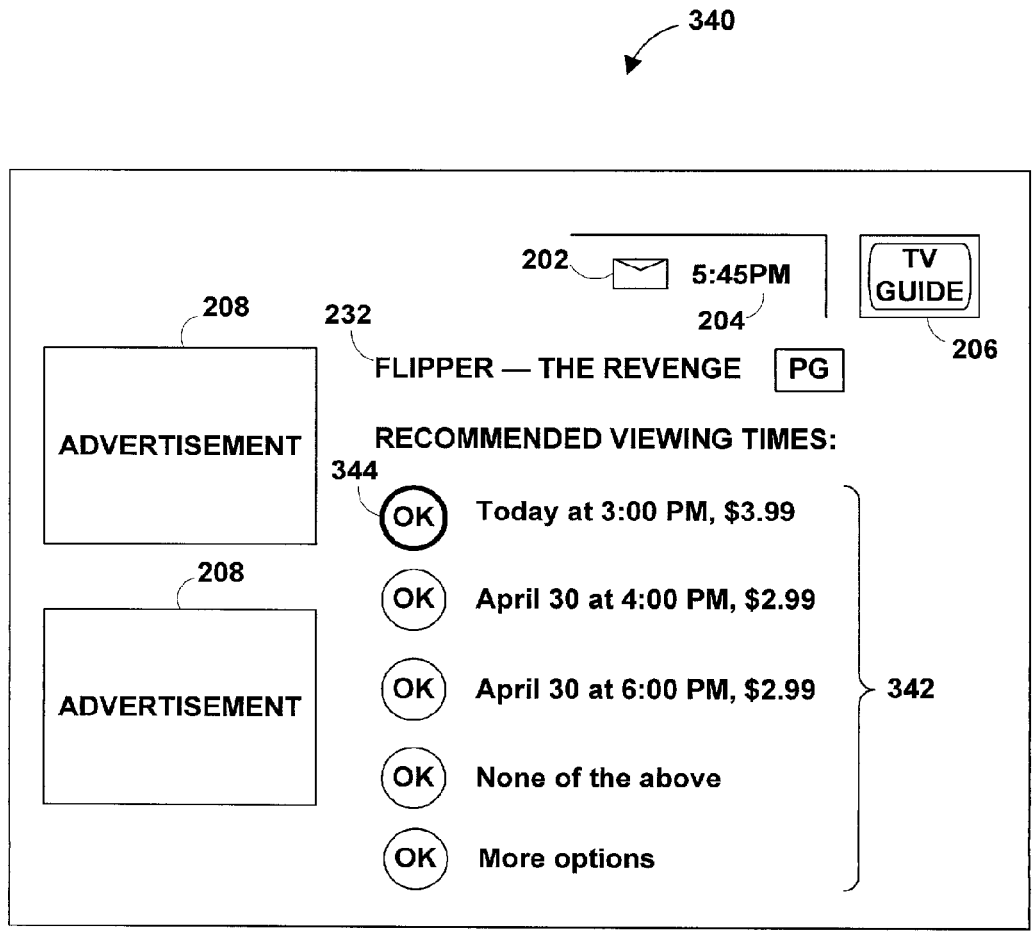
FIG. 21 is an illustrative display screen that may be provided in response to a request to view recommended times to view the movie in the future in accordance with one embodiment of the present invention.

FIG. 21 shows illustrative display screen 340 that may be provided by the interactive television application in response to a request to view recommended times to view the movie in the future (e.g., a selection of button 304 of FIG. 17). Display screen 340 may include mail icon 202, clock 204, provider logo 206, and one or more interactive advertisements 208. Display screen 340 may include movie title 232, for example, Flipper—The Revenge.

As shown, display screen 340 may provide the user with a list 342 of options related to viewing the movie in the future. One or more recommended viewing times may be provided to the user. A recommended viewing time may be a date and time that the availability of the movie is guaranteed, for example, times at which the available bandwidth is greater than or equal to the suggested bandwidth of the movie. In another suitable approach, a recommended viewing time may be a date and time of predicted lower usage of on-demand media, for example, a date and time that has, on average, a low percentage of on-demand media usage. List 342 may provide the user with the next available time to view the movie (e.g., today at 3:00 PM). The movies in list 342 may all be full-bandwidth versions of the movies. In another suitable approach, the movies in list 342 may be reduced-bandwidth versions of the movies. In such a case, the bandwidth quality for each movie may be available for the user to review. A price corresponding to each available time may be provided to the user. As shown, the interactive television application may provide the user with three recommended times. In another suitable approach, the interactive television application may provide the user with any number of available times. The interactive television application may provide the user with a "none of the above" option (e.g., return to screen 300 of FIG. 17 to choose other options) and a "more options" option (e.g., recommended viewing times) in connection with the viewing the movie. Display screen 340 of FIG. 21 is a merely illustrative arrangement. Any other suitable arrangement may be used.

As shown in FIG. 21, the user may highlight button 344 (e.g., to select a viewing time at 3:00 PM today for a price of $3.99). In one suitable approach, the user may highlight button 344 by pressing arrow keys 166 of remote control 162 (as shown in FIG. 4), and may select button 344 by pressing OK key 168 of the remote control. In response to the selection of button 344, the interactive television application may provide the user with a display confirming the date and time that the user is scheduled to view the movie (not shown).

The interactive television application may automatically set a reminder to notify the user of the presentation of the movie. For example, as shown in display screen 340, the user has selected today at 3:00 PM to view the movie selection. A reminder may be provided to the user at some time prior to 3:00 PM on the current date (not shown). The reminder may include information such as the name of the movie. The reminder may provide the user with the ability to watch the movie at the present time, to decline to watch the movie at the present time, to request a refund for the scheduled movie presentation, to reschedule the presentation of the movie, or any other suitable option in connection with the presentation of the movie.

Figure 22:
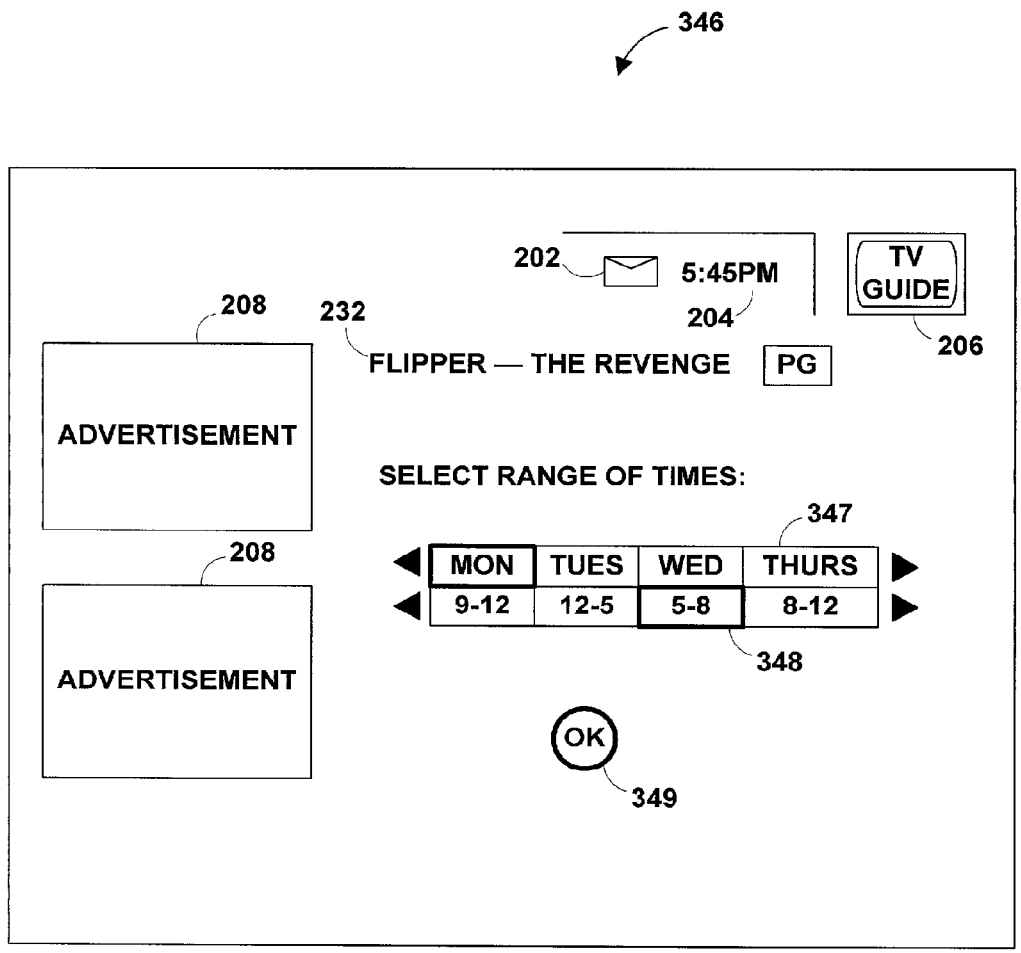
FIG. 22 is another illustrative display screen that may be provided in response to a request to view recommended times to view the movie in the future in accordance with one embodiment of the present invention.

FIG. 22 shows an illustrative display screen 346 that may be provided in another suitable approach by the interactive television application in response to a request to view recommended times to view the movie in the future (e.g., a selection of button 304 of FIG. 17). Display screen 346 may include mail icon 202, clock 204, provider logo 206, and one or more interactive advertisements 208. Display screen 340 may include movie title 232, for example, Flipper—The Revenge.

Display screen 346 may provide the user with the ability to select a range of times from which the interactive television application may provide recommended viewing times to the user. Display screen 346 may include a day range 347 and a time range 348. The user may scroll through the days and times provided in both day range 347 and time range 348, respectively, by using arrow keys 166 of remote control 162 (as shown in FIG. 4). As shown, the user has selected Monday from day range 347 and 5-8 PM from time range 348. To input the selection, the user may select an OK button 349 by pressing OK key 168 of the remote control. In response to a selection of OK button 349, the user may be provided with a screen similar to display screen 340 that includes recommended viewing times within the selected range (e.g., Monday from 5-8 PM). Display screen 346 of FIG. 22 is a merely illustrative arrangement. Any other suitable arrangement may be used. For example, the time ranges may be smaller (e.g., one hour) or larger (e.g., eight hours) than those shown. In another example, the time ranges may be user-specified in a set-up screen (not shown).

Referring back to FIG. 17, the interactive television application may provide a button 306 that allows the user to view the general availability of on-demand media. In response to a selection of button 306, a display screen 350 of FIG. 23 may be provided to the user.

Figure 23:
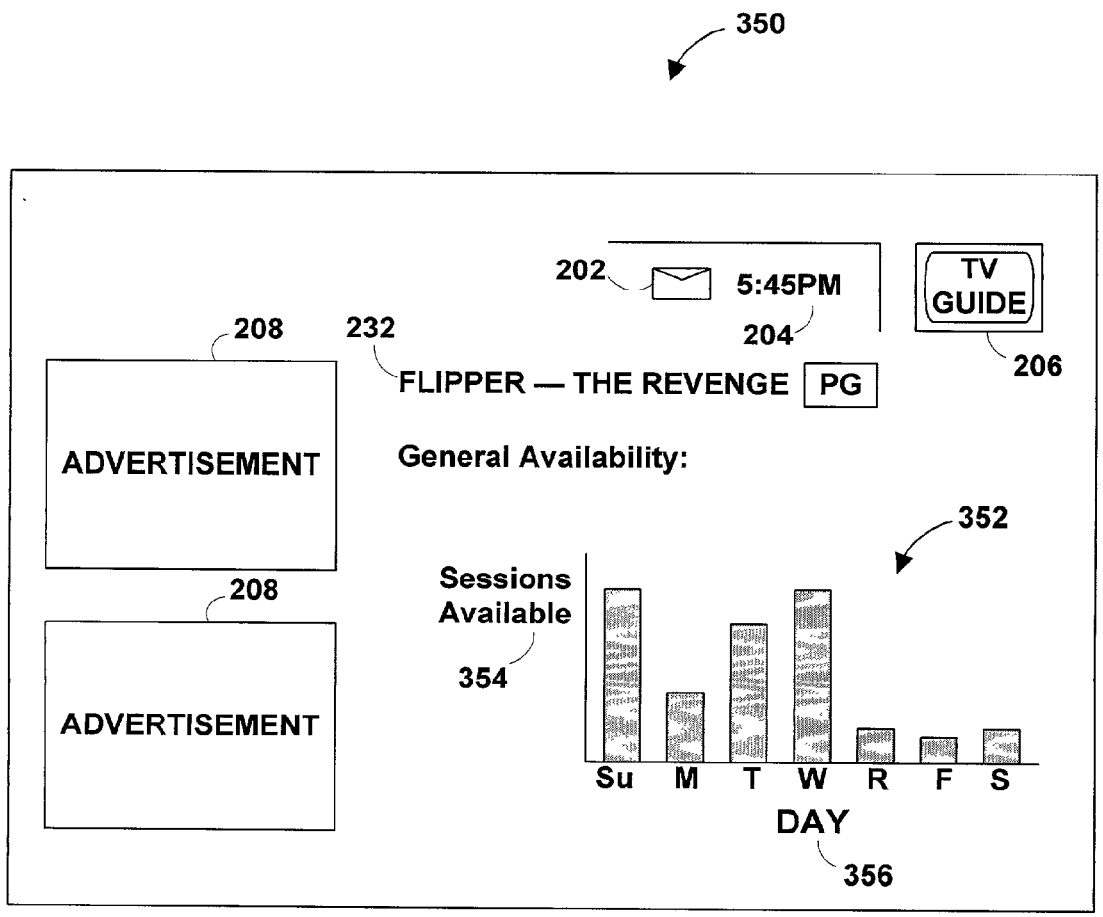
FIG. 23 is an illustrative display screen that may be provided in response to a request to view general availability of on-demand media in accordance with one embodiment of the present invention.

FIG. 23 shows illustrative display screen 350 that may be provided by the interactive television application in response to a request to view the general availability of on-demand media (e.g., a selection of button 306 of FIG. 17). Display screen 350 may include mail icon 202, clock 204, provider logo 206, and one or more interactive advertisements 208. Display screen 350 may include movie title 232, such as Flipper—The Revenge. As shown, display screen 350 may provide the user with a bar graph 352 that graphically represents the general availability of on-demand media. Bar graph 352 may plot sessions available on an axis 354 and the day of the week on an axis 356. Sessions may also be referred to as tickets (e.g., tickets to watch the movie). For example, on Sundays (e.g., represented by "Su" on axis 356), the number of on-demand media sessions generally available is high in comparison with the remainder of the week. In contrast, on Fridays (e.g., represented by "F" on axis 356), the number of sessions generally available is low in comparison with the remainder of the week. The information shown in bar graph 352 may provide the user with guidance as to what days are most likely to have sessions available for viewing. For example, bar graph 352 shows that, in general, Sunday, Tuesday, and Wednesday have a greater number of sessions available in comparison to the remainder of the week. The interactive television application may offer on-demand media at a discounted price on days of the week with a large number of sessions available. This may influence the user to request on-demand media for those days. Display screen 350 of FIG. 23 is a merely illustrative arrangement. Any other suitable arrangement may be used.

The user may select a bar from bar graph 352 (e.g., a bar corresponding to the general availability of on-demand media on Sundays). In response to a selection of the bar, the user may be provided with a display that shows the availability of on-demand media throughout the day represented by the bar.

Figure 24:
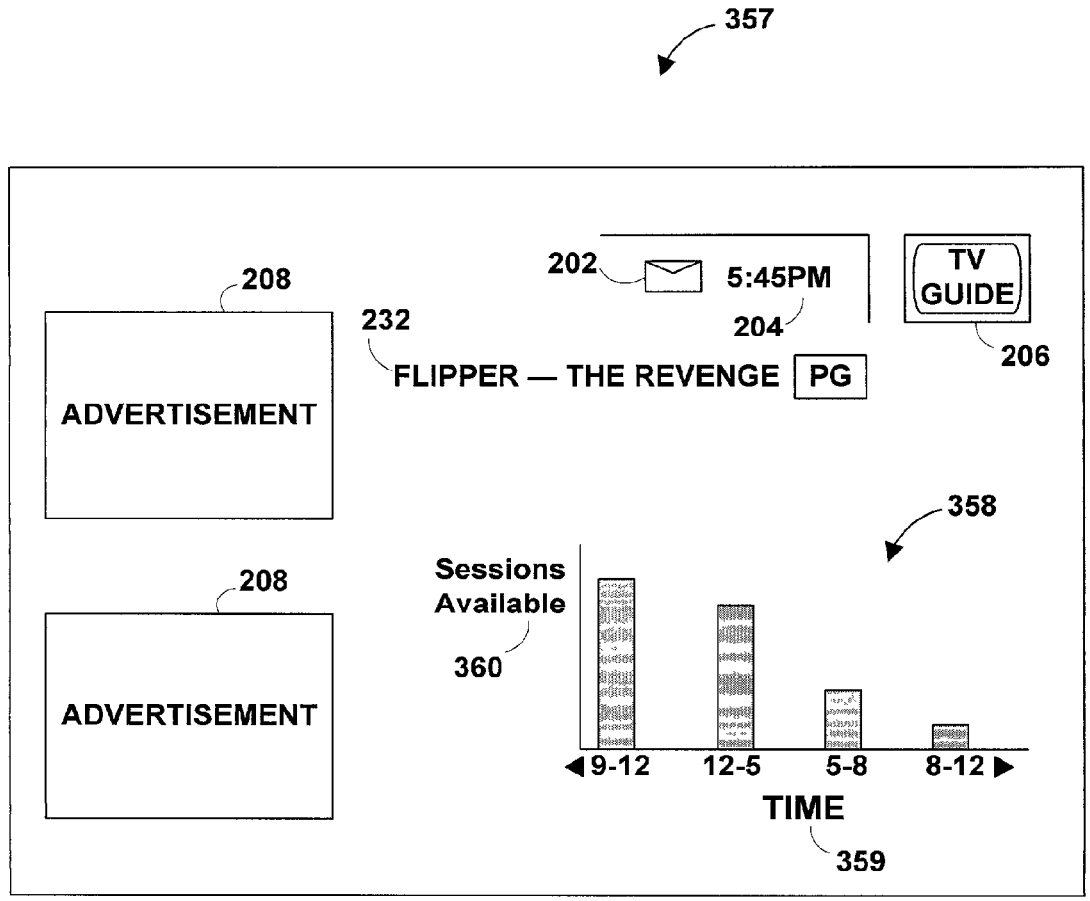
FIG. 24 is another illustrative display screen that may be provided in response to a request to view general availability of on-demand media in accordance with one embodiment of the present invention.

FIG. 24 shows an illustrative display screen 357 that may be provided by the interactive television application in response to a selection of a bar of bar graph 352 (as shown in FIG. 23). Display screen 357 may include mail icon 202, clock 204, provider logo 206, and one or more interactive advertisements 208. Display screen 357 may include movie title 232, such as Flipper—The Revenge. As shown, display screen 357 may provide the user with a bar graph 358 that graphically represents the availability of bandwidth to view on-demand media on a specific day (e.g., the day selected in display screen 350 of FIG. 22). An axis 359 may represent time and an axis 360 may represent sessions available. In this example, the number of on-demand media sessions available on Sunday from 9-12 PM and from 12-5 PM is high in comparison with the remainder of the day. In contrast, the number of sessions available from 5-8 PM and from 8-12 PM is low in comparison with the remainder of the day. The user may use arrow keys 166 of remote control 162 (as shown in FIG. 4) to scroll through the times provided on time axis 359.

The information shown in bar graph 358 may provide the user with guidance as to what times on a specific day are most likely to have sessions available for viewing. The interactive television application may offer on-demand media at a discounted price for times during the day with a large number of sessions available. This may influence the user to request on-demand media for those times. Display screen 357 of FIG. 24 is a merely illustrative arrangement. Any other suitable arrangement may be used. For example, the time ranges included on axis 359 are merely illustrative. The time ranges may be smaller (e.g., one hour) or larger (e.g., eight hours) than those shown. In another suitable approach, the time ranges may be user-specified in a set-up screen (not shown).

Referring back to FIG. 14, the interactive television application may provide a button 276 that allows the user to download the movie to a recording device. In response to a selection of button 276, the interactive television application may provide a display screen 362 of FIG. 25 to the user.

Figure 25:
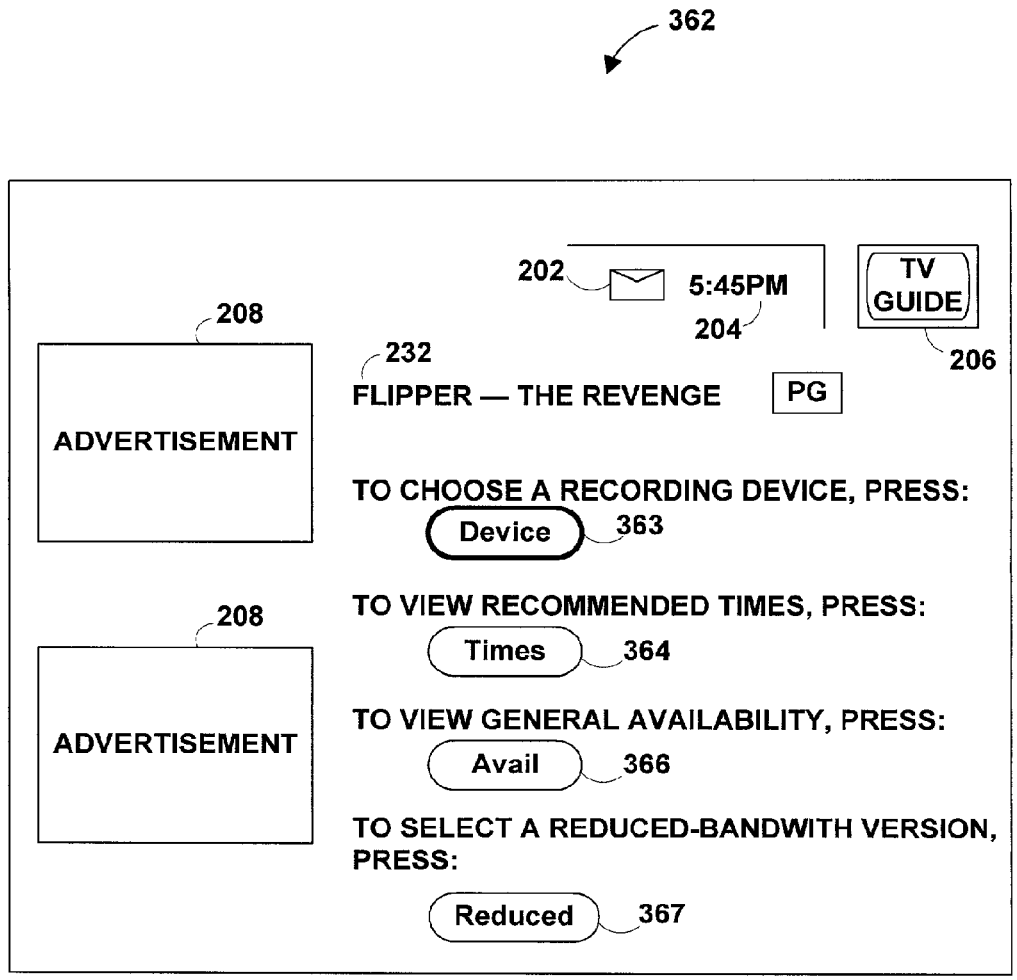
FIG. 25 is an illustrative display screen that may be provided in response to a request to download the movie to a recording device in accordance with one embodiment of the present invention.

FIG. 25 shows illustrative display screen 362 that may be provided by the interactive television application in response to a request to download the movie to a recording device (e.g., a selection of button 276 of FIG. 14). Display screen 362 may include mail icon 202, clock 204, provider logo 206, and one or more interactive advertisements 208. Display screen 362 may include movie title 232, such as Flipper—The Revenge.

Display screen 362 may include options in connection with downloading the movie to a recording device. As shown, the interactive television application may provide the user with four options in connection with downloading the movie to a recording device. In another suitable approach, the interactive television application may provide the user with any number of options in connection with downloading the movie to a recording device. The interactive television application may provide a button 363 that allows the user to choose a recording device. The interactive television application may provide a button 364 that allows the user to view recommended times to download the movie to a recording device. The interactive television application may provide a button 366 that allows the user to view the general availability of sessions for downloading on-demand media. The interactive television application may provide a button 367 that allows the user to select a reduced-bandwidth version of the movie selection. Display screen 362 of FIG. 25 is a merely illustrative arrangement. Any other suitable arrangement may be used.

As shown in FIG. 25, the user may highlight button 363 (e.g., to choose a recording device). In one suitable approach, the user may highlight button 363 by pressing arrow keys 166 of remote control 162 (as shown in FIG. 4), and may select button 363 by pressing OK key 168 of the remote control.

Figure 26:
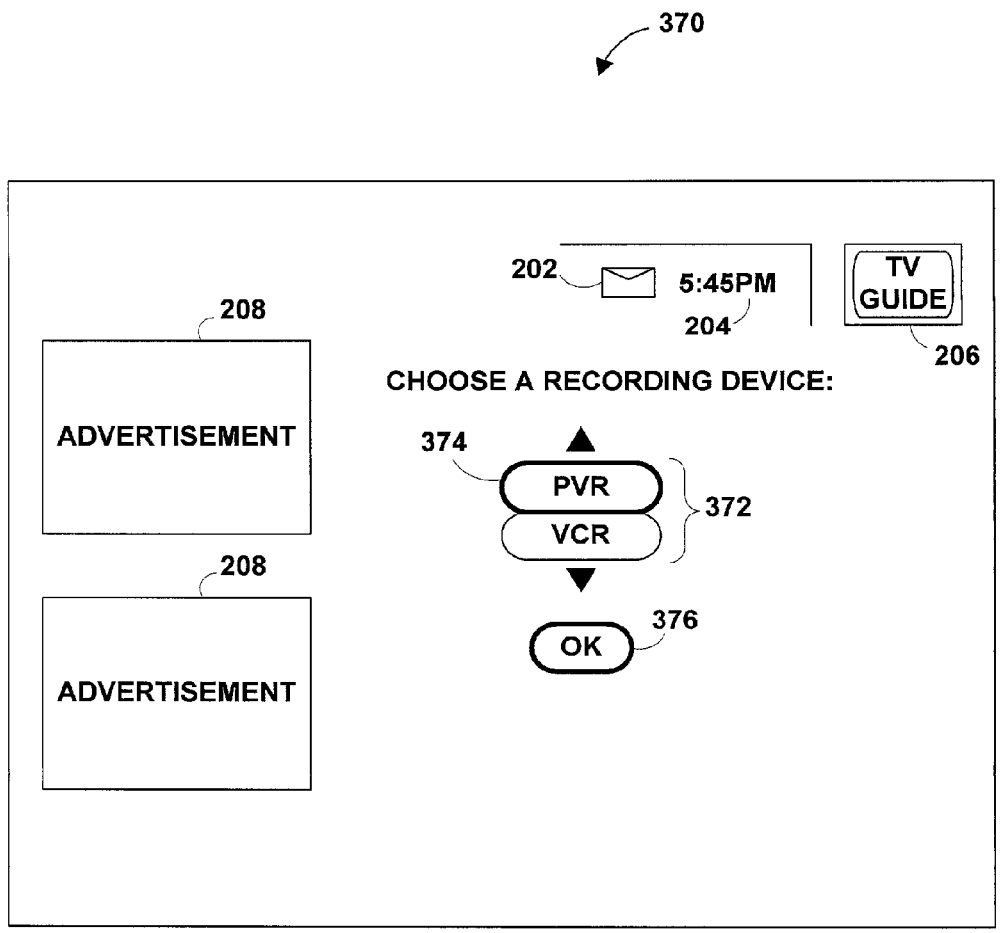
FIG. 26 is an illustrative display screen that may provide the user with the ability to select a recording device in accordance with one embodiment of the present invention.

FIG. 26 shows an illustrative display screen 370 that may be provided by the interactive television application in response to the selection of button 363 of FIG. 25. Display screen 370 may include mail icon 202, clock 204, provider logo 206, and one or more interactive advertisements 208. As shown, display screen 370 may provide the user with the ability to choose a recording device to download the movie, such as Flipper—The Revenge. Display screen 370 may include a list 372 of recording devices. Such recording devices may include, for example, a personal video recorder (PVR), a videocassette recorder (VCR), or any other suitable recording device. The interactive television application may include a default option in list 372, such as the PVR. The PVR may have been previously selected by the user as the default recording device. The user may select a recording device such as a recording device 374 (e.g., PVR) by pressing up and down arrow keys 166 of remote control 162 (as shown in FIG. 4), and may select OK button 376 by pressing OK key 168 of the remote control. Display screen 370 of FIG. 26 is a merely illustrative arrangement. Any other suitable arrangement may be used.

Figure 27:
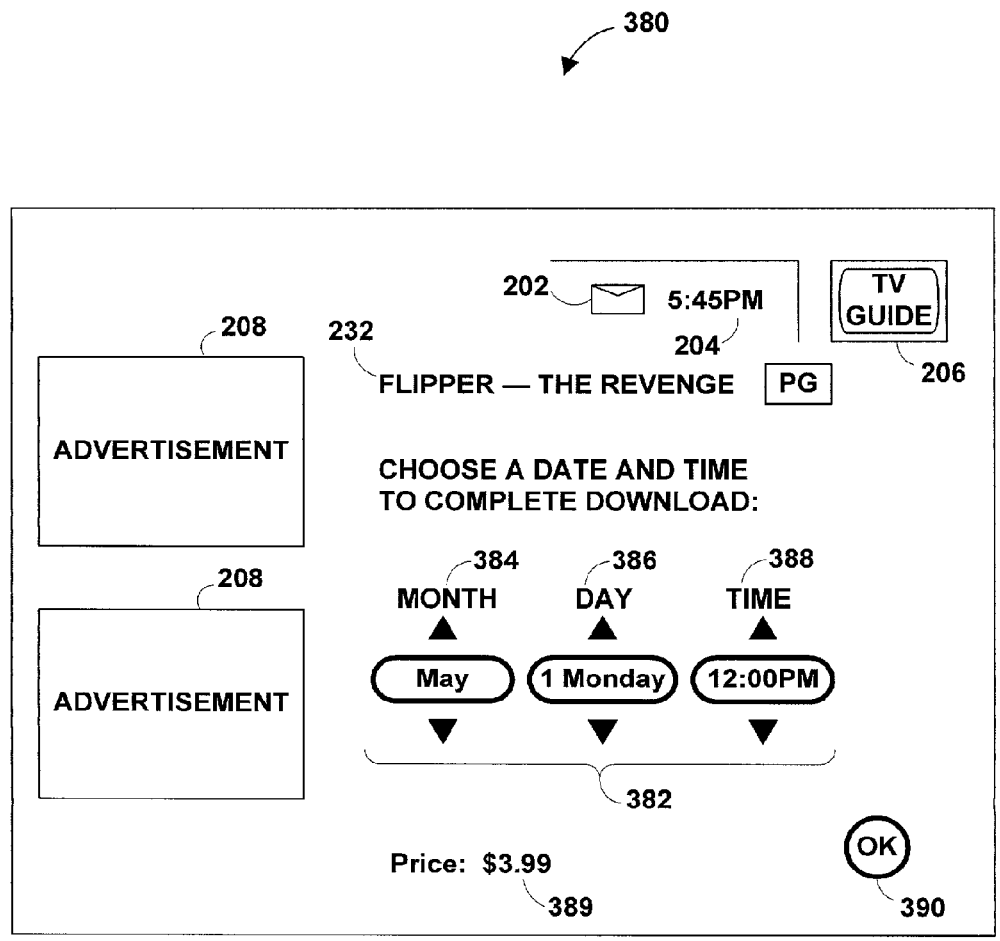
FIG. 27 is an illustrative display screen that may provide the user with the ability to choose a date and time for completion of a download of the movie to a recording device in accordance with one embodiment of the present invention.

FIG. 27 shows an illustrative display screen 380 that may be provided by the interactive television application in response to the selection of button 376 of FIG. 26. Display screen 380 may include mail icon 202, clock 204, provider logo 206, and one or more interactive advertisements 208. Display screen 380 may include movie title 232, such as Flipper—The Revenge.

As shown, display screen 380 may provide the user with the ability to choose a date and time for completion of the download of the movie to the selected recording device. Display screen 380 may include a calendar region 382 that may provide the user with the ability to select a month, day, and time to complete the download. Completing the download may involve transmitting the movie in its entirety to the selected recording device. The transmission may be in sections. In another suitable approach, the transmission of the movie may be in full. For example, a month may be selected from a list 384, a day may be selected from a list 386, and a time may be selected from a list 388. In one suitable approach, the user may highlight a month, day, and time by pressing up and down arrow keys 166 of remote control 162 (as shown in FIG. 4). The user may press right and left arrow keys 166 to toggle between lists 384, 386, and 388. In another suitable approach, the user may select a month, day, and time by pressing the appropriate numeric keys in keys 164 of remote control 162. For example, the user may press "1-2" to select the month of December. As shown, the user has selected a date of May 1 and a time of 12:00 PM to complete the download of the movie. A price that corresponds to such a selection may be provided in a price region 389. For example, to complete the download of the movie on May 1 by 12:00 PM may cost $3.99. The user may press OK key 168 of the remote control to select OK button 390. Display screen 380 of FIG. 27 is a merely illustrative arrangement. Any other suitable arrangement may be used. For example, an arrangement similar to that shown in FIG. 19 may be used.

Figure 28:
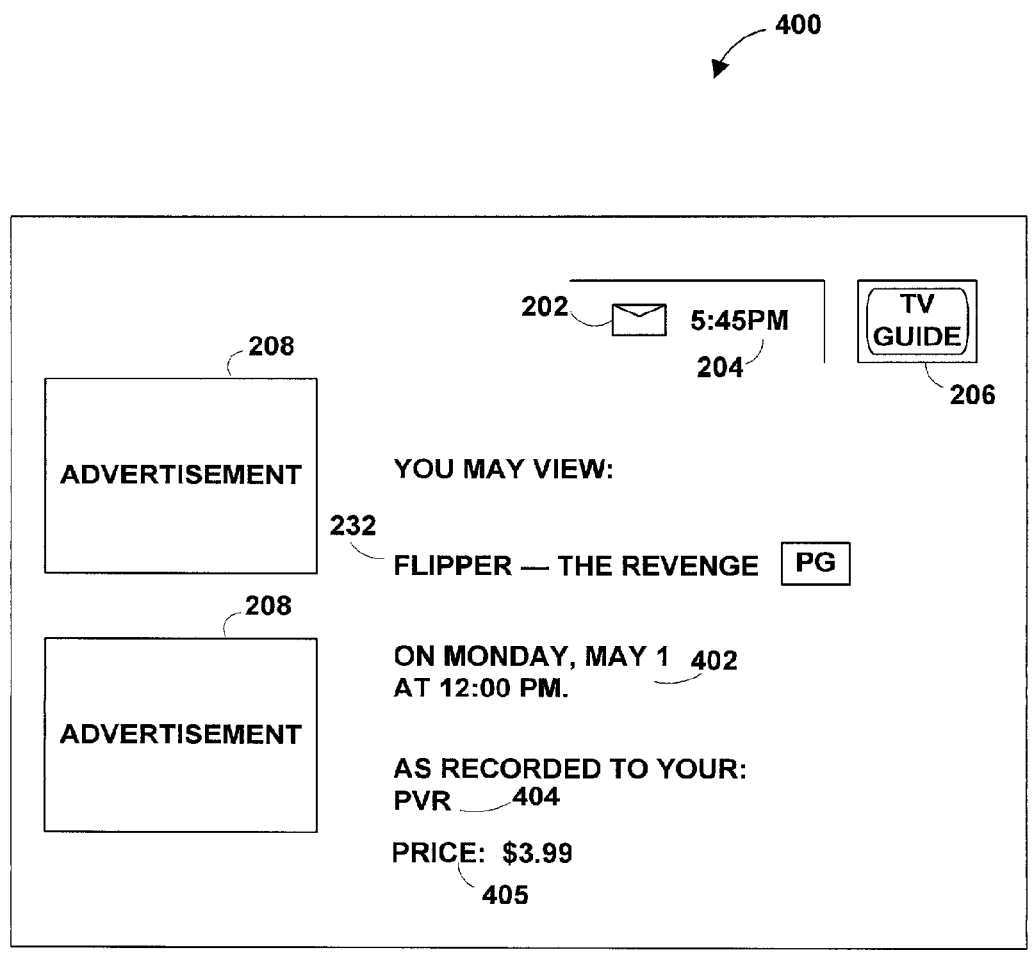
FIG. 28 is an illustrative display screen that may be provided to the user in response to a selection of a date and time for completion of a download in accordance with one embodiment of the present invention.

FIG. 28 shows an illustrative display screen 400 that may be provided by the interactive television application in response to the selection of OK button 390 of FIG. 27. Display screen 400 may include mail icon 202, clock 204, provider logo 206, and one or more interactive advertisements 208. Display screen 400 may include movie title 232, such as Flipper—The Revenge. Display screen 400 may include a schedule status 402 that shows the user the date and time selected in display screen 380 of FIG. 26 (e.g., in calendar region 382) for completion of the download of the movie to the recording device. Display screen 400 may include a recording device status 404. Status 404 may indicate to the user the recording device selected in display screen 370 of FIG. 26 to which the selected movie is to be downloaded. Display screen 400 may include a price region 405 that provides the user with a price for downloading the movie to the recording device.

The interactive television application may automatically set a reminder to notify the user of the completion of the download of the movie. For example, as shown in display screen 400, the user has selected May 1 at 12:00 PM for completion of the download of the movie selection. A reminder may be provided to the user at some time prior to 12:00 PM on May 1 (not shown). The reminder may include information such as the name of the movie. The reminder may provide the user with the ability to watch the movie at the present time, to decline to watch the movie at the present time, or any other suitable option in connection with the presentation of the downloaded movie.

In one suitable approach, the movie may be associated with a suggested bandwidth for real-time transmission of the movie. In such a case, the transmission of the movie to the recording device may be at a different bandwidth than the suggested bandwidth. In another suitable approach, the movie may be transmitted to the recording device in sections. For example, the movie may be transmitted in sections as bandwidth is available. Each section may be transmitted at a different bandwidth than other sections. This allows the interactive television application to manage the distribution of on-demand media by using bandwidth as it becomes available.

In another suitable approach, the date and time selected in calendar region 382 of FIG. 27 may be unavailable for the completion of the download of the movie (e.g., there is an insufficient amount of available bandwidth for a completed transmission by that date and time). In such an event, display screen 400 of FIG. 28 may provide the user with the ability to choose a different date and time to complete the download of the movie (not shown). This may be similar to calendar region 382 as shown on display screen 380 of FIG. 27. Display screen 400 of FIG. 28 is a merely illustrative arrangement. Any other suitable arrangement may be used.

Referring back to FIG. 25, the interactive television application may provide button 364 that allows the user to view recommended times for completion of a download to a recording device. In response to a selection of button 364, a display screen 410 of FIG. 29 may be provided to the user.

Figure 29:
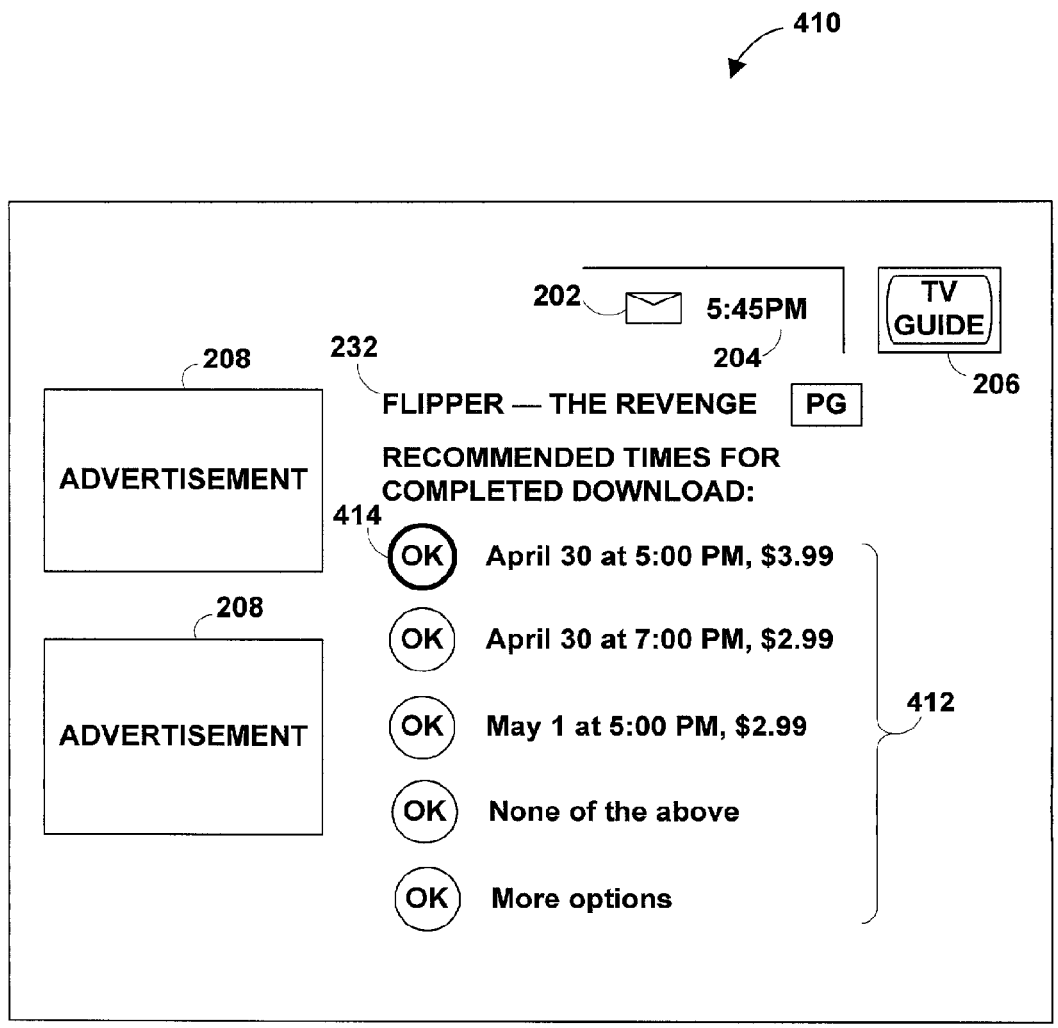
FIG. 29 is an illustrative display screen that may be provided in response to a request to view recommended times for completion of a download of the movie to a recording device in accordance with one embodiment of the present invention.

FIG. 29 shows illustrative display screen 410 that may be provided by the interactive television application in response to a request to view recommended times for completion of a download to a recording device (e.g., a selection of button 364 of FIG. 25). Display screen 410 may include mail icon 202, clock 204, provider logo 206, and one or more interactive advertisements 208. Display screen 410 may include movie title 232, such as Flipper—The Revenge.

As shown, display screen 410 may provide the user with a list 412 of options related to completing a download of the movie. A recommended time for a completed download may be a date and time by which the download of the movie is guaranteed. In another suitable approach, a recommended time for a completed download may be a date and time by which the download of the movie is predicted to be successful. List 412 may provide the user with the next available time to complete the download of the movie (e.g., April 30 at 5:00 PM). A price corresponding to each available time may be provided to the user. As shown, the interactive television application may provide the user with three recommended times. In another suitable approach, the interactive television application may provide the user with any number of available times. The interactive television application may provide the user with a "none of the above" option (e.g., return to screen 362 of FIG. 25 for other options) and a "more options" option to obtain additional options in connection with downloading the movie (e.g., recommended times for a completed download). Display screen 410 of FIG. 29 is a merely illustrative arrangement. Any other suitable arrangement may be used. For example, screen 410 may include an option to select a recording device.

As shown in FIG. 29, the user may highlight button 414 (e.g., to select a time for a completed download of 5:00 PM on April 30 for a price of $3.99). In one suitable approach, the user may highlight button 414 by pressing arrow keys 166 of remote control 162 (as shown in FIG. 4), and may select button 414 by pressing OK key 168 of the remote control. In response to the selection of button 414, the interactive television application may provide the user with a display confirming the date and time that the download of the movie is scheduled to be completed (not shown).

The interactive television application may automatically set a reminder to notify the user of the completion of the download of the movie. For example, as shown in display screen 410, the user has selected April 30 at 5:00 PM to complete the download of the movie selection. A reminder may be provided to the user at some time prior to 5:00 PM on April 30 (not shown). The reminder may include information such as the name of the movie. The reminder may provide the user with the ability to watch the downloaded movie at the present time, to decline to watch the downloaded movie at the present time, or any other suitable option in connection with the presentation of the movie.

Figure 30:
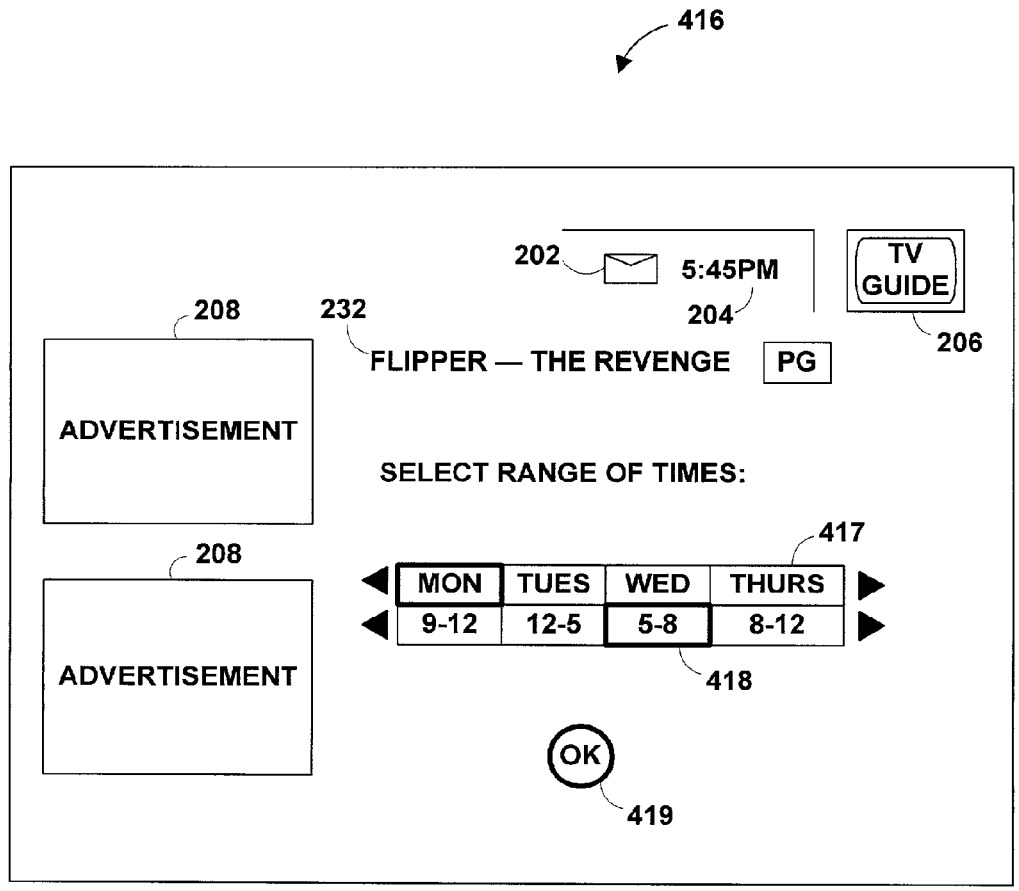
FIG. 30 is another illustrative display screen that may be provided in response to a request to view recommended times for completion of a download of the movie to a recording device in accordance with one embodiment of the present invention.

FIG. 30 shows an illustrative display screen 416 that may be provided in another suitable approach by the interactive television application in response to a request to view recommended times to complete a download of the movie to a recording device (e.g., a selection of button 364 of FIG. 25). Display screen 416 may include mail icon 202, clock 204, provider logo 206, and one or more interactive advertisements 208. Display screen 416 may include movie title 232, for example, Flipper—The Revenge.

Display screen 416 may provide the user with the ability to select a range of times from which the interactive television application may provide recommended download times to the user. Display screen 416 may include a day range 417 and a time range 418. The user may scroll through the days and times provided in both day range 417 and time range 418, respectively, by using arrow keys 166 of remote control 162 (as shown in FIG. 4). As shown, the user has selected Monday from day range 417 and 5-8 PM from time range 418. The user may select an OK button 419 by pressing OK key 168 of remote control 162. In response to a selection of OK button 419, the user may be provided with a screen similar to display screen 410 that includes recommended times for a completed download to a recording device within the selected range (e.g., Monday from 5-8 PM). Display screen 416 of FIG. 30 is a merely illustrative arrangement. Any other suitable arrangement may be used.

Referring back to FIG. 25, the interactive television application may provide button 366 that allows the user to view the general availability of times available for downloading on-demand media to a recording device. In response to a selection of button 366, a display screen 420 of FIG. 31 may be provided to the user.

Figure 31:
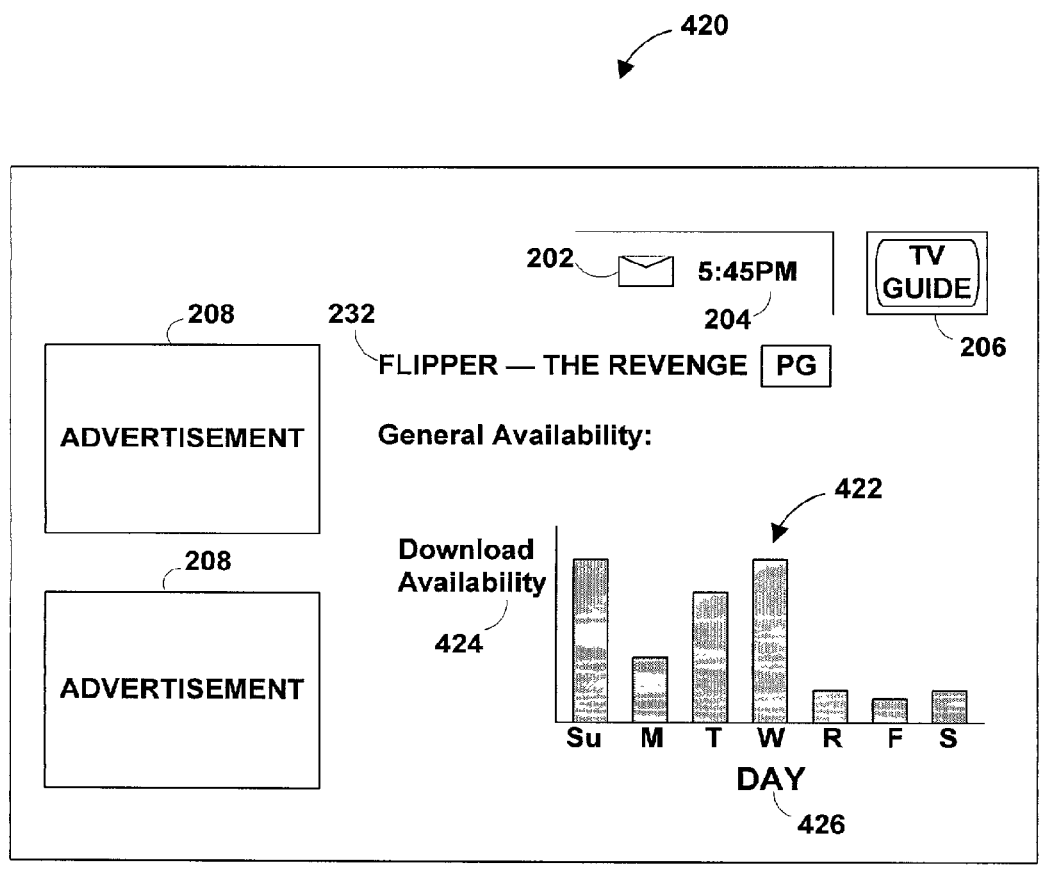
FIG. 31 is an illustrative display screen that may be provided in response to a request to view general availability of time available for downloading on-demand media to a recording device in accordance with one embodiment of the present invention.

FIG. 31 shows illustrative display screen 420 that may be provided by the interactive television application in response to a request to view the general availability of times available for downloading on-demand media to a recording device (e.g., a selection of button 366 of FIG. 25). Display screen 420 may include mail icon 202, clock 204, provider logo 206, and one or more interactive advertisements 208. Display screen 420 may include movie title 232, such as Flipper—The Revenge.

As shown, display screen 420 may provide the user with a bar graph 422 that graphically represents the general availability of times available for downloading on-demand media to a recording device. Bar graph 422 may plot the download availability on an axis 424 and the day of the week on an axis 426. For example, on Sundays (e.g., represented by "Su" on axis 426), the download availability for on-demand media is high in comparison with the remainder of the week. In contrast, on Fridays (e.g., represented by "F" on axis 356), the download availability for on-demand media is low in comparison with the remainder of the week. The information shown in bar graph 422 may provide the user with guidance as to what days are most likely to have time available to complete a download to a recording device. For example, bar graph 422 shows that, in general, Sunday, Tuesday, and Wednesday have a greater download availability for on-demand media in comparison to the remainder of the week. The interactive television application may offer discounted prices for days of the week with a large download availability. This may influence the user to request the completion of a download of on-demand media for those days. In another suitable approach, bar graph 422 may show the cumulative download availability (not shown). This availability may increase as the week progresses (e.g., the cumulative bandwidth available for downloading on-demand media continually increases). The cumulative download availability may be compared graphically to the required bandwidth to download the on-demand media selection (not shown). Display screen 420 of FIG. 31 is a merely illustrative arrangement. Any other suitable arrangement may be used.

Figure 32:
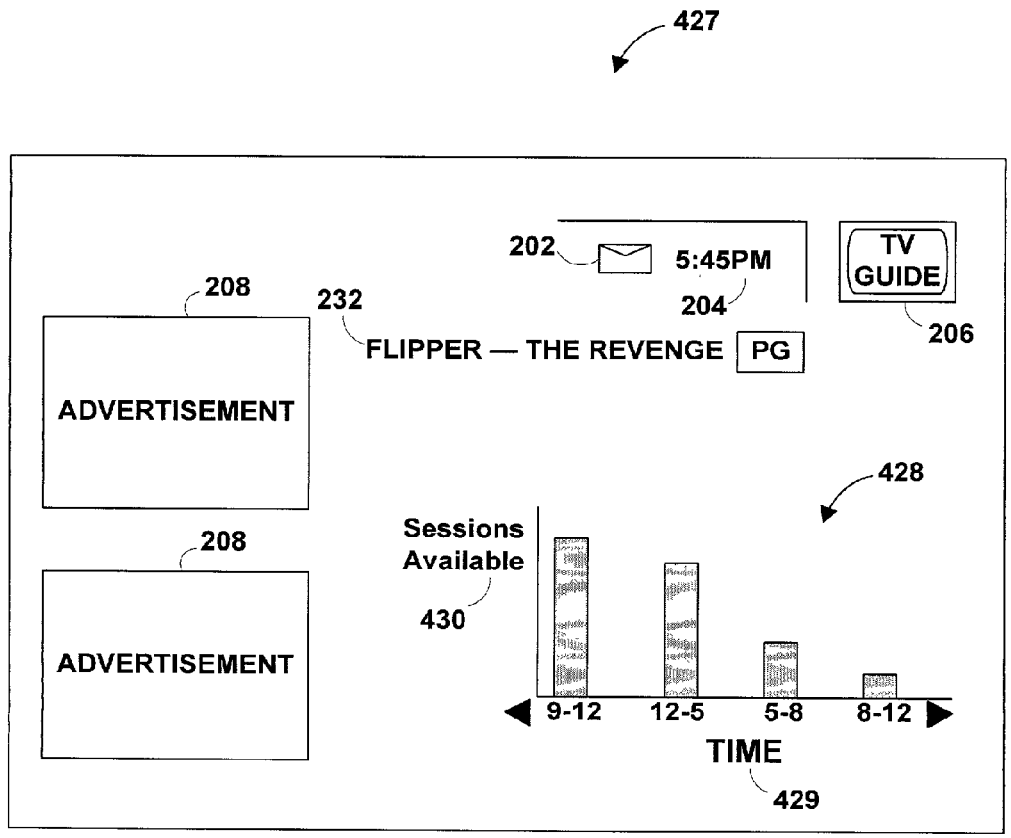
FIG. 32 is another illustrative display screen that may be provided in response to a request to view general availability of time available for downloading on-demand media to a recording device in accordance with one embodiment of the present invention.

FIG. 32 shows an illustrative display screen 427 that may be provided by the interactive television application in response to a selection of a bar of bar graph 422 (as shown in FIG. 31). Display screen 427 may include mail icon 202, clock 204, provider logo 206, and one or more interactive advertisements 208. Display screen 427 may include movie title 232, such as Flipper—The Revenge. As shown, display screen 427 may provide the user with a bar graph 428 that graphically represents the availability of bandwidth for completing a download of on-demand media on a specific day (e.g., the day selected in display screen 420 of FIG. 31). An axis 429 may represent time and an axis 430 may represent download sessions available. For example, on Sunday, the availability of downloading on-demand media from 9-12 PM and from 12-5 PM is high in comparison with the remainder of the day. In contrast, the availability of downloading on-demand media from 5-8 PM and from 8-12 PM is low in comparison with the remainder of the day. The user may use arrow keys 166 of remote control 162 (as shown in FIG. 4) to scroll through the times provided on time axis 429.

The information shown in bar graph 428 may provide the user with guidance as to what times on a specific day are most likely to have time available to complete a download of on-demand media to a recording device. The interactive television application may offer on-demand media at a discounted price for times during the day with high download availability. This may influence the user to request on-demand media for those times. Display screen 428 of FIG. 32 is a merely illustrative arrangement. Any other suitable arrangement may be used. For example, bar graph 428 may present the user with a cumulative bandwidth availability throughout a specified time range. Such a bandwidth availability may increase throughout the time range as more bandwidth becomes available for downloading the movie. Bar graph 428 may indicate to the user a time at which enough bandwidth has accumulated to satisfy the download of the movie.

Figure 33:
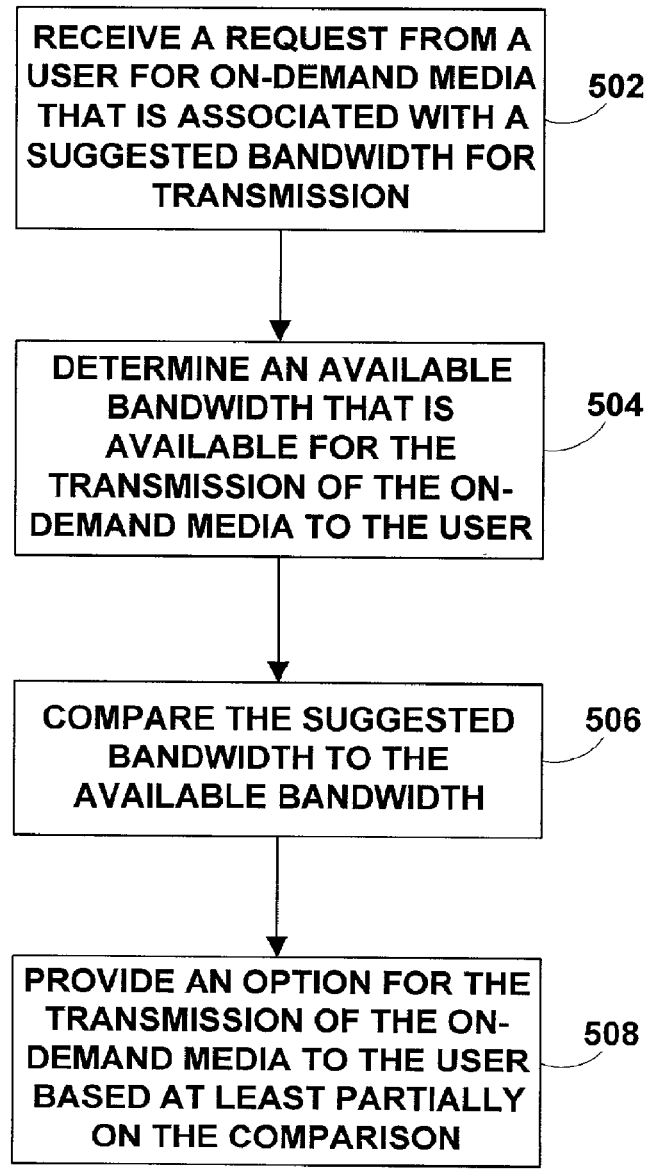
FIG. 33 is a flow chart of illustrative steps involved in managing the distribution of on-demand media in an interactive television application in accordance with one embodiment of the present invention.

FIG. 33 shows a flow chart of illustrative steps involved in managing the distribution of on-demand media in an interactive television application. Some or all of the steps may be performed. At step 502, an interactive television application may receive a request from a user for on-demand media that is associated with a suggested bandwidth for transmission. At step 504, the interactive television application may determine an available bandwidth, such as the bandwidth that is available for the transmission of the on-demand media to the user. At step 506, a television distribution facility may compare the suggested bandwidth to the available bandwidth. At step 508, the interactive television application may provide the user with an option for the transmission of the on-demand media to the user that is based at least partially on the comparison (ie., step 506). In another suitable approach, an option may be made unavailable due to the comparison. In yet another suitable approach, a price in connection with transmission of the on-demand media may be provided to the user based on the comparison.

Figure 34:
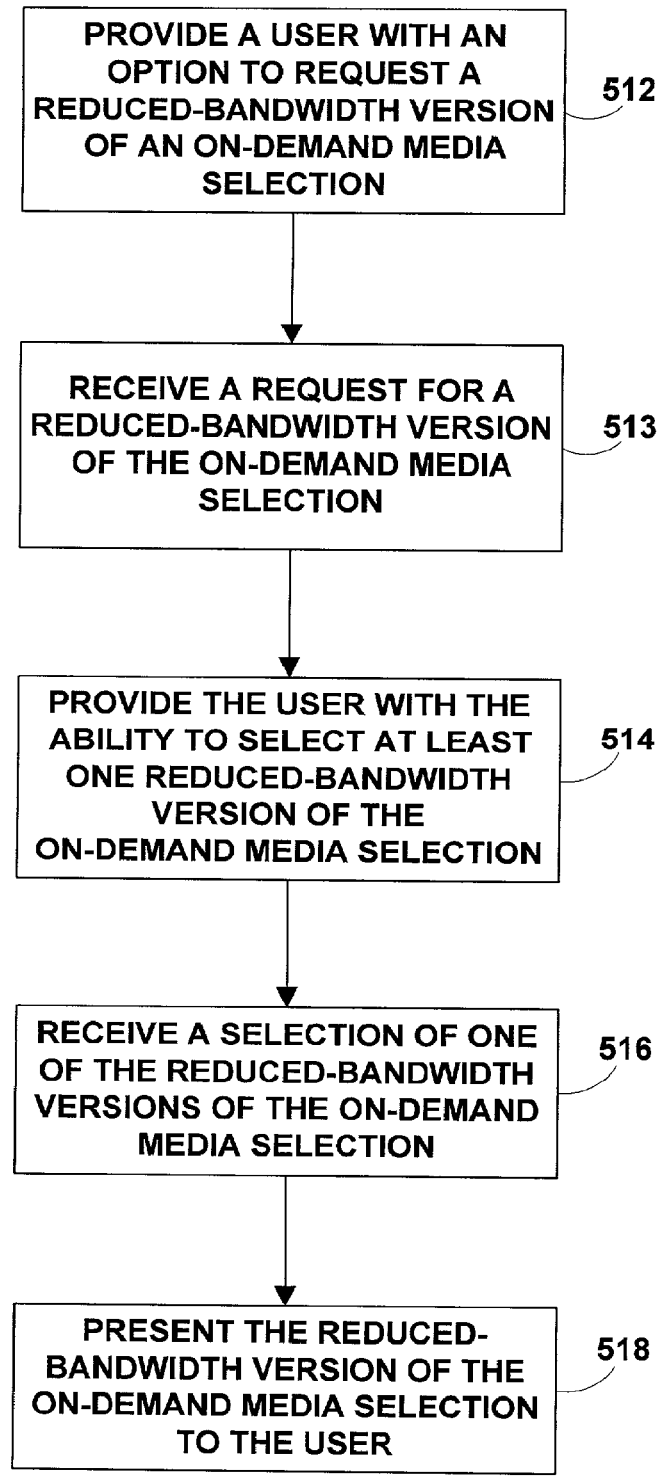
FIG. 34 is a flow chart of illustrative steps involved in providing an option for transmission of on-demand media to a user in accordance with one embodiment of the present invention.

FIG. 34 shows a flow chart of illustrative steps involved in providing an option for transmission of on-demand media to a user (ie., step 508 of FIG. 33) in an interactive television application. Some or all of the steps may be performed. At step 512, an interactive television application may provide a user with an option to request a reduced-bandwidth version of an on-demand media selection. At step 513, the interactive television application may receive a request for a reduced-bandwidth version of the on-demand media selection. At step 514, the interactive television application may provide the user with the ability to select at least one reduced-bandwidth version of the on-demand media selection. In one suitable approach, the user may be provided with the ability to select the reduced-bandwidth version of the on-demand media selection at a reduced price. At step 516, the interactive television application may receive a selection of one of the reduced-bandwidth versions of the on-demand media. At step 518, the interactive television application may present the reduced-bandwidth version of the on-demand media selection to the user.

Figure 35:
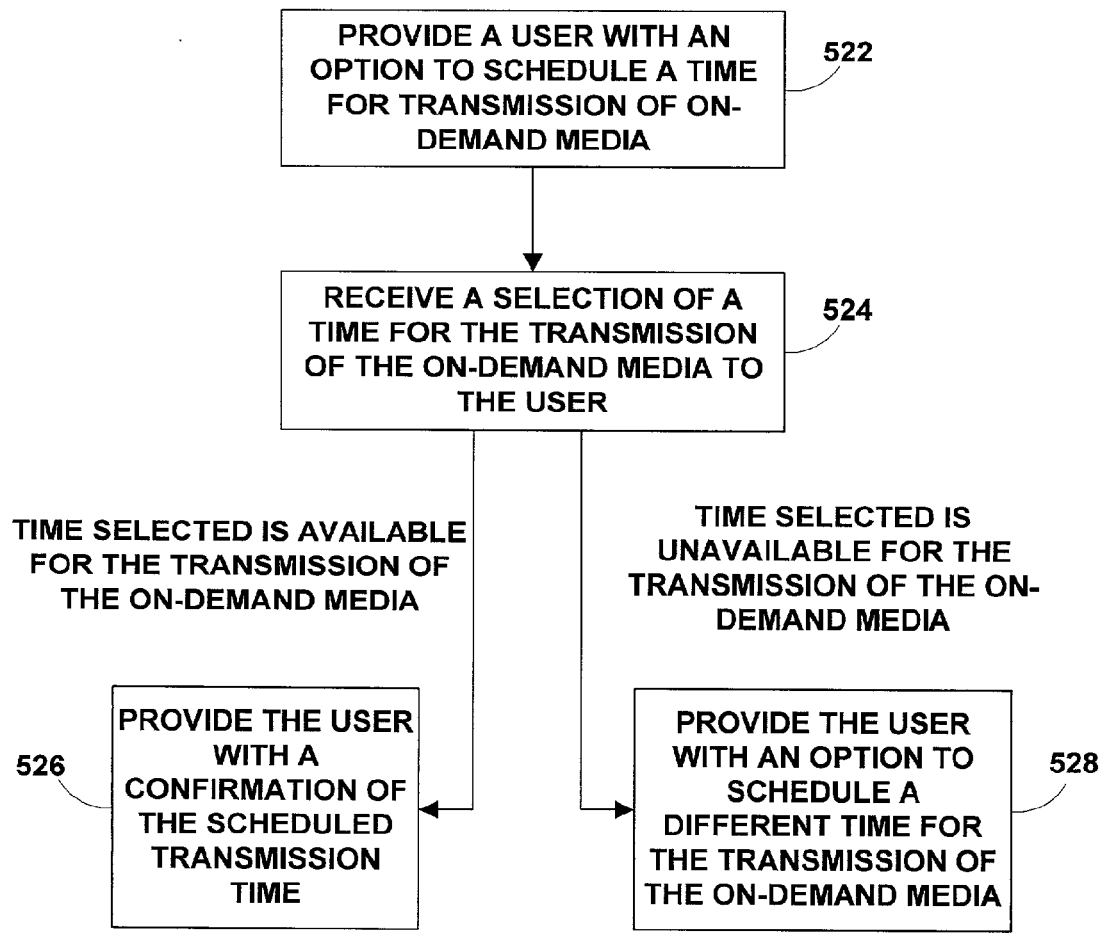
FIG. 35 is another flow chart of illustrative steps involved in providing an option for transmission of on-demand media to a user in accordance with one embodiment of the present invention.

FIG. 35 shows another flow chart of illustrative steps involved in providing an option for transmission of on-demand media to a user (ie., step 508 of FIG. 33). Some or all of the steps may be performed. At step 522, an interactive television application may provide a user with an option to schedule a time for transmission of on-demand media. In one suitable approach, the user may be provided with a price that is dependent on the time scheduled for transmission. In another suitable approach, the user may be provided with a price that is dependent on a bandwidth selected for transmission of the on-demand media. At step 524, the interactive television application may receive a selection of a time for the transmission of the on-demand media to the user. After receiving the selection of the time for transmission, one of at least two paths may be followed. If the time selected is available for the transmission of the on-demand media, the interactive television application may provide the user with a confirmation of the scheduled transmission time at step 526. In one suitable approach, the interactive television application may provide the user with a reminder in connection with the scheduled transmission of the on-demand media. If the time selected for the transmission of the on-demand media is unavailable, the interactive television application may provide the user with an option to schedule a different time for the transmission of the on-demand media at step 528.

Figure 36:
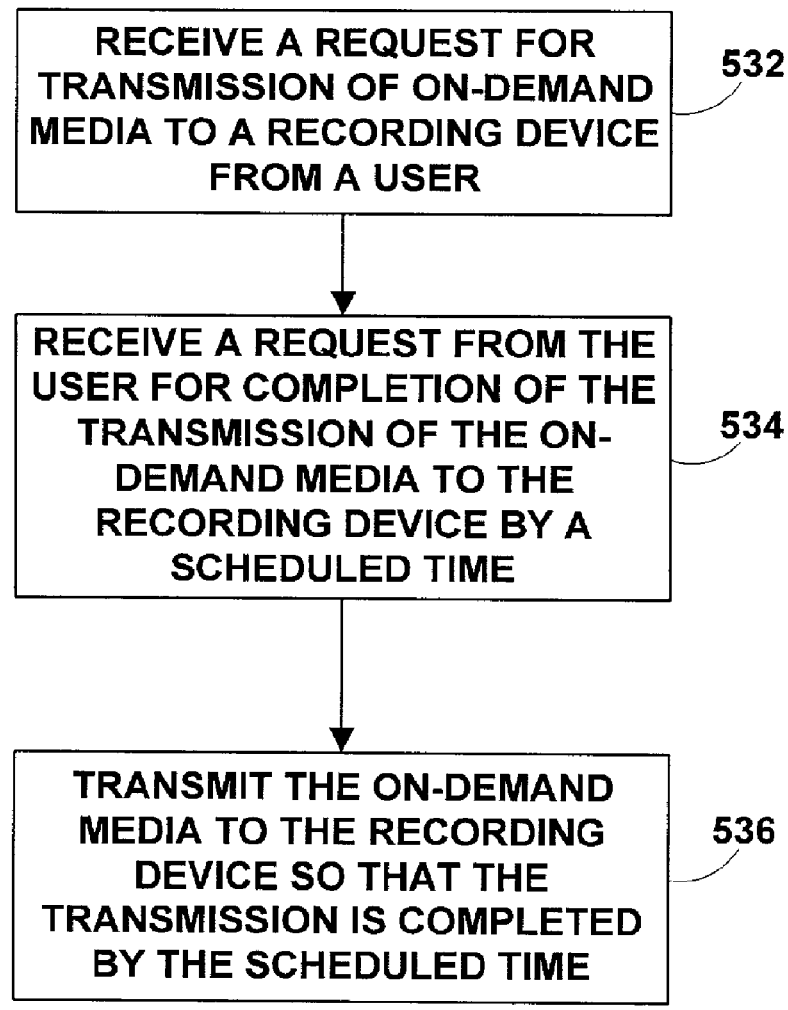
FIG. 36 is another flow chart of illustrative steps involved in managing the distribution of on-demand media in an interactive television application in accordance with one embodiment of the present invention.

FIG. 36 shows a flow chart of illustrative steps involved in managing the distribution of on-demand media in an interactive television application. Some or all of the steps may be performed. At step 532, an interactive television application may receive a request for transmission of on-demand media to a recording device from a user. At step 534, the interactive television application may receive a request from the user for completion of the transmission of the on-demand media to the recording device by a scheduled time. In one suitable approach, the interactive television application may offer a price for the on-demand media based on the scheduled time for the completed transmission of the on-demand media. In another suitable approach, the interactive television application may offer a price for the on-demand media based on a selected bandwidth for the transmission of the on-demand media. At step 536, the interactive television application may transmit the on-demand media to the recording device so that the transmission is completed by the scheduled time.

In one suitable approach, the on-demand media may be made available to the user for limited access. For example, the user may be allowed to access the on-demand media a limited number of times. In the case of a video-on-demand selection, the user may be able to view the selection a limited number of times. In another suitable approach, the on-demand media may be made available to the user for limitless access. For example, the user may be allowed to access the on-demand media an unlimited number of times. In the case of a video-on-demand selection, the user may be able to view the selection as many times as the user desires. The price associated with the download of the on-demand media may be associated with the number of times that the user is permitted to access the on-demand media (e.g., the price may increase as the number of times the user may access the on-demand media increases).

In one suitable approach, the on-demand media requested by the user may be associated with a suggested bandwidth for real-time transmission of the on-demand media. In such a case, the transmission of the on-demand media to the recording device of step 536 may be at a different bandwidth than the suggested bandwidth. In another suitable approach, the on-demand media requested by the user may be transmitted to the user in sections in step 536. For example, the on-demand media may be transmitted in sections as bandwidth is available. Each section may be transmitted at a different bandwidth than other sections.

Thus, systems and methods for managing the distribution of on-demand media are provided. One skilled in the art will realize that the present invention can be practiced by other than the described embodiments, which are presented for purposes of illustration and not of limitation, and that the present invention is limited only by the claims which follow.

What is claimed is:

1. A method for managing the distribution of on-demand media using an interactive television application, the method comprising:

receiving a request for on-demand media from a user, wherein:

a television distribution facility is configured to transmit the on-demand media to the user at one of a plurality of bandwidths, a first of the plurality of bandwidths is greater than a second of the plurality of bandwidths, and the second of the plurality of bandwidths is less than an available bandwidth at the television distribution facility for transmission of the on-demand media;

comparing the first of the plurality of bandwidths to the available bandwidth; and responsive to the comparison of the first of the plurality of bandwidths to the available bandwidth:

providing the user with an option to receive the on-demand media at the second of the plurality of bandwidths based at least in part on the comparison of the first of the plurality of bandwidths to the available bandwidth, wherein a selection of the option causes a transmission of the on-demand media at the second of the plurality of bandwidths from the television distribution facility exclusively to the user.

2. The method of claim 1 wherein receiving the request comprises receiving the request for real-time transmission of the on-demand media.

3. The method of claim 1 wherein receiving the request comprises receiving the request for transmission of the on-demand media at a future time.

4. The method of claim 1 wherein receiving the request comprises receiving the request for on-demand media that is selected from the group consisting of an audio selection, a video selection, an electronic publication, an electronic game, a software application, and any combination thereof.

5. The method of claim 1 further comprising presenting the first of the plurality of bandwidths to the user.

6. The method of claim 5 wherein presenting the first of the plurality of bandwidths to the user comprises displaying time variation of the first of the plurality of bandwidths on the display.

7. The method of claim 5 wherein presenting the first of the plurality of bandwidths to the user comprises displaying a graphical representation of time variation of the first of the plurality of bandwidths on the display.

8. The method of claim 6 wherein presenting the first of the plurality of bandwidths to the user comprises audibly presenting the first of the plurality of bandwidths.

9. The method of claim 1 further comprising presenting the available bandwidth to the user by displaying a graphical representation of time variation of the available bandwidth on the display.

10. The method of claim 1 further comprising presenting the available bandwidth to the user by audibly presenting the available bandwidth.

11. The method of claim 1 wherein comparing the first of the plurality of bandwidths to the available bandwidth comprises determining that the available bandwidth is greater than or equal to the first of the plurality of bandwidths.

12. The method of claim 1 wherein comparing the first of the plurality of bandwidths to the available bandwidth comprises determining that the available bandwidth is less than the first of the plurality of bandwidths.

13. The method of claim 1 wherein providing the option for the transmission of the on-demand media comprises providing the user with an ability to schedule a time for the transmission of the on-demand media to the user.

14. The method of claim 13 wherein providing the user with the ability to schedule the time for the transmission of the on-demand media comprises basing a price for the transmission of the on-demand media on the scheduled time.

15. The method of claim 1 wherein providing the option for the transmission of the on-demand media comprises recommending a time to the user for the transmission of the on-demand media to the user.

16. The method of claim 1 wherein providing the option for the transmission of the on-demand media comprises presenting a general trend to the user of available time slots for transmitting on-demand media in response to user requests.

17. The method of claim 1 wherein providing the user with the ability to request the version of the on-demand media having the second of the plurality of bandwidths comprises basing a price for the transmission of the on-demand media on the second of the plurality of bandwidths.

18. The method of claim 1 further comprising providing another option to transmit the on-demand media to a recording device for presentation to the user at a scheduled time.

19. The method of claim 18 wherein providing the option to transmit the on-demand media to the recording device for presentation to the user at the scheduled time comprises basing a price for the transmission of the on-demand media to the recording device on the scheduled time.

20. The method of claim 18 further comprising transmitting the on-demand media in a plurality of sections wherein each section is transmitted at the first of the plurality of bandwidths.

21. The method of claim 18 further comprising transmitting the on-demand media in a plurality of sections wherein at least one of the plurality of sections has a bandwidth that is different than the first of the plurality of bandwidths.

22. The method of claim 18 further comprising transmitting the on-demand media at a bandwidth that is different than the first of the plurality of bandwidths.

23. The method of claim 18 wherein providing the option to transmit the on-demand media to the recording device for presentation to the user at the scheduled time comprises basing a price for the transmission of the on-demand media on the available bandwidth.

24. The method of claim 1 further comprising:

providing another option relating to the transmission of the requested on-demand media at a future time; and presenting to the user on a display a plurality of sessions that are available for downloading the requested on-demand media over a range of future days.

25. A system for managing the distribution of on-demand media using an interactive television application, the system comprising:

a television distribution facility;

local processing circuitry on which an interactive television application is at least partially implemented, wherein the local processing circuitry is configured to:

receive a request for on-demand media from a user wherein:

the television distribution facility is configured to transmit the on-demand media to the user at one of a plurality of bandwidths, a first of the plurality of bandwidths is greater than a second of the plurality of bandwidths, and the second of the plurality of bandwidths is less than an available bandwidth at the television distribution facility for transmission of the on-demand media;

compare the first of the plurality of bandwidths to the available bandwidth; and responsive to the comparison of the first of the plurality of bandwidths to the available bandwidth:

provide the user with an option to receive the on-demand media at the second of the plurality of bandwidths based at least in part on the comparison of the first of the plurality of bandwidths to the available bandwidth, wherein a selection of the option causes a transmission of the on-demand media at the second of the plurality of bandwidths from the television distribution facility exclusively to the user.

26. The system of claim 25 wherein the request is a request for real-time transmission of the on-demand media.

27. The system of claim 25 wherein the request is a request for transmission of the on-demand media at a future time.

28. The system of claim 25 wherein the on-demand media is selected from the group consisting of an audio selection, a video selection, an electronic publication, an electronic game, a software application, and any combination thereof.

29. The system of claim 25 wherein the local processing circuitry is further configured to present the first of the plurality of bandwidths to the user.

30. The system of claim 29 further comprising a display on which the first of the plurality of bandwidths is displayed, wherein the local processing circuitry is further configured to display time variation of the first of the plurality of bandwidths on the display.

31. The system of claim 29 further comprising a display on which the first of the plurality of bandwidths is graphically presented, wherein the local processing circuitry is further configured to display a graphical representation of time variation of the first of the plurality of bandwidths on the display.

32. The system of claim 29 further comprising a speaker from which the first of the plurality of bandwidths is audibly presented.

33. The system of claim 25 further comprising a display on which the available bandwidth is graphically displayed, wherein the local processing circuitry is further configured to display a graphical representation of time variation of the available bandwidth.

34. The system of claim 25 further comprising a speaker from which the available bandwidth is audibly presented.

35. The system of claim 25 wherein the local processing circuitry is further configured to determine that the available bandwidth is greater than or equal to the first of the plurality of bandwidths.

36. The system of claim 25 wherein the local processing circuitry is further configured to determine that the available bandwidth is less than the first of the plurality of bandwidths.

37. The system of claim 25 wherein the local processing circuitry is further configured to provide the user with an ability to schedule a time for the transmission of the on-demand media to the user.

38. The system of claim 37 wherein a price for the transmission of the on-demand media is based on the scheduled time.

39. The system of claim 25 wherein the local processing circuitry is further configured to recommend a time to the user for the transmission of the on-demand media to the user.

40. The system of claim 25 wherein the local processing circuitry is further configured to present a general trend to the user of available time slots for transmitting on-demand media in response to user requests.

41. The system of claim 25 wherein a price for the transmission of the on-demand media is based on the second of the plurality of bandwidths.

42. The system of claim 25 further comprising a recording device, and wherein the local processing circuitry is further configured to transmit the on-demand media to the recording device for presentation to the user at a scheduled time.

43. The system of claim 42 wherein a price for the transmission of the on-demand media to the recording device is based on the scheduled time.

44. The system of claim 42 wherein the local processing circuitry is further configured to transmit the on-demand media in a plurality of sections and wherein each section is transmitted at the first of the plurality of bandwidths.

45. The system of claim 42 wherein the local processing circuitry is further configured to transmit the on-demand media in a plurality of sections and wherein at least one of the plurality of sections has a bandwidth that is different than the first of the plurality of bandwidths.

46. The system of claim 42 wherein the local processing circuitry is further configured to transmit the on-demand media at a bandwidth that is different than the first of the plurality of bandwidths.

47. The system of claim 42 wherein a price for the transmission of the on-demand media is based on the available bandwidth.

48. The system of claim 25 wherein the local processing circuitry is further configured to:

provide another option relating to the transmission of the requested on-demand media at a future time; and present to the user on a display a plurality of sessions that are available for downloading the requested on-demand media over a range of future days.

49. A non-transitory computer readable medium having computer program logic recorded thereon for:

receiving a request for on-demand media from a user, wherein:

a television distribution facility is configured to transmit the on-demand media to the user at one of a plurality of bandwidths, a first of the plurality of bandwidths is greater than a second of the plurality of bandwidths, and the second of the plurality of bandwidths is less than an available bandwidth at the television distribution facility for transmission of the on-demand media;

comparing the first of the plurality of bandwidths to the available bandwidth; and responsive to the comparison of the first of the plurality of bandwidths to the available bandwidth:

providing the user with an option to receive the on-demand media at the second of the plurality of bandwidths based at least in part on the comparison of the first of the plurality of bandwidths to the available bandwidth, wherein a selection of the option causes a transmission of the on-demand media at the second of the plurality of bandwidths from the television distribution facility exclusively to the user.

50. The non-transitory computer readable medium of claim 49 further comprising computer program logic recorded thereon for receiving the request for real-time transmission of the on-demand media.

51. The non-transitory computer readable medium of claim 49 further comprising computer program logic recorded thereon for receiving the request for transmission of the on-demand media at a future time.

52. The non-transitory computer readable medium of claim 49 wherein the on-demand media is selected from the group consisting of an audio selection, a video selection, an electronic publication, an electronic game, a software application, and any combination thereof.

53. The non-transitory computer readable medium of claim 49 further comprising computer program logic recorded thereon for presenting the first of the plurality of bandwidths to the user.

54. The non-transitory computer readable medium of claim 53 further comprising computer program logic recorded thereon for displaying time variation of the first of the plurality of bandwidths on a display.

55. The non-transitory computer readable medium of claim 53 further comprising computer program logic recorded thereon for displaying a graphical representation of time variation of the first of the plurality of bandwidths on a display.

56. The non-transitory computer readable medium of claim 53 further comprising computer program logic recorded thereon for audibly presenting the first of the plurality of bandwidths.

57. The non-transitory computer readable medium of claim 49 further comprising computer program logic recorded thereon for presenting the available bandwidth to the user comprises displaying a graphical representation of time variation of the available bandwidth on a display.

58. The non-transitory computer readable medium of claim 49 further comprising computer program logic recorded thereon for audibly presenting the available bandwidth.

59. The non-transitory computer readable medium of claim 49 further comprising computer program logic recorded thereon for determining that the available bandwidth is greater than or equal to the first of the plurality of bandwidths.

60. The non-transitory computer readable medium of claim 49 further comprising computer program logic recorded thereon for determining that the available bandwidth is less than the first of the plurality of bandwidths.

61. The non-transitory computer readable medium of claim 49 further comprising computer program logic recorded thereon for providing a plurality of options for the transmission of the on-demand media of the on-demand media, which comprises providing the user with an ability to schedule a time for the transmission of the on-demand media to the user.

62. The non-transitory computer readable medium of claim 61 wherein a price for the transmission of the on-demand media is based on the scheduled time.

63. The non-transitory computer readable medium of claim 49 further comprising computer program logic recorded thereon for recommending a time to the user for the transmission of the on-demand media to the user.

64. The non-transitory computer readable medium of claim 49 further comprising computer program logic recorded thereon for providing a plurality of options for the transmission of the on-demand media, which comprises presenting a general trend to the user of available time slots for transmitting on-demand media in response to user requests.

65. The non-transitory computer readable medium of claim 49 wherein a price for the transmission of the on-demand media is based on the second of the plurality of bandwidths.

66. The non-transitory computer readable medium of claim 49 further comprising computer program logic recorded thereon for providing a plurality of options for the transmission of the on-demand media, which comprises providing the option to transmit the on-demand media to a recording device for presentation to the user at a scheduled time.

67. The non-transitory computer readable medium of claim 66 wherein a price for the transmission of the on-demand media to the recording device is based on the scheduled time.

68. The non-transitory computer readable medium of claim 66 further comprising computer program logic recorded thereon for transmitting the on-demand media in a plurality of sections wherein each section is transmitted at the first of the plurality of bandwidths.

69. The non-transitory computer readable medium of claim 66 further comprising computer program logic recorded thereon for transmitting the on-demand media in a plurality of sections wherein at least one of the plurality of sections has a bandwidth that is different than the first of the plurality of bandwidths.

70. The non-transitory computer readable medium of claim 66 further comprising computer program logic recorded thereon for transmitting the on-demand media at a bandwidth that is different than the first of the plurality of bandwidths.

71. The non-transitory computer readable medium of claim 66 wherein a price for the transmission of the on-demand media is based on the available bandwidth.

72. The non-transitory computer readable medium of claim 49 further comprising computer program logic recorded thereon for:
   providing another option relating to the transmission of the requested on-demand media at a future time; and
   presenting to the user on a display a plurality of sessions that are available for downloading the requested on-demand media over a range of future days.

73. The method of claim 1 further comprising displaying a representation of a difference between the first of the plurality of bandwidths and the available bandwidth, responsive to the comparison of the first of the plurality of bandwidths to the available bandwidth.

74. The system of claim 25 wherein the local processing circuitry is further configured to display a representation of a difference between the first of the plurality of bandwidths and the available bandwidth responsive to the comparison of the first of the plurality of bandwidths and the available bandwidth.

75. The non-transitory computer readable medium of claim 49 further comprising computer program logic recorded thereon for displaying a representation of a difference between the first of the plurality of bandwidths and the available bandwidth, responsive to the comparison of the first of the plurality of bandwidths to the available bandwidth.

* * * * *

UNITED STATES PATENT AND TRADEMARK OFFICE
CERTIFICATE OF CORRECTION

PATENT NO. : 8,291,461 B2
APPLICATION NO. : 12/637922
DATED : October 16, 2012
INVENTOR(S) : William L. Thomas et al.

Page 1 of 1

It is certified that error appears in the above-identified patent and that said Letters Patent is hereby corrected as shown below:

Column 27, line 48, replace "claim 6" to --claim 5--.

Signed and Sealed this
Twenty-sixth Day of March, 2013

Teresa Stanek Rea
*Acting Director of the United States Patent and Trademark Office*